(12) United States Patent
Yoshikawa et al.

(10) Patent No.: US 7,173,645 B2
(45) Date of Patent: Feb. 6, 2007

(54) OPTICAL SCAN APPARATUS AND COLOR IMAGE FORMATION APPARATUS

(75) Inventors: Motonobu Yoshikawa, Osaka (JP); Yoshiharu Yamamoto, Toyonaka (JP); Daizaburo Matsuki, Neyagawa (JP); Hajime Yamamoto, Ikoma (JP); Masanori Yoshikawa, Neyagawa (JP); Akinobu Okuda, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 302 days.

(21) Appl. No.: 10/487,975

(22) PCT Filed: Dec. 19, 2002

(86) PCT No.: PCT/JP02/13278

§ 371 (c)(1),
(2), (4) Date: Feb. 27, 2004

(87) PCT Pub. No.: WO03/054611

PCT Pub. Date: Jul. 3, 2003

(65) Prior Publication Data

US 2004/0252178 A1 Dec. 16, 2004

(30) Foreign Application Priority Data

Dec. 21, 2001 (JP) .............................. 2001-390290

(51) Int. Cl.
G02B 26/10 (2006.01)
G02B 26/12 (2006.01)
B41J 2/447 (2006.01)

(52) U.S. Cl. ...................... 347/243; 359/204

(58) Field of Classification Search ................ 347/233, 347/243, 244, 256, 258, 259, 261; 359/196–197, 359/204–208
See application file for complete search history.

(56) References Cited

U.S. PATENT DOCUMENTS 6,052,211 A 4/2000 Nakajima
6,392,773 B1 5/2002 Hama et al.

FOREIGN PATENT DOCUMENTS

| EP | 1 217 415 | 6/2002 |
|---|---|---|
| JP | 10-148777 | 6/1998 |
| JP | 11-237568 | 8/1999 |
| JP | 2000-141759 | 5/2000 |
| JP | 2001-133717 | 5/2001 |

*Primary Examiner*—Huan Tran
(74) *Attorney, Agent, or Firm*—Hamre, Schumann, Mueller & Larson, P.C.

(57) ABSTRACT

An optical scan apparatus includes an optical deflection unit (4), an image formation optical system (3), and curved surface mirrors (7a to 7d). Light fluxes from the image formation optical system (3) come onto the deflection surface (4a) of die optical deflection unit (4) in an oblique direction. Light fluxes from the optical deflection unit (4) come onto the curved surface mirrors (7a to 7d) in an oblique direction. When a boundary is a plane (6) including a normal at the center of the deflection surface (4a) and parallel to the main scan direction, the curved surface mirrors (7a to 7d) are arranged in the same space divided by the boundary and the scan speeds of fluxes scanning the surfaces to be scanned (8a to 8d) are almost identical. Thus, it is possible to obtain identical drive frequencies of the light sources (1a to 1d), thereby simplifying the circuit.

18 Claims, 33 Drawing Sheets

OPTICAL SCAN APPARATUS AND COLOR IMAGE FORMATION APPARATUS

TECHNICAL FIELD

The present invention relates to an optical scanning apparatus used for a color image formation apparatus such as a laser beam printer, a laser facsimile machine, a digital copier, or the like.

BACKGROUND ART

As a conventional color image formation apparatus, for example, tandem type apparatuses are well known. The tandem type apparatus has a configuration in which a plurality of optical scanning apparatuses are provided on a paper feeding path placed in a manner in which it extends horizontally, and toner images are transferred from the respective optical scanning apparatuses sequentially to a paper that moves along the paper feeding path, thus forming a color image on the paper.

As the optical scanning apparatuses used for the tandem type color image formation apparatus, an apparatus merely using four conventional optical scanning apparatuses each scanning a single flux (see JP2000-141759A), an apparatus using a single optical deflection unit and four sets of lens systems (see JP2001-133717A), and an apparatus using a single optical deflection unit and four sets of curved surface mirrors and lenses (see JP10 (1998)-148777A) are well known.

However, any of the above-mentioned conventional optical scanning apparatuses have a problem that a large number of components are required, so that miniaturization of the apparatus is difficult and the cost becomes high. Furthermore, since a plurality of lens systems are used, it is difficult to provide uniform performance of respective scanning lines.

DISCLOSURE OF THE INVENTION

With the foregoing in mind, the present invention is carried out to solve the above-mentioned conventional problem. It is therefore an object of the present invention to provide an optical scanning apparatus that can be miniaturized and obtain an excellent optical performance, and a color image formation apparatus using the same.

In order to achieve the above-mentioned object, a first optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with a main scanning direction. The plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. Scanning speeds of the plurality of light fluxes scanning the plurality of surfaces to be scanned are substantially the same as each other.

A second optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with a main scanning direction. The plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. Converging degrees or diverging degrees in the main scanning direction of the light fluxes traveling from the image formation optical system to the optical deflection unit are substantially the same as each other.

A third optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with a main scanning direction. The plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. In a XZ plane including a rotation axis of the optical deflection unit and the vertexes of the plurality of curved surface mirrors, when a distance between a vertex of a curved surface mirror positioned at the top in the plurality of curved surface mirrors and a vertex of a curved surface mirror positioned at the bottom in the plurality of the curved surface mirrors is represented by Lm, a distance between a center of a surface to be scanned positioned at the top in the plurality of surfaces to be scanned and a center of a surface to be scanned positioned at the bottom in the plurality of surfaces to be scanned is represented by Li, a distance between the deflection surface and the vertex of the curved surface mirror positioned at the top is represented by D1, and a distance between the vertex of the curved surface mirror positioned at the top and the center of the surface to be scanned positioned at the top is represented by D2, Lm, Li, D1 and D2 satisfy the relationship:

$$0.25<(Lm/Li)/(D1/D2)<0.45.$$

A fourth optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with a main scanning direction. The plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. In a XZ plane including a rotation axis of the optical deflection unit and the vertexes of the plurality of curved surface mirrors, when an angle made by a central axis positioned at the top and a central axis positioned at the bottom in the central axes of the light fluxes traveling toward the plurality of surfaces to be scanned is represented by $\beta r$, a distance between a center of a surface to be scanned positioned at the top and a center of a surface to be scanned positioned at the bottom in the plurality of surfaces to be scanned is represented by Li, a distance between the deflection surface and the vertex of the curved surface mirror positioned at the top is represented by D1, and a distance between the vertex of the curved surface mirror positioned at the top and the center of the surface to be scanned positioned at the top is represented by D2, D1, D2, $\beta r$ and Li satisfy the relationship:

$$1.0<(D1+D2)\cdot\tan\beta r/Li<1.6.$$

A fifth optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with a main scanning direction. The plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. In a XZ plane including a rotation axis of the optical deflection unit and the vertexes of the plurality of curved surface mirrors, when an angle made by a line connecting a vertex of a curved surface mirror positioned at the top and a vertex of a curved surface mirror positioned at the bottom in the plurality of curved surface mirrors and a line connecting a center of a surface to be scanned positioned at the top and a center of a surface to be scanned positioned at the bottom in the plurality of a surfaces to be scanned is represented by $\Delta\beta$, an angle made by a normal line at the vertex of the covered mirror positioned at the top and the light flux from the deflection surface is represented by $\beta 2$, a distance between the deflection surface and the vertex of the curved surface mirror positioned at the top is represented by D1, and a distance between the vertex of the curved surface mirror positioned at the top and the center of the surface to be scanned positioned at the top is represented by D2, $\Delta\beta$, $\beta 2$, D1 and D2 satisfy the relationship:

$$-1.8<\Delta\beta/\beta 2-0.2(D1/D2)<0.4.$$

A sixth optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with the main scanning direction. The plurality of curved surface mirrors are disposed in the different positions with respect to the subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. In a XZ plane including a rotation axis of the optical deflection unit and the vertexes of the plurality of curved surface mirrors, when an angle made by a central axis positioned at the top and a central axis positioned at the bottom in the central axes of the light fluxes traveling toward the plurality of surfaces to be scanned is represented by $\beta r$, a plane that is perpendicular to the XZ plane and includes normal lines at vertexes of the plurality of curved surface mirrors is defined as a YZ plane, and at the vertex of the curved surface mirror positioned at the top in the plurality of curved surface mirrors, the radius of curvature of the XZ cross section is represented by RxH, and the radius of curvature of the YZ cross section is represented by RyH; and at the vertex of the curved surface mirror positioned at the bottom in the plurality of curved surface mirrors, the radius of curvature of the XZ cross section is represented by RxL and the radius of curvature of the YZ cross section is represented by RyL, $\beta r$, RxH, RyH, RxL and RyL satisfy the relationship:

$$0.001 < [1 - RyH \cdot RxL / RxH \cdot RyL] / \tan \beta r < 0.012.$$

A seventh optical scanning apparatus of the present invention includes: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned. In the optical scanning apparatus, the light fluxes from the image formation optical system are incident obliquely on a plane that includes a normal line at the center of the deflection surface of the optical deflection unit and is parallel with the main scanning direction. The plurality of curved surface mirrors are disposed in the different positions with respect to the subscanning direction so that the light fluxes from the optical deflection unit are incident obliquely on a plane that includes normal lines at vertexes of the plurality of curved surface mirrors and is parallel with the main scanning direction. When the plane that includes a normal line at the center of the deflection surface and is parallel with the main scanning direction is defined as a boundary, the plurality of curved surface mirrors are disposed in the same space in spaces divided by the boundary. In the XZ plane including a rotation axis of the optical deflection unit and the vertexes of the plurality of curved surface mirrors, when an angle made by a central axis, which is positioned at the most distant from the light source in the central axes of the light fluxes traveling toward the plurality of surfaces to be scanned, and a line, which connects a center of the surface to be scanned positioned at the most distant from the light source in the plurality of surfaces to be scanned and the center of the surface to be scanned positioned at the nearest place to from the light source, is represented by $\beta id$, $\beta id$ satisfies the relationship:

$$55 < \beta id \leq 150.$$

A first color image formation apparatus of the present invention includes any of the optical scanning apparatuses according to the present invention. In the color image formation apparatus, a plurality of developing units for developing toners of different colors; transferring units for transferring toner images developed by a plurality of developing units onto a transfer material, and fixing unit for fixing the toner image transferred onto the transfer material are disposed in a way in which they correspond respectively to a plurality of photosensitive members disposed on the plurality of surfaces to be scanned.

A second color image formation apparatus of the present invention includes an optical scanning apparatus that satisfies the relationship: $90 < \beta id \leq 150$. In the color image formation apparatus, a plurality of developing units for developing toners of different colors; transferring units for transferring toner images developed by a plurality of developing units onto a transfer material, and fixing unit for fixing the toner image transferred onto the transfer material are disposed in a way in which they correspond respectively to a plurality of photosensitive members disposed on the plurality of surfaces to be scanned. When a side on which the light source is disposed is defined to be an upper side, the plurality of surfaces to be scanned are sequentially disposed toward the lower side; and in the plurality of scanning surfaces, the surface to be scanned positioned at the most distant from the light source is a surface to be scanned positioned at the bottom.

BEST MODE OF CARRYING OUT THE INVENTION

Figure 1:
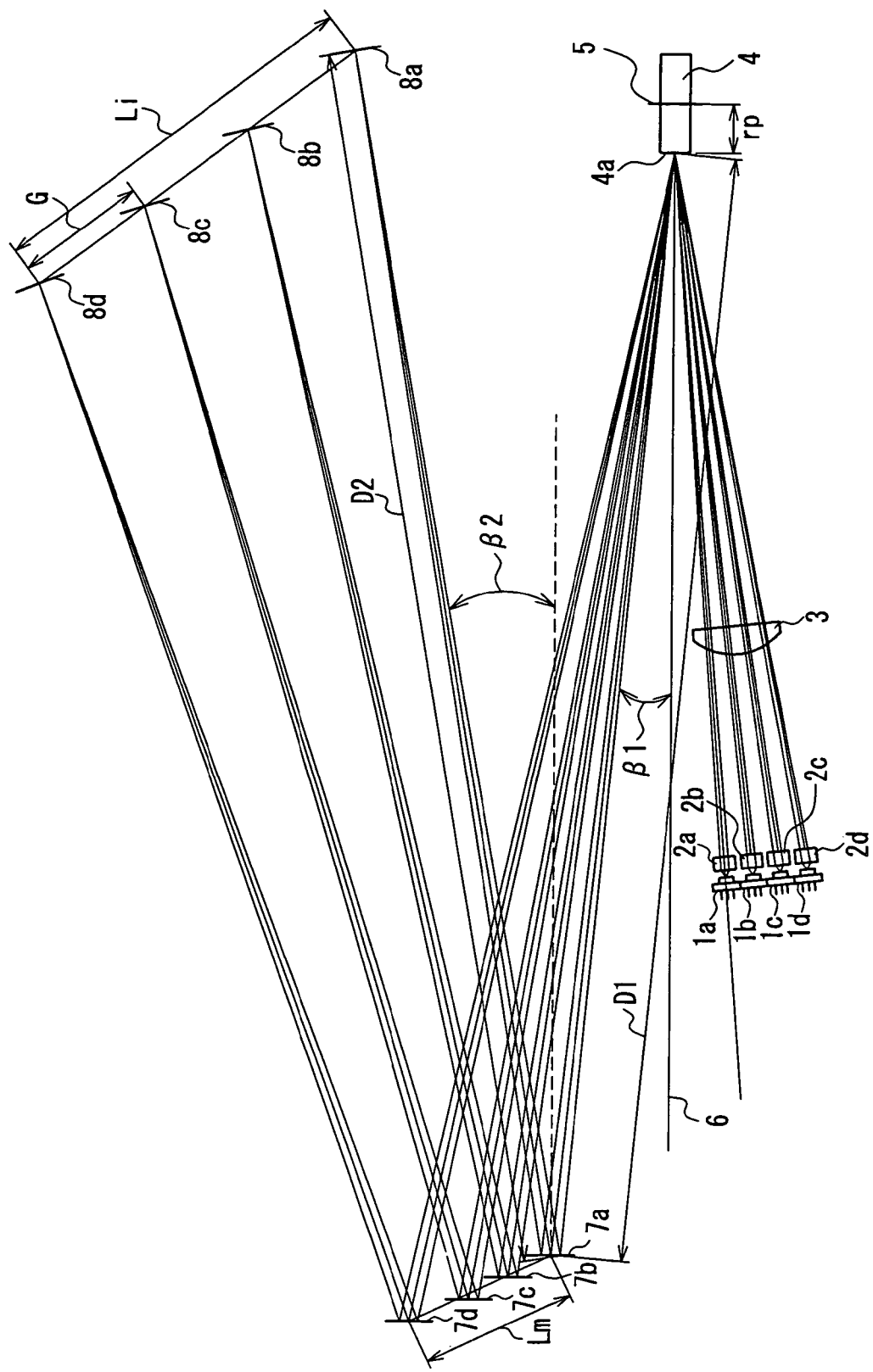
FIG. 1 is a cross-sectional view showing an optical scanning apparatus cut by a plane that is parallel with a subscanning direction according to one embodiment of the present invention.

In the first optical scanning apparatus of the present invention, since the scanning speeds of a plurality of light fluxes scanning a plurality of surfaces to be scanned are substantially the same as each other, it is possible to equalize the driving frequencies of the plurality of light sources, thus enabling a circuit to be simplified.

In the second optical scanning apparatus of the present invention, since the converging degrees or diverging degrees of light fluxes traveling from the image formation optical system to the optical deflection unit are substantially the same as each other, the same position adjusting means can be employed for the respective light sources and the first image formation optical system. Thus, the cost for adjusting can be reduced.

Since the third optical scanning apparatus of the present invention satisfies the relationship: $0.25<(Lm/Li)/(D1/D2)<0.45$, the interval between the reflection surfaces is reduced and it is possible to prevent effective regions, which reflect light fluxes, from overlapping with each other. Thus, it becomes easy to satisfy a curvature of field in the main scanning direction of less than 2.5 mm and a beam diameter of 60–80 μm or less at the strength of $1/e^2$ for achieving a 400 DPI resolution.

Since the fourth optical scanning apparatus of the present invention satisfies the relationship: $1.0<(D1+D2)\cdot\tan\beta r/Li<1.6$, it becomes easy to satisfy a curvature of field in the main scanning direction of less than 2.5 mm and a beam diameter of 60–80 μm or less at the strength of $1/e^2$ for achieving a 400 DPI resolution, and the interval between the reflection surfaces is reduced and it is possible to prevent effective regions, which reflect light fluxes, from overlapping with each other.

Since the fifth optical scanning apparatus of the present invention satisfies the relationship: $-1.8<\Delta\beta/\beta 2-0.2\,(D1/D2)<0.4$, it becomes easy to satisfy a curvature of field in the main scanning direction of less than 2.5 mm and a beam diameter of 60–80 μm or less at the strength of $1/e^2$ for achieving a 400 DPI resolution.

Since the sixth optical scanning apparatus of the present invention satisfies the relationship: $0.001<[1-RyH\cdot RxL/RxH\cdot RyL]/\tan\beta r<0.012$, it becomes easy to satisfy a curvature of field in the main scanning direction of less than 2.5 mm and a beam diameter of 60–80 μm or less at the strength of $1/e^2$ for achieving a 400 DPI resolution.

Since the seventh optical scanning apparatus of the present invention satisfies the relationship: $55<\beta id\leq 150$, it is possible to prevent the reflection region of a curved surface mirror positioned at the most distant from the light source from interrupting the light fluxes traveling from the neighboring curved surface mirrors toward the surface to be scanned and to prevent the reflection region of a curved surface mirror positioned at the nearest place to the light source from interrupting the light fluxes traveling from the neighboring curved surface mirrors to the surface to be scanned. Therefore, since it is possible to secure an excellent optical performance and to reduce the relative performance error of the scanning lines, and thus the high resolution can be realized.

In the first and second optical scanning apparatuses of the present invention, it is preferable that the light fluxes reflected by the plurality of curved surface mirrors travel straight to the corresponding surfaces to be scanned, respectively. According to the above-mentioned optical scanning apparatus, since the number of components can be reduced, it is possible to reduce the cost for components and cost for assembling and adjusting and at the same time, it is possible to unify the performances of the respective scanning lines.

Furthermore, it is preferable that in a XZ plane including a rotation axis of the optical deflection unit and the vertexes of the plurality of curved surface mirrors, centers of the plurality of surfaces to be scanned are aligned substantially linearly. According to the above-mentioned optical scanning apparatus, when the optical scanning apparatus is used in a color image formation apparatus, a plurality of photosensitive members, developing units and transfer material feeding paths can be arranged easily.

Furthermore, it is preferable that linear images of the light fluxes formed on the optical deflection unit are formed on substantially the same position. According to the above-mentioned optical scanning apparatus, it is possible to make the optical deflection unit thin and also realize the miniaturization of the entire apparatus.

Furthermore, it is preferable that in the XZ plane including a rotation axis of the optical deflection unit and the vertexes of the plurality of curved surface mirrors, any two of the central axes of the light fluxes traveling from the plurality of curved surface mirrors to the plurality of surfaces to be scanned are not parallel with each other but expand substantially in a fan shape. According to the above-mentioned optical scanning apparatus, it is possible to miniaturize the optical deflection unit.

In the third optical scanning apparatus, it is preferable that scanning speeds of the plurality of light fluxes scanning the plurality of surfaces to be scanned are the same as each other, and converging degrees or diverging degrees in the main scanning direction of the light fluxes traveling from the image formation optical system to the optical deflection unit are substantially the same as each other. According to the above-mentioned optical scanning apparatus, the driving frequencies of the plurality of light sources can be equalized, thus enabling a circuit to be simplified. Furthermore, since the same position adjusting means can be employed for both light sources and the first image formation optical system, it is possible to reduce the cost for adjusting.

In the fourth optical scanning apparatus, it is preferable that D1, D2, $\beta r$ and Li satisfy the relationship:

$$1.2<(D1+D2)\cdot\tan \beta r/Li<1.6.$$

In the above-mentioned relationship, when the value "(D1+D2)·tan $\beta r$/Li" is smaller than the lower limit, 1.0 mm or more curvature of field in the main scanning direction occurs, thus making it difficult to satisfy a beam diameter of 40–60 μm or less at the strength of $1/e^2$ for achieving a 600 DPI resolution. If the value is larger than the upper limit, the intervals at the reflection surface tend to be small, thus making it difficult to separate the effective regions that reflect light fluxes because they are overlapped with each other.

In the fifth optical scanning apparatus, it is preferable that $\Delta\beta$, $\beta 2$, D1 and D2 satisfy the relationship:

$$-1.4<\Delta\beta/\beta 2-0.2(D1/D2)<0.$$

In the above-mentioned relationship, when the value "$\Delta\beta/\beta 2-0.2$ (D1/D2)" is smaller or larger than the lower limit or upper limit, 1.0 mm or more curvature of field in the main scanning direction occurs, thus making it difficult to satisfy a beam diameter of 40–60 μm or less at the strength of $1/e^2$ for achieving a 600 DPI resolution.

Furthermore, it is preferable that $\Delta\beta$, $\beta 2$, D1 and D2 satisfy the relationship:

$$-0.9<\Delta\beta/\beta 2-0.2(D1/D2)<-0.5.$$

In the above-mentioned relationship, when the value "$\Delta\beta/\beta 2-0.2$ (D1/D2)" is smaller or larger than the lower limit or upper limit, 0.5 mm or more curvature of field in the main scanning direction occurs, thus making it difficult to satisfy a beam diameter of 25–40 μm or less at the strength of $1/e^2$ for achieving a 1200 DPI resolution.

Furthermore, it is preferable that scanning speeds of the plurality of light fluxes scanning the plurality of surfaces to be scanned are the same as each other, and converging degrees or diverging degrees in the main scanning direction of the light fluxes traveling from the image formation optical system to the optical deflection unit are substantially the same as each other. According to the above-mentioned optical scanning apparatus, the driving frequencies of the plurality of light sources can be equalized, thus enabling a circuit to be simplified. Furthermore, since the same position adjusting means can be used for both light sources and the first image formation optical system, it is possible to reduce the cost for adjusting.

In the sixth optical scanning apparatus, it is preferable that $\beta r$, RxH, RyH, RxL and RyL satisfy the relationship:

$$0.003<[1-RyH\cdot RxL/RxH\cdot RyL]/\tan \beta r<0.07.$$

In the above-mentioned relationship, when the value is smaller or larger than the lower limit or upper limit, 1.0 mm or more curvature of field in the main scanning direction occurs, thus making it difficult to satisfy a beam diameter of 40–60 μm or less at the strength of $1/e^2$ for achieving a 600 DPI resolution.

In the seventh optical scanning apparatus, it is preferable that scanning speeds of the plurality of light fluxes scanning the plurality of surfaces to be scanned are substantially the same as each other; converging degrees or diverging degrees in the main scanning direction of the light fluxes traveling from the image formation optical system to the optical deflection unit; and the $\beta id$ satisfies the relationship:

$$55<\beta id<100.$$

According to this configuration, the curvature of field in the main scanning direction can be made less than 2.5 mm and it becomes easy to satisfy a beam diameter of 60–80 μm or less at the strength of $1/e^2$ for achieving a 400 DPI resolution. Furthermore, if the scanning speeds of light fluxes scanning the respective surface to be scanned are equalized, the driving frequency of the light sources can be equalized, thus enabling the circuit to be simplified. Furthermore, if it is possible for the converging degree of light fluxes traveling toward the optical deflection unit in the main scanning direction to be different from each other, the surfaces to be scanned can be arranged relatively freely. Therefore, it is effective, for example, in the case where the interval between the curved surface mirrors needs to be a certain width or more, or the case where the dimension of the arrangement of the plurality of surfaces to be scanned is lowered in height by allowing the apparatus to be tilted from the perpendicular direction.

Furthermore, in the optical scanning apparatus, in the XZ plane including a rotation axis of the optical deflection unit and the vertexes of the plurality of curved surface mirrors, with respect to a line connecting the vertex of the curved surface mirror positioned at the top and the vertex of the curved surface mirror positioned at the bottom in the plurality of curved surface mirrors, vertexes of the other curved surface mirrors are disposed at the opposite side to the plurality of surfaces to be scanned. According to the above-mentioned optical scanning apparatus, while achieving the excellent performance, it is possible to unify the performance of the scanning lines, scanning speeds, and the converging degree of the light fluxes from the first image formation optical system.

Furthermore, it is preferable that the plurality of curved surface mirrors have an arc-shaped cross section in a sub-scanning direction. According to the above-mentioned optical scanning apparatus, it is possible to allow the plurality of curved surface mirrors to have a shape capable of being processed and measured relatively easily.

Furthermore, it is preferable that the plurality of curved surface mirrors have a shape so as to correct a curve of the scanning line, which occurs because light fluxes are incident obliquely.

Furthermore, it is preferable that the plurality of curved surface mirrors are asymmetric with respect to the YZ plane that includes normal lines at the vertexes and is parallel with the main scanning direction. According to the above-mentioned optical scanning apparatus, it is possible to correct a curve of the scanning line, which occurs because light fluxes are incident obliquely.

Furthermore, it is preferable that the plurality of curved surface mirrors are skew in which normal lines at points other than a vertex on a bus line that is a curved line at which the YZ plane intersects the curved surface are not included in the YZ plane. According to the above-mentioned optical scanning apparatus, it is possible to simplify the configuration of the optical system and to correct a curve of the scanning line, which occurs because light fluxes are incident obliquely.

Furthermore, in the optical scanning apparatus in which the curved surface mirrors are skew, it is preferable that an angle made by respective normal lines at the points on the bus line and the YZ plane becomes larger toward the peripheral portion. According to the above-mentioned optical scanning apparatus, it is possible to correct a curve of the scanning line, which occurs because light fluxes are incident obliquely.

Furthermore, it is preferable that the direction of the angle made by respective normal lines at the points on the bus line and the YZ plane is a forwarding direction when the direction of the angle of a light flux reflected by the curved surface mirror with respect to the incident light flux from the deflection surface is defined as a forwarding direction. According to the above-mentioned optical scanning apparatus, it is possible to correct a curve of the scanning line, which occurs because light fluxes are incident obliquely.

Furthermore, in the optical scanning apparatus, it is preferable that the plurality of curved surface mirrors are anamorphotic mirrors in which the radius of curvature in the main scanning direction and the radius of curvature in the subscanning direction at the vertex are different from each other. According to the above-mentioned optical scanning apparatus, the position of the image formation in the main scanning direction and the position of the image formation in the subscanning direction can be made in the vicinity of the respective surfaces to be scanned.

Furthermore, it is preferable that the plurality of the curved surface mirrors have the concave mirror surfaces both in the main scanning direction and the subscanning direction. According to the above-mentioned optical scanning apparatus, the position of the image formation in the main scanning direction and the position of the image formation in the subscanning direction can be placed respectively in the vicinity of the surfaces to be scanned.

Furthermore, it is preferable that the plurality of curved surface mirrors have a refractive force in the subscanning direction that is different between in the central portion and in the peripheral portion in the main scanning direction. According to the above-mentioned optical scanning apparatus, it is possible to correct the curvature of field in the subscanning direction.

Furthermore, it is preferable that the plurality of curved surface mirrors have the radius of curvature of the subscanning cross section which does not differ depending upon the cross sectional shape in the main scanning direction. According to the above-mentioned optical scanning apparatus, it is possible to correct the curvature of field in the subscanning direction.

Furthermore, it is preferable that the image formation optical system allows light fluxes from the plurality of light sources to be the converging light fluxes in the main scanning direction. According to the above-mentioned optical scanning apparatus, excellent performance of the curvature of field in the main scanning direction and the subscanning direction and the fθ property can be obtained.

Furthermore, it is preferable that at least one of the plurality of the light sources comprises a wavelength variable light source and a wavelength controlling portion. According to the above-mentioned optical scanning apparatus, since the size of the spot is in proportion to the wavelength, by controlling the wavelength, it is possible to arbitrarily control the size of the spot formed as an image on the photosensitive drum. Furthermore, since the second image formation optical system is configured only by the reflection mirror, no chromatic aberration occurs, thus enabling the resolution to be changed arbitrarily without deteriorating the other performances such as fθ properties.

Furthermore, in the color image formation apparatus of the present invention, it is preferable that $\beta id$ satisfies the relationship:

$$90 < \beta id \leq 150.$$

Figure 33:
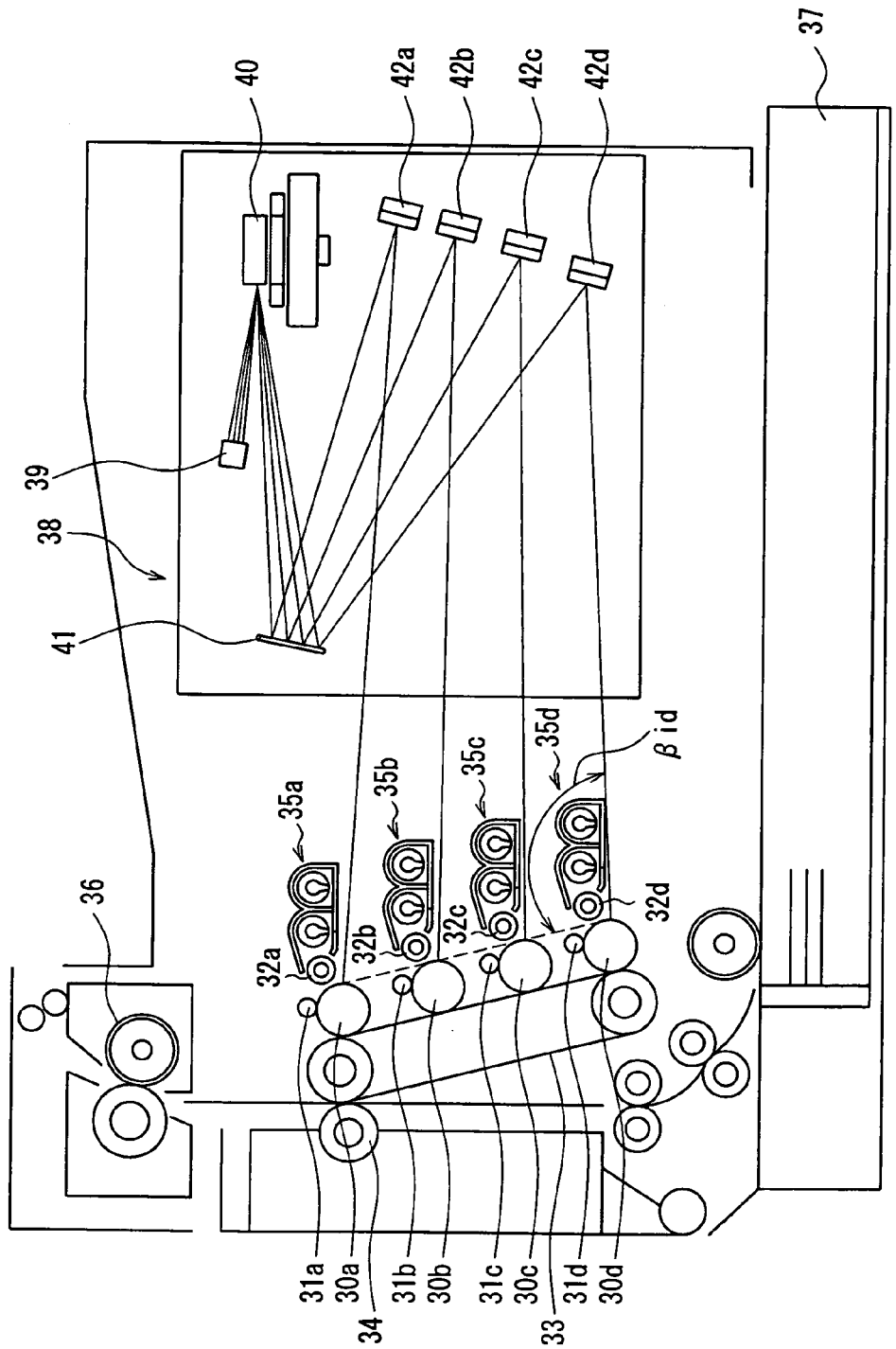
FIG. 33 is a schematic cross-sectional view showing a color image formation apparatus according to a sixth embodiment of the present invention.

According to this configuration, since the angle $\beta id$ is an obtuse angle, it is possible to tilt the direction of arranging the photosensitive drums $30a$ to $30d$ from the vertical direction, thus enabling the height of the apparatus to be lowered, which is advantageous for miniaturizing the apparatus. Furthermore, as shown in FIG. 33, a position for transferring a paper from an intermediate transfer belt 33 can be made to be the top portion, thus facilitating the transfer of a paper.

Hereinafter, one embodiment of the present invention will be explained with reference to drawings.

First Embodiment

FIG. 1 is a view showing a basic configuration of an optical scanning apparatus according to one embodiment of the present invention. FIG. 1 is a cross-sectional view showing an optical scanning apparatus according to this embodiment cut by a plane (referred to as a "XZ plane" hereinafter) including a rotation axis 5 of a polygon mirror 4 and vertexes of a plurality of curved surface mirrors 7a to 7d.

In FIG. 1, the respective light fluxes from the semiconductor lasers 1a to 1d, which are light sources, pass through axial symmetric lenses 2a to 2d corresponding to the semiconductor lasers 1a to 1d, which constitute a first image formation optical system so as to be loosely converged light, respectively, and then are incident on a cylindrical lens 3 that similarly constitutes the first image formation optical system. The axial symmetric lenses 2a to 2d are lenses having refractive power in both a main scanning direction and a subscanning direction. However, the cylindrical lens 3 has refractive power only in one subscanning direction. The light fluxes that are incident on the cylindrical lens 3 are converged only in the subscanning direction.

This converged light is incident obliquely on the polygon mirror 4 that is an optical deflection unit so that respective focal lines are overlapped with each other so as to form linear images on a deflection surface 4a. That is, the linear images on the deflection surface 4a are formed on substantially the same position, enabling the polygon mirror 4 to be made thin and realizing the miniaturization of the entire apparatus.

Herein, a horizontal plane 6 is a plane including a normal line at the center of the deflection surface 4a of the polygon mirror 4 and a parallel plane extending in the direction of the main scanning direction (the direction perpendicular to the paper surface of FIG. 1). The above-mentioned "incident obliquely" means that light is incident obliquely with respect to the horizontal plane 6. Note here that the horizontal plane 6 is shown as a line in FIG. 1 but is a plane including this line and extending in the direction perpendicular to the paper surface.

Next, the respective light fluxes deflected by the polygon mirror 4 are incident obliquely on the curved surface mirrors 7a to 7d. "Incident obliquely" means that the light fluxes from the polygon mirror 4 are incident obliquely with respect to a plane that includes normal lines at the respective vertexes of the curved surface mirrors 7a to 7d and is parallel with the main scanning direction. The light fluxes reflected by the curved surface mirrors 7a to 7d form an image on surfaces 8a to 8d to be scanned, respectively. Since light fluxes are incident obliquely in this way, a plurality of curved surface mirrors 7a to 7d are placed in the different positions in the subscanning direction. Furthermore, the curved surface mirrors 7a to 7d are placed at the same side (opposite side to the semiconductor lasers 1a to 1d) with respect to a horizontal plane 6 as the boundary.

Thus, reflected light fluxes from the polygon mirror 4 do not return to the cylindrical lens 3. Furthermore, since it is not necessary to be incident obliquely with respect to the main scanning direction, it is possible to make the shape of the curved surface mirrors 7a to 7d be a plane-symmetric shape that includes a normal line of the deflection surface 4a and is parallel with the subscanning direction.

Herein, in this embodiment, in the XZ plane, any two of the central axes of the light fluxes traveling from the curved surface mirrors 7a to 7d toward the plurality of surfaces 8a to 8d to be scanned are not parallel with each other but are in the direction of expanding in substantially a fan shape. That is, the central axes of any two of light fluxes extend toward the surfaces 8a to 8d to be scanned. Thus, the polygon mirror 4 is miniaturized in this embodiment. That is, in the configuration in which the respective central axes are placed in parallel with each other, in order to achieve the excellent performance in any optical systems, the position of the focal lines of the deflection surface 4a becomes greatly different from each other. As a result, the size of the polygon mirror 4 becomes large and the cost is increased.

Furthermore, in this embodiment, in the XZ plane, the centers of the respective surfaces 8a to 8d to be scanned are aligned at equal intervals on one line. According to this configuration, when the optical scanning apparatus is employed in a color image formation apparatus, a plurality of photosensitive members, developing units and transfer material feeding paths can be arranged easily.

Furthermore, in this embodiment, since the curved surface mirror functions as a means for bending light fluxes, a light flux bending means is not placed between the curved surface mirrors 7a to 7d and the surfaces to be scanned. That is, respective light fluxes reflected by the curved surface mirrors 7a to 7d travel straight toward the corresponding surfaces 8a to 8d to be scanned, respectively. Thus, the number of components can be reduced, and it is possible to reduce the cost of components and the cost of assembly and adjustment as well as to unify the performance of the respective scanning lines.

Furthermore, the apparatus is designed so that the speeds of the light fluxes scanning the surfaces 8a to 8d to be scanned are equal to each other. This can be realized by optimizing the arrangement of the curved surface mirrors 7a to 7d in addition to the arrangement of polygon mirror 4, the curved surface mirrors 7a to 7d and the surfaces 8a to 8d to be scanned. According to this configuration, the driving frequencies of the light sources can be equalized to each other, thus enabling the circuit to be simplified.

In the example of this Figure, the curved surface mirrors 7a to 7d are placed so that in the XZ plane, with respect to a line connecting a vertex of the covered surface mirror 7d positioned at the top and a vertex of the curved surface mirror 7a positioned at the bottom, the vertexes of the other curved surface mirrors 7b and 7c are placed at the opposite side to the surfaces 8a to 8d to be scanned. According to this configuration, the differences between the deflection surface 4a and the respective curved surface mirrors 7a to 7d can be minimized. Therefore, while achieving the excellent performance, it is possible to unify the performances and the scanning speeds of the respective scanning lines. Furthermore, in the second and third embodiments mentioned below, while achieving the excellent performance, it is possible to unify the performances of the scanning lines and the convergence degree of the light fluxes from the first image formation optical system.

In the shapes of the respective curved surface mirrors 7a to 7d, a non-arc shape of the cross section in the scanning direction and a radius of curvature in the subscanning direction corresponding to image heights are determined so as to correct a main image surface curve, a sub image surface curve and a fθ error. Furthermore, since the shape of the cross section in the subscanning direction is made to be an arc shape, processing and measurement become easy.

Furthermore, the shapes of the mirrors 7a to 7d are made to be a shape of correcting a curve of the scanning line, which occurs because light fluxes are incident obliquely, and the amount of skew of the surface at the position corresponding to each of the image heights is determined so as to correct the curve of the scanning line. More specifically, the curved surface mirrors 7a to 7d have the following configurations (i) to (iv). That is to say, the curved surface mirrors 7a to 7d have a configuration of: (i) being asymmetric with respect to a YZ plane that includes normal lines at the respective vertexes and is parallel with the main scanning direction; (ii) being skew in which the normal lines at the points other than the vertex on the bus line that is a curved line in which the YZ plane intersects the curved surface are not included in the YZ plane; (iii) having an angle made by a normal line at the respective points on the bus line and the YZ plane that is larger as it approaches the peripheral portion; and (iv) having the direction of an angle made by normal lines at the respective points on the bus line and the YZ plane be a forwarding direction when an angle made by the light flux reflected by the curved surface mirrors 7a to 7d and the incident light flux from the deflection surface 4a is defined as a forwarding direction.

Furthermore, the curved surface mirrors 7a to 7d have configurations of: (v) an anamorphic mirror in which, at the vertex, the radius of curvature in the main scanning direction is different from the radius of curvature in the subscanning direction; and (vi) a mirror surface that is concave both in the main scanning direction and in the subscanning direction. Thus, it is possible to make the image formation position in the main scanning direction and the image formation position in the subscanning direction be respectively in the vicinity of the surface to be scanned.

Furthermore, the curved surface mirrors 7a to 7d have configurations of: (vii) a mirror surface in which the refractive power in the subscanning direction is different between the central portion and the peripheral portion in the main scanning direction; and (viii) the radius of curvature in the cross section in the subscanning direction does not differ depending upon the cross-sectional shape in the main scanning direction. Thus, it is possible to correct the curvature of field in the subscanning direction.

The surface shape of the respective curved surface mirrors is expressed by the following Formula 1, in the rectangular coordinate system in which the vertex of the plane is an origin point, the subscanning direction is x axis, the main scanning direction is y axis and the normal line at a vertex is z axis, a sag amount z (mm) from the vertex to the position at the coordinate of x (mm) and y (mm) wherein x (mm) denotes a subscanning direction and y (mm) denotes a main scanning direction and the direction in which an incident light flux travels is defined as a forwarding direction.

$$z = f(y) + \frac{\frac{x^2}{g(y)} - 2x \cdot \sin\{\theta(y)\}}{\cos\{\theta(y)\} + \sqrt{\cos^2\{\theta(y)\} - \left[\frac{x}{g(y)}\right]^2 + \frac{2x \cdot \sin\{\theta(y)\}}{g(y)}}} \quad \text{(Formula 1)}$$

In Formula 1, f (y) is a formula showing a non-arc shape that is a shape on the bus line and f (y) is represented by the following Formula 2.

$$f(y) = \frac{\left[\frac{y^2}{RDy}\right]}{1 + \sqrt{1 - (1+k)\left[\frac{y}{RDy}\right]^2}} + ADy^4 + AEy^6 + AFy^8 + AGy^{10} \quad \text{(Formula 2)}$$

Furthermore, g(y) denotes a radius of curvature at the y position in the subscanning direction (x direction) and $\theta(y)$ denotes an amount of skew at the y position. The above-mentioned g (y) and $\theta$ (y) are represented by Formulae 3 and 4, respectively.

$$g(y) = RDx(1 + BCy^2 + BDy^4 + BEy^6 + BFy^8 + BGy^{10}) \quad \text{(Formula 3)}$$

$$\theta(y) = ECy^2 + EDy^4 + EEy^6 \quad \text{(Formula 4)}$$

Herein, in the above-mentioned Formulae 2 to 4, RDy (mm) denotes a radius of curvature in the main scanning direction at the vertex, RDx (mm) denotes a radius of curvature in the subscanning direction, and k denotes a cone constant showing the shape of the bus line. Furthermore, AD, AE, AF and AG are high-order constants showing the bus line shape; BC, BD, BE, BF and BG are constants for determining the radius of curvature in the subscanning direction at the y position; and EC, ED and EE are skew constants for determining the skew amount at the y position.

Note here that the shape of the curved surface mirror is not limited to the shape represented by Formula 1 and may be the shape represented by any other formulae.

Furthermore, the explanation about the above-mentioned curved surface mirror can be applied to the below mentioned second and third embodiments.

EXAMPLE 1

Hereinafter, Example 1 of this embodiment will be shown in Table 1.

TABLE 1

| | Ymax = 110, rp = 17.32 βid = 136.1 | | | |
|---|---|---|---|---|
| | a | b | c | d |
| S | −1668.426 | −1241.294 | −999.219 | −831.750 |
| α | 10.754 | 10.754 | 10.754 | 10.754 |
| β1 | 7.225 | 8.446 | 9.778 | 11.198 |
| β2 | 10.829 | 12.388 | 14.036 | 15.849 |
| D1 | 210.000 | 218.000 | 226.000 | 233.000 |
| D2 | 258.129 | 244.194 | 230.111 | 215.000 |
| rdy | 616.211 | 626.438 | 635.372 | 645.407 |
| rdx | 235.850 | 235.902 | 235.106 | 232.523 |
| ad | $-3.3428 \times 10^{-10}$ | $-2.23481 \times 10^{-10}$ | $-1.15701 \times 10^{-10}$ | $9.33374 \times 10^{-12}$ |
| ae | $4.0478 \times 10^{-15}$ | $3.83487 \times 10^{-15}$ | $3.7455 \times 10^{-15}$ | $3.74481 \times 10^{-15}$ |
| af | 0 | 0 | 0 | 0 |

TABLE 1-continued

Ymax = 110, rp = 17.32 βid = 136.1

| | a | b | c | d |
|---|---|---|---|---|
| ag | 0 | 0 | 0 | 0 |
| bc | $-3.44817 \times 10^{-6}$ | $-3.64041 \times 10^{-6}$ | $-3.86263 \times 10^{-6}$ | $-4.1334 \times 10^{-6}$ |
| bd | $2.91375 \times 10^{-12}$ | $2.61043 \times 10^{-12}$ | $2.38719 \times 10^{-12}$ | $2.27976 \times 10^{-12}$ |
| be | 0 | 0 | 0 | 0 |
| bf | 0 | 0 | 0 | 0 |
| bg | 0 | 0 | 0 | 0 |
| ec | $8.68207 \times 10^{-7}$ | $9.63336 \times 10^{-7}$ | $1.06566 \times 10^{-6}$ | $1.18868 \times 10^{-6}$ |
| ed | $1.81277 \times 10^{-12}$ | $2.33653 \times 10^{-12}$ | $2.96632 \times 10^{-12}$ | $3.77721 \times 10^{-12}$ |
| ee | $1.39719 \times 10^{-17}$ | $1.62176 \times 10^{-17}$ | $1.92829 \times 10^{-17}$ | $2.37414 \times 10^{-17}$ |

In Table 1, a to d correspond to the surfaces 8*a* to 8*d* to be scanned. Furthermore, β1 (°) denotes an angle made by a central axis of each of the light fluxes from the respective semiconductor lasers 1*a* to 1*d* and the horizontal plane 6; β2 (°) denotes an angle made by a normal line (a broken line in FIG. 1) at each of the vertexes of the respective curved surface mirrors 7*a* to 7*d* and the central axis of each of the light fluxes; D1 (mm) denotes a distance between the deflection reflection point and each of the vertexes of the respective curved surface mirrors 7*a* to 7*d*; D2 (mm) denotes a distance between each of the vertexes of the respective curved surface mirror 7*a* to 7*d* and the center of the respective surfaces 8*a* to 8*d* to be scanned; rp (mm) denotes an inscribed radius of the polygon mirror 4; Ymax (mm) denotes a maximum image height; and α (°) denotes a polygon rotation angle corresponding to the maximum image height. In Example 1, the interval G (FIG. 1) between the surfaces to be scanned is 25 mm.

Furthermore, S (mm) denotes a value for showing the converging degree in the main scanning direction of the respective light fluxes traveling toward the polygon mirror 4. S (mm) denotes a distance between the image formation position in the main scanning direction and the deflection reflection point in the case where no optical system is present in the rear side. S (mm) is expressed in a manner in which the direction traveling toward the light source is defined as a forwarding direction. Therefore, when the value is expressed by a minus value, the light is converged light. These explanations for Table 1 can be applied to the below mentioned Tables 2 to 10 and 12 to 15.

In this Example, the optical scanning apparatus is designed so that the scanning speeds of the light fluxes scanning the surfaces 8*a* to 8*d* to be scanned are equal to each other. Therefore, in a to d, the polygon rotation angles a are the same values and the value is constant, 10.754 (°)

Figure 2A:
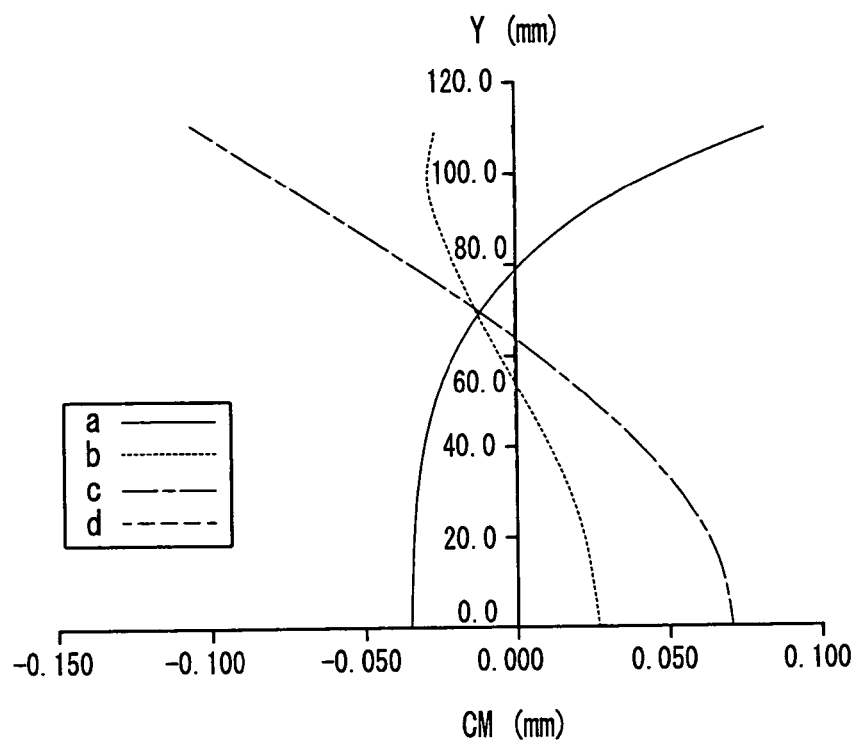
FIG. 2A shows a curvature of field in a main scanning direction in Example 1.
Figure 2B:
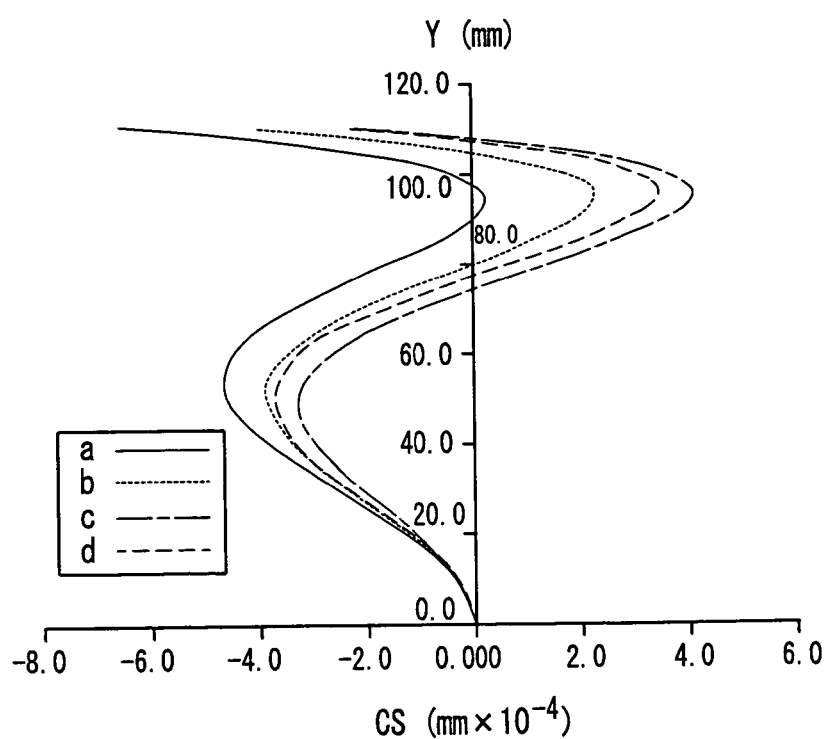
FIG. 2B shows a curvature of field in a subscanning direction in Example 1.
Figure 3A:
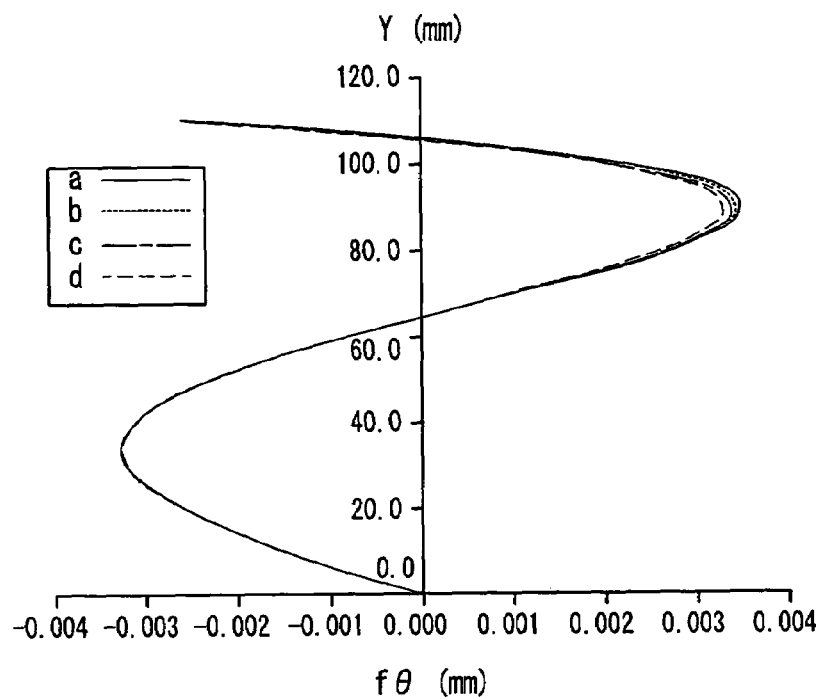
FIG. 3A shows a fθ error in Example 1.
Figure 3B:
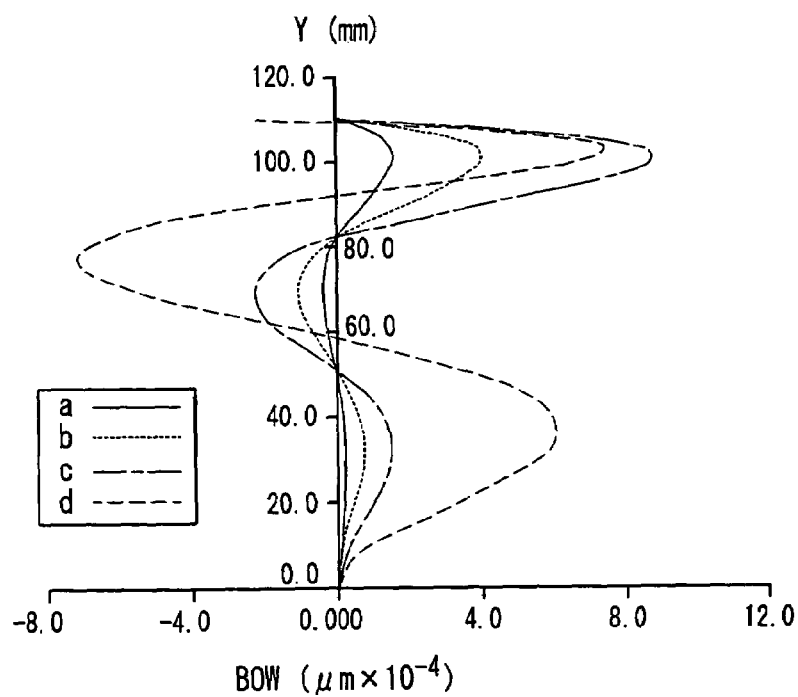
FIG. 3B shows a curvature of a scanning line in Example 1.

The measurement results of Example 1 are shown in FIGS. 2 and 3. FIG. 2A shows a curvature of field in the main scanning direction (CM); FIG. 2B shows a curvature of field in the subscanning direction (CS); FIG. 3A shows an error (fθ); and FIG. 3B shows a curvature of a scanning line (BOW). In each figure, a longitudinal axis Y shows an image height, and various lines a to d correspond to the surfaces 8*a* to 8*d* to be scanned.

The fθ error (ΔY) is an amount represented by the following Formula 5, wherein V (mm/°) denotes scanning speed per a unit rotation angle of the polygon in the vicinity of the center of scanning (i.e. speed in which the light flux scans the surface of the photosensitive drum); α (°) denotes a polygon rotation angle; and Y (mm) denotes an image height.

$$\Delta Y = Y - V \times \alpha \qquad \text{(Formula 5)}$$

The explanation for FIG. 2 is applied to the below mentioned explanations for FIGS. 4, 6, 8, 10, 12, 14, 16, 18, 20, 24, 26, 28 and 30. The explanation for FIG. 3 is applied to the below mentioned explanations for FIGS. 5, 7, 9, 11, 13, 15, 17, 19, 25, 27, 29 and 31.

As is apparent from FIGS. 2 and 3, Example 1 exhibits an excellent optical performance and small relative performance error for each scanning line, and realizes the high resolution.

Furthermore, since the scanning speeds are equal, the driving frequencies of the light sources can be equalized and the circuit can be simplified. Furthermore, as shown in Table 1, in Example 1, since the values S are different in a to d, respectively, and the difference in the converging degree in the main scanning direction of the respective light fluxes toward the optical deflection unit is tolerated, the curved surface mirrors can be disposed relatively freely, which is effective in the case where the interval between the curved surface mirrors is required to be a certain width or more.

Second Embodiment

The basic configuration of an optical scanning apparatus according to the second embodiment is the same as in the first embodiment shown in FIG. 1. The optical scanning apparatus according to the second embodiment is different from that of the first embodiment in that the optical scanning apparatus is designed and arranged so that the converging degrees of respective light fluxes by axial symmetric lenses 2*a* to 2*d* are equal to each other.

EXAMPLE 2

Hereinafter, Example 2 of this embodiment will be shown in the following Table 2. Note here that the interval G (FIG.1) of the surfaces to be scanned of this Example is 25 mm.

TABLE 2

Ymax = 110, rp = 17.32 βid = 84.6

| | a | b | c | d |
|---|---|---|---|---|
| S | −831.75 | −831.75 | −831.75 | −831.75 |
| α | 11.578 | 11.291 | 10.992 | 10.754 |
| β1 | 4.668 | 6.927 | 9.082 | 11.198 |
| β2 | 6.71 | 9.867 | 12.888 | 15.849 |
| D1 | 210 | 218 | 226 | 233 |
| D2 | 204.069 | 207.436 | 211.422 | 215 |
| rdy | 603.569 | 617.334 | 633.136 | 645.407 |
| rdx | 208.468 | 215.826 | 224.161 | 232.523 |
| ad | $-1.5298 \times 10^{-10}$ | $-1.0573 \times 10^{-10}$ | $-4.81127 \times 10^{-11}$ | $9.33374 \times 10^{-12}$ |
| ae | $3.23424 \times 10^{-15}$ | $3.43672 \times 10^{-15}$ | $3.58301 \times 10^{-15}$ | $3.74481 \times 10^{-15}$ |
| af | 0 | 0 | 0 | 0 |
| ag | 0 | 0 | 0 | 0 |
| bc | $-4.37597 \times 10^{-6}$ | $-4.27436 \times 10^{-6}$ | $-4.17504 \times 10^{-6}$ | $-4.1334 \times 10^{-6}$ |
| bd | $1.6345 \times 10^{-12}$ | $1.71522 \times 10^{-12}$ | $1.92969 \times 10^{-12}$ | $2.27976 \times 10^{-12}$ |
| be | 0 | 0 | 0 | 0 |
| bf | 0 | 0 | 0 | 0 |
| bg | 0 | 0 | 0 | 0 |
| ec | $5.90759 \times 10^{-7}$ | $8.20845 \times 10^{-7}$ | $1.01278 \times 10^{-6}$ | $1.18868 \times 10^{-6}$ |
| ed | $1.95745 \times 10^{-12}$ | $2.67856 \times 10^{-12}$ | $3.24304 \times 10^{-12}$ | $3.77721 \times 10^{-12}$ |
| ee | $1.27983 \times 10^{-17}$ | $1.73583 \times 10^{-17}$ | $2.06419 \times 10^{-17}$ | $2.37414 \times 10^{-17}$ |

In this Example, the optical scanning apparatus is designed and arranged so that the converging degree of light fluxes by axial symmetric lenses 2a to 2d are equal to each other. Therefore, in a to d, the distance s shows the same value and the value is −831.75. On the other hand, the difference in the scanning speeds of the respective light fluxes scanning the surfaces to be scanned is tolerated, and in a to d, the polygon rotation angles α are different from each other.

Figure 4A:
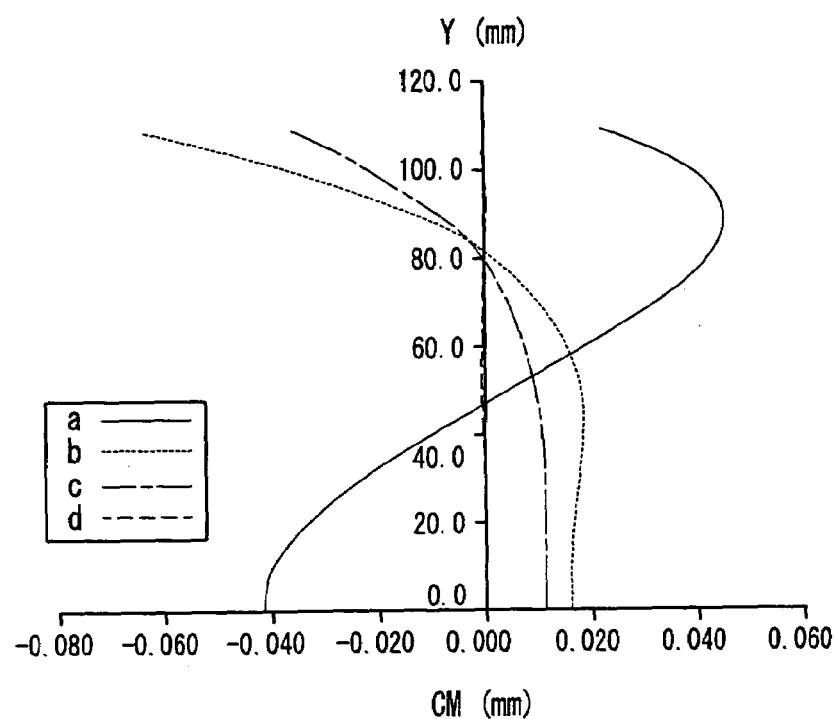
FIG. 4A shows a curvature of field in a main scanning direction in Example 2.
Figure 4B:
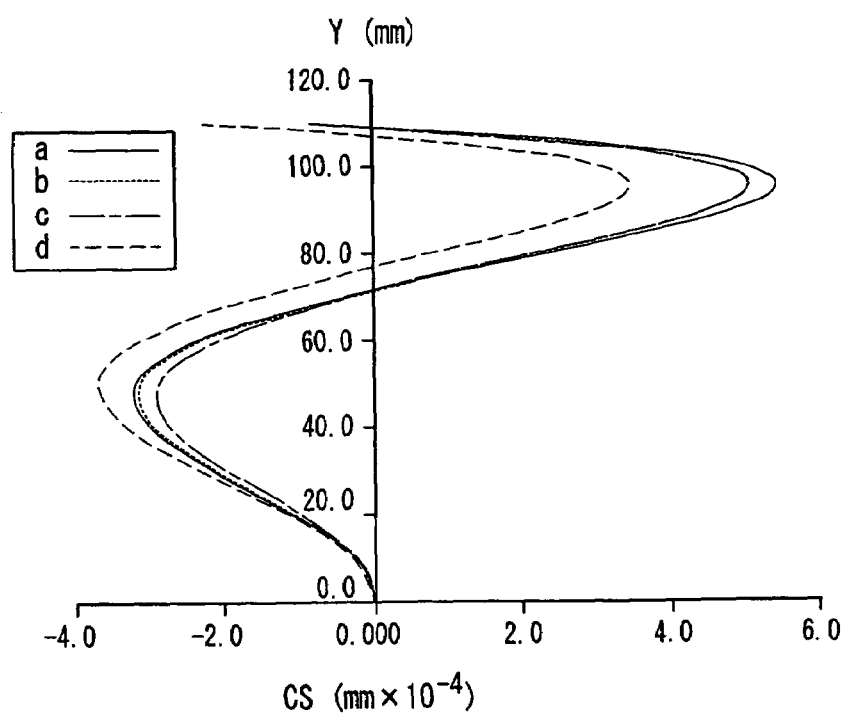
FIG. 4B shows a curvature of field in a subscanning direction in Example 2.
Figure 5A:
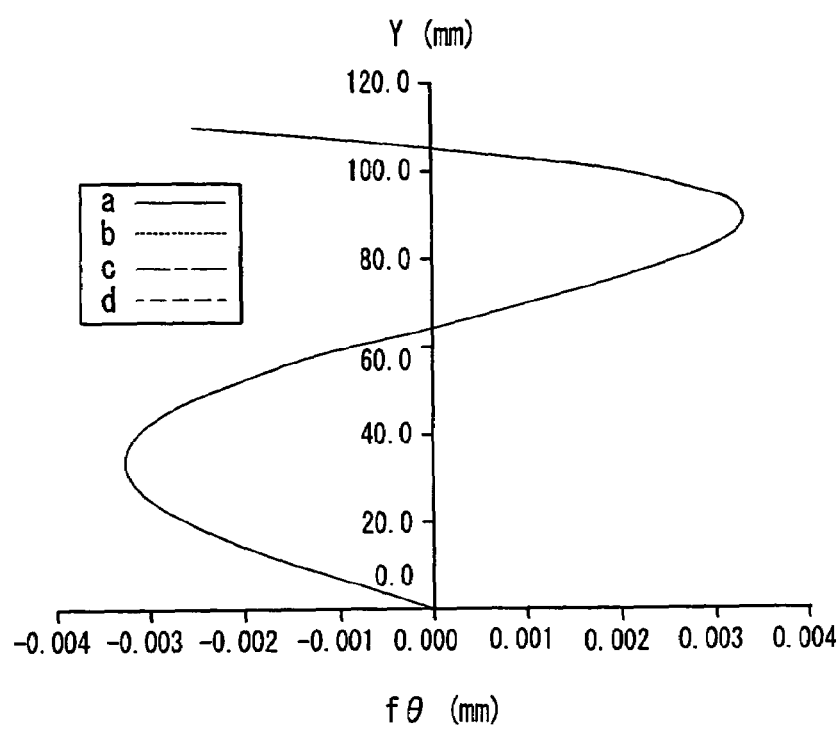
FIG. 5A shows a fθ error in Example 2.
Figure 5B:
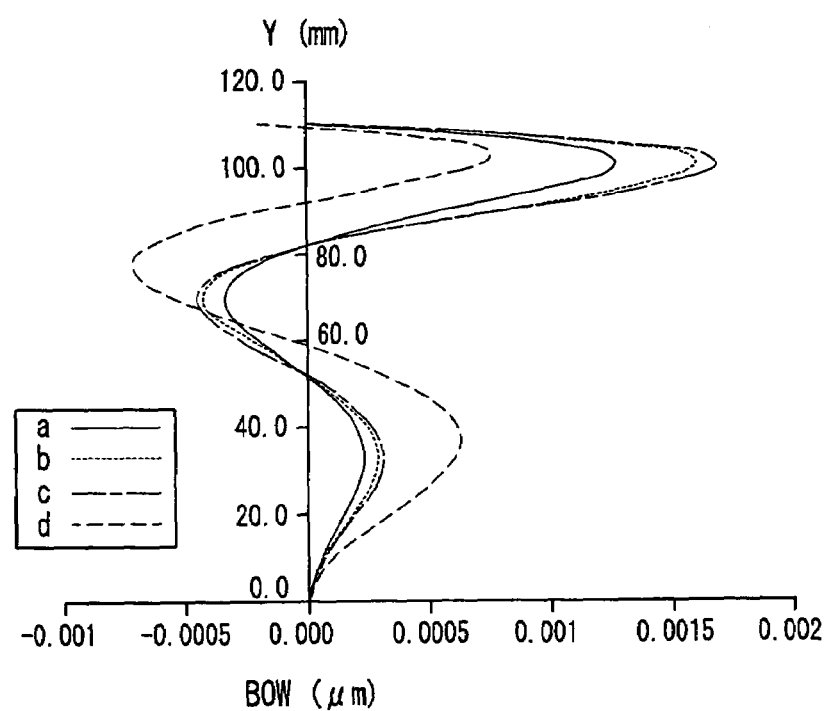
FIG. 5B shows a curvature of a scanning line in Example 2.

The measurement results of Example 2 are shown in FIGS. 4 and 5. As is apparent form FIGS. 4 and 5, Example 2 exhibits an excellent optical performance and small relative performance error for the respective scanning lines, and achieves the high resolution.

Furthermore, since the converging degrees of light fluxes in the main scanning direction toward the optical deflection unit are equal to each other, the same position adjusting means for the light sources and the first image formation optical system can be employed, thus enabling the adjusting cost to be reduced. Furthermore, since the difference in the scanning speeds of light fluxes scanning the respective surface to be scanned is tolerated, it is possible to place the curved surface mirrors relatively freely, which is effective in the case where the interval between the curved surface mirrors is required to be a certain width or more.

Third Embodiment

The basic configuration of an optical scanning apparatus according to the third embodiment is the same as in the first embodiment shown in FIG. 1. Similar to the first embodiment, the optical scanning apparatus according to the third embodiment is designed so that the scanning speeds of light fluxes scanning the surfaces 8a to 8d to be scanned are equal to each other. In addition to this, the optical scanning apparatus is designed and arranged so that the converging degrees of the respective light fluxes by the axial symmetric lenses 2a to 2d become equal to each other.

Herein, in a XZ plane, when Lm denotes a distance between the vertex of the curved surface mirror 7d positioned at the top and the vertex of the curved surface mirror 7a positioned at the bottom in the curved surface mirrors 7a to 7d; Li denotes a distance between the center of the surface 8d positioned at the top and the center of the surface 8a positioned at the bottom in the surfaces 8a to 8d to be scanned; D1 denotes a distance between the deflection surface 4a and the vertex of the curved surface mirror 7d positioned at the top; and D2 denotes a distance between the vertex of the curved surface mirror 7d positioned at the top and the center of the surface 8d positioned at the top, this embodiment satisfies the following Formula 6.

$$0.25 < (Lm/Li)/(D1/D2) < 0.45 \quad \text{(Formula 6)}$$

In Formula 6, when the value (Lm/Li)/(D1/D2) is smaller than the lower limit, the intervals between the reflection surface are reduced, thus making it difficult to separate the effective regions that reflect light fluxes because they are overlapped with each other. When the value (Lm/Li)/(D1/D2) is larger than the upper limit, a 2.5 mm or more curvature of field in the main scanning direction occurs, thus making it difficult to satisfy the beam diameter of 60–80 μm or less at the strength of $1/e^2$ for achieving a 400 DPI resolution.

Furthermore, in the XZ plane, βr denotes an angle made by the central axis positioned at the top and the central axis positioned at the bottom in the central axes toward the plurality of surfaces 8a to 8d to be scanned, and this embodiment satisfies the following Formula 7.

$$1.0 < (D1+D2) \cdot \tan \beta r / Li < 1.6 \quad \text{(Formula 7)}$$

In the Formula 7, when the value $(D1+D2) \cdot \tan \beta r / Li$ is smaller than the lower limit, a 2.5 mm or more curvature of field in the main scanning direction occurs, thus making it difficult to satisfy a beam diameter of 60–80 μm or less at the strength of $1/e^2$ for achieving a 400 DPI resolution. When the value $(D1+D2) \cdot \tan \beta r / Li$ is larger than the upper limit, the intervals between the reflection surface tends to be reduced, thus making it difficult to separate the effective regions that reflect light fluxes because they are overlapped with each other.

In order to achieve the higher resolution, it is preferable that the below mentioned Formula 8 is satisfied to further correct the curvature of field in the main scanning direction.

$$1.2 < (D1+D2) \cdot \tan \beta r / Li < 1.6 \quad \text{(Formula 8)}$$

In Formula 8, when the value $(D1+D2) \cdot \tan \beta r/Li$ is smaller than the lower limit, a 1.0 mm or more curvature of field in the main scanning direction occurs, thus making it difficult to satisfy the beam diameter of 40–60 μm or less at the strength of $1/e^2$ for achieving a 600 DPI resolution. When the value $(D1+D2) \cdot \tan \beta r/Li$ is larger than the upper limit, the intervals between the reflection surfaces tends to be reduced, thus making it difficult to separate the effective regions that reflect light fluxes because they are overlapped with each other.

Furthermore, in a XZ plane, when Δβ denotes an angle made by a line connecting the vertex of the curved surface mirror 7d positioned at the top and the vertex of the curved surface mirror 7a positioned at the bottom in the curved surface mirrors 7a to 7d and a line connecting the center of the surface 8d at the top and the center of the surface 8a positioned at the bottom in the surfaces 8a to 8d to be scanned, and β2 denotes an angle made by a normal line at the vertex of the curved surface mirror 7d positioned at the top and the light flux from the deflection surface 4a, this embodiment satisfies the following Formula 9.

$$-1.8 < \Delta\beta/\beta 2 - 0.2(D1/D2) < 0.4 \qquad \text{(Formula 9)}$$

In Formula 9, when the value $\Delta\beta/\beta 2 - 0.2$ (D1/D2) is smaller or larger than the lower limit or the upper limit, a 2.5 mm or more curvature of field in the scanning direction occurs, thus making it difficult to satisfy the beam diameter of 60–80 μm or less at the strength of $1/e^2$ for achieving a 400 DPI resolution.

In order to achieve the higher resolution, the following Formula 10 is satisfied.

$$-1.4 < \Delta\beta/\beta 2 - 0.2(D1/D2) < 0 \qquad \text{(Formula 10)}$$

In Formula 10, when the value $\Delta\beta/\beta 2 - 0.2$ (D1/D2) is smaller or larger than the lower limit or the upper limit, a 1.0 mm or more curvature of field in the scanning direction occurs, thus making it difficult to satisfy the beam diameter of 40–60 μm or less at the strength of $1/e^2$ for achieving a 600 DPI resolution.

In order to achieve the higher resolution, the following Formula 11 is satisfied.

$$-0.9 < \Delta\beta/\beta 2 - 0.2(D1/D2) < -0.5 \qquad \text{(Formula 11)}$$

In Formula 11, when the value $\Delta\beta/\beta 2 - 0.2$ (D1/D2) is smaller or larger than the lower limit or the upper limit, 0.5 mm or more curvature of field in the scanning direction occurs, thus making it difficult to satisfy the beam diameter of 25–40 μm or less at the strength of $1/e^2$ for achieving a 1200 DPI resolution.

Furthermore, a place that is perpendicular to the XZ plane and includes normal lines at the vertexes of the plurality of curved surface mirrors 7a to 7d is defined as a YZ plane. When at the vertex of the curved surface mirror at the top in the plurality of curved surface mirrors, a radius of curvature of the XZ cross section is represented by RxH and a radius of curvature of the YZ cross section is represented by RyH; and in the plurality of curved surface mirrors, a radius of curvature of the XZ cross section at the vertex of the curved surface mirror at the bottom is represented by RxL and a radius of curvature of YZ cross section is represented by RyL, this embodiment satisfies the following Formula 12.

$$0.001 < [1 - RyH \cdot RxL/RxH \cdot RyL]/\tan \beta r < 0.012 \qquad \text{(Formula 12)}$$

In Formula 12, when the value $[1 - RyH \cdot RxL/RxH \cdot RyL]/\tan \beta r$ is smaller or larger than the lower limit or the upper limit, a 2.5 mm or more curvature of field in the main scanning direction occurs, thus making it difficult to satisfy the beam diameter of 60–80 μm or less at the strength of $1/e^2$ for achieving a 400 DPI resolution.

In order to achieve the further high resolution, it is preferable that the following Formula is satisfied.

$$0.003 < [1 - RyH \cdot RxL/RxH \cdot RyL]/\tan \beta r < 0.007 \qquad \text{(Formula 13)}$$

In Formula 13, when the value $[1 - RyH \cdot RxL/RxH \cdot RyL]/\tan \beta r$ is smaller or larger than the lower limit or the upper limit, a 1.0 mm or more curvature of field in the main scanning direction occurs, thus making it difficult to satisfy the beam diameter of 40–60 μm or less at the strength of $1/e^2$ for achieving a 600 DPI resolution.

Hereinafter, Examples 3 to 10 are shown in Tables 3 to 10. Note here that the interval G (FIG. 1) between the surfaces to be scanned in Examples 8 and 9 is 30 mm and the interval between the surfaces to be scanned in the other Examples is 25 mm.

EXAMPLE 3

TABLE 3

Ymax = 110, rp = 17.32 Lm = 28.23, Li = 75,
βm = 88.7, βi = −88.4, Δβ = −7.9, βr = 12.658, βid = 76.1

|  | a | b | c | d |
|---|---|---|---|---|
| S | −831.75 | −831.75 | −831.75 | −831.75 |
| α | 10.754 | 10.754 | 10.754 | 10.754 |
| β1 | 4.248 | 6.575 | 8.898 | 11.198 |
| β2 | 6.045 | 9.304 | 12.568 | 15.849 |
| D1 | 229.852 | 231.258 | 232.334 | 233 |
| D2 | 212.58 | 212.936 | 213.736 | 215 |
| rdy | 653.776 | 651.087 | 648.311 | 645.407 |
| rdx | 222.16 | 224.721 | 228.16 | 232.523 |
| ad | $-9.7269 \times 10^{-11}$ | $-7.63092 \times 10^{-11}$ | $-4.11895 \times 10^{-11}$ | $9.33374 \times 10^{-12}$ |
| ae | $3.22873 \times 10^{-15}$ | $3.36242 \times 10^{-15}$ | $3.53266 \times 10^{-15}$ | $3.74481 \times 10^{-15}$ |
| af | 0 | 0 | 0 | 0 |
| ag | 0 | 0 | 0 | 0 |
| bc | −0.000003855 | $-3.92472 \times 10^{-6}$ | $-4.01609 \times 10^{-6}$ | $-4.1334 \times 10^{-6}$ |
| bd | $7.87762 \times 10^{-13}$ | $1.09648 \times 10^{-12}$ | $1.58297 \times 10^{-12}$ | $2.27976 \times 10^{-12}$ |
| be | 0 | 0 | 0 | 0 |
| bf | 0 | 0 | 0 | 0 |
| bg | 0 | 0 | 0 | 0 |

TABLE 3-continued

Ymax = 110, rp = 17.32 Lm = 28.23, Li = 75,
βm = 88.7, βi = −88.4, Δβ = −7.9, βr = 12.658, βid = 76.1

|    | a | b | c | d |
|----|---|---|---|---|
| ec | $4.56683 \times 10^{-7}$ | $7.00033 \times 10^{-7}$ | $9.43292 \times 10^{-7}$ | $1.18868 \times 10^{-6}$ |
| ed | $1.36178 \times 10^{-12}$ | $2.12776 \times 10^{-12}$ | $2.92834 \times 10^{-12}$ | $3.77721 \times 10^{-12}$ |
| ee | $8.6341 \times 10^{-18}$ | $1.34749 \times 10^{-17}$ | $1.84722 \times 10^{-17}$ | $2.37414 \times 10^{-17}$ |

EXAMPLE 4

TABLE 4

Ymax = 110, rp = 17.32 Lm = 33.45, Li = 75,
βm = 89.4, βi = −81.5, Δβ = −9.1, βr = 16.305, βid = 72.0

|     | a | b | c | d |
|-----|---|---|---|---|
| S   | −517.023 | −517.023 | −517.023 | −517.023 |
| α   | 13.36 | 13.36 | 13.36 | 13.36 |
| β1  | 5.874 | 9.087 | 12.295 | 15.46 |
| β2  | 8.055 | 12.353 | 16.66 | 21 |
| D1  | 194.121 | 196.304 | 198.309 | 200 |
| D2  | 147.996 | 148.147 | 148.799 | 150 |
| rdy | 541.33 | 537.647 | 534.414 | 531.59 |
| rdx | 169.622 | 172.86 | 177.471 | 183.624 |
| ad  | $6.71881 \times 10^{-11}$ | $1.4182 \times 10^{-10}$ | $2.68056 \times 10^{-10}$ | $4.51761 \times 10^{-10}$ |
| ae  | $1.131 \times 10^{-14}$ | $1.21995 \times 10^{-14}$ | $1.34336 \times 10^{-14}$ | $1.50879 \times 10^{-14}$ |
| af  | 0 | 0 | 0 | 0 |
| ag  | 0 | 0 | 0 | 0 |
| bc  | $-6.79786 \times 10^{-6}$ | $-6.98992 \times 10^{-6}$ | $-7.23425 \times 10^{-6}$ | $-7.54735 \times 10^{-6}$ |
| bd  | $7.80338 \times 10^{-13}$ | $1.95133 \times 10^{-12}$ | $3.77159 \times 10^{-12}$ | $6.4912 \times 10^{-12}$ |
| be  | 0 | 0 | 0 | 0 |
| bf  | 0 | 0 | 0 | 0 |
| bg  | 0 | 0 | 0 | 0 |
| ec  | $9.3325 \times 10^{-7}$ | $1.4224 \times 10^{-6}$ | $1.90659 \times 10^{-6}$ | $2.39011 \times 10^{-6}$ |
| ed  | $5.42731 \times 10^{-12}$ | $8.51211 \times 10^{-12}$ | $1.17814 \times 10^{-11}$ | $1.53023 \times 10^{-11}$ |
| ee  | $5.6574 \times 10^{-17}$ | $8.9249 \times 10^{-17}$ | $1.23902 \times 10^{-16}$ | $1.62202 \times 10^{-16}$ |

EXAMPLE 5

TABLE 5

Ymax = 110, rp = 17.32 Lm = 34.19, Li = 75,
βm = −89.8, βi = −84.2, Δβ = −5.6, βr = 11.366, βid = 78.3

|     | a | b | c | d |
|-----|---|---|---|---|
| S   | −724.726 | −724.726 | −724.726 | −724.726 |
| α   | 9.193 | 9.193 | 9.193 | 9.193 |
| β1  | 3.57 | 5.81 | 8.05 | 10.28 |
| β2  | 4.837 | 7.846 | 10.857 | 13.876 |
| D1  | 287.776 | 289.294 | 290.711 | 292 |
| D2  | 207.042 | 207.009 | 207.325 | 208 |
| rdy | 784.342 | 781.795 | 779.572 | 777.663 |
| rdx | 241.682 | 243.61 | 246.447 | 250.245 |
| ad  | $5.98425 \times 10^{-11}$ | $7.06507 \times 10^{-11}$ | $8.93966 \times 10^{-11}$ | $1.16415 \times 10^{-10}$ |
| ae  | $1.73124 \times 10^{-15}$ | $1.79139 \times 10^{-15}$ | $1.87033 \times 10^{-15}$ | $1.97021 \times 10^{-15}$ |
| af  | 0 | 0 | 0 | 0 |
| ag  | 0 | 0 | 0 | 0 |
| bc  | $-3.27156 \times 10^{-6}$ | $-3.31365 \times 10^{-6}$ | $-3.3659 \times 10^{-6}$ | $-3.42967 \times 10^{-6}$ |
| bd  | $-3.98715 \times 10^{-13}$ | $-2.74171 \times 10^{-13}$ | $-7.97064 \times 10^{-14}$ | $1.91601 \times 10^{-13}$ |
| be  | 0 | 0 | 0 | 0 |
| bf  | 0 | 0 | 0 | 0 |
| bg  | 0 | 0 | 0 | 0 |
| ec  | $2.67766 \times 10^{-7}$ | $4.33151 \times 10^{-7}$ | $5.97705 \times 10^{-7}$ | $7.61714 \times 10^{-7}$ |
| ed  | $7.66104 \times 10^{-13}$ | $1.25628 \times 10^{-12}$ | $1.75972 \times 10^{-12}$ | $2.27937 \times 10^{-12}$ |
| ee  | $3.77887 \times 10^{-18}$ | $6.20546 \times 10^{-18}$ | $8.68927 \times 10^{-18}$ | $1.12807 \times 10^{-17}$ |

EXAMPLE 6

TABLE 6

Ymax = 110, rp = 17.32 Lm = 17.20, Li = 75,
βm = 88.2, βi = −80.7, Δβ = −11.1, βr = 18.779, βid = 73.5

|    | a | b | c | d |
|---|---|---|---|---|
| S  | 6422.578 | 6422.578 | 6422.578 | 6422.578 |
| α  | 18.203 | 18.203 | 18.203 | 18.203 |
| β1 | 3.24 | 6.256 | 9.29 | 12.232 |
| β2 | 5.115 | 9.683 | 14.285 | 19 |
| D1 | 108.213 | 110.485 | 111.28 | 110 |
| D2 | 176.02 | 177.09 | 178.45 | 180 |
| rdy | 341.839 | 339.616 | 336.216 | 331.277 |
| rdx | 134.562 | 138.039 | 141.45 | 144.418 |
| ad | $-3.9237 \times 10^{-9}$ | $-3.80102 \times 10^{-9}$ | $-3.56912 \times 10^{-9}$ | $-3.19808 \times 10^{-9}$ |
| ae | $4.80028 \times 10^{-14}$ | $5.00701 \times 10^{-14}$ | $5.31794 \times 10^{-14}$ | $5.82468 \times 10^{-14}$ |
| af | 0 | 0 | 0 | 0 |
| ag | 0 | 0 | 0 | 0 |
| bc | $-9.34053 \times 10^{-6}$ | $-9.64419 \times 10^{-6}$ | $-1.021 \times 10^{-5}$ | $-1.11803 \times 10^{-5}$ |
| bd | $6.06937 \times 10^{-11}$ | $6.08146 \times 10^{-11}$ | $6.86963 \times 10^{-11}$ | $8.65438 \times 10^{-11}$ |
| be | 0 | 0 | 0 | 0 |
| bf | 0 | 0 | 0 | 0 |
| bg | 0 | 0 | 0 | 0 |
| ec | $1.32118 \times 10^{-6}$ | $2.44665 \times 10^{-6}$ | $3.59861 \times 10^{-6}$ | $4.89995 \times 10^{-6}$ |
| ed | $6.04532 \times 10^{-12}$ | $1.1873 \times 10^{-11}$ | $1.86703 \times 10^{-11}$ | $2.74548 \times 10^{-11}$ |
| ee | $9.60219 \times 10^{-17}$ | $1.97129 \times 10^{-16}$ | $3.0581 \times 10^{-16}$ | $4.29185 \times 10^{-16}$ |

EXAMPLE 7

TABLE 7

Ymax = 110, rp = 17.32 Lm = 34.23, Li = 90,
βm = 89.1, βi = −83.9, Δβ = −7.0. βr = 15.150, βid = 75.6

|    | a | b | c | d |
|---|---|---|---|---|
| S  | −818.216 | −818.216 | −818.216 | −818.216 |
| α  | 10.676 | 10.676 | 10.676 | 10.676 |
| β1 | 2.889 | 5.678 | 8.469 | 11.228 |
| β2 | 4.104 | 8.008 | 11.918 | 15.849 |
| D1 | 232.179 | 233.884 | 235.147 | 235.849 |
| D2 | 211.618 | 211.822 | 212.656 | 214.151 |
| rdy | 660.914 | 657.928 | 654.856 | 651.647 |
| rdx | 222.036 | 224.541 | 228.302 | 233.394 |
| ad | $-9.13276 \times 10^{-11}$ | $-7.36656 \times 10^{-11}$ | $-3.64738 \times 10^{-11}$ | $2.20612 \times 10^{-11}$ |
| ae | $3.0891 \times 10^{-15}$ | $3.2177 \times 10^{-15}$ | $3.39776 \times 10^{-15}$ | $3.63855 \times 10^{-15}$ |
| af | 0 | 0 | 0 | 0 |
| ag | 0 | 0 | 0 | 0 |
| bc | $-3.80689 \times 10^{-6}$ | $-3.8755 \times 10^{-6}$ | $-3.97299 \times 10^{-6}$ | $-4.10579 \times 10^{-6}$ |
| bd | $5.62477 \times 10^{-13}$ | $8.33077 \times 10^{-13}$ | $1.33438 \times 10^{-12}$ | $2.12517 \times 10^{-12}$ |
| be | 0 | 0 | 0 | 0 |
| bf | 0 | 0 | 0 | 0 |
| bg | 0 | 0 | 0 | 0 |
| ec | $3.05528 \times 10^{-7}$ | $5.93219 \times 10^{-7}$ | $8.8016 \times 10^{-7}$ | $1.16973 \times 10^{-6}$ |
| ed | $9.0783 \times 10^{-13}$ | $1.79876 \times 10^{-12}$ | $2.73097 \times 10^{-12}$ | $3.72569 \times 10^{-12}$ |
| ee | $5.68528 \times 10^{-18}$ | $1.12608 \times 10^{-17}$ | $1.70311 \times 10^{-17}$ | $2.31302 \times 10^{-17}$ |

EXAMPLE 8

TABLE 8

Ymax = 110, rp = 17.32 Lm = 32.73, Li = 90,
βm = 89.4, βi = −84.4, Δβ = −6.2, βr = 18.51, βid = 75.0

|    | a | b | c | d |
|---|---|---|---|---|
| S  | −703.7 | −703.7 | −703.7 | −703.7 |
| α  | 13.02 | 13.02 | 13.02 | 13.02 |

TABLE 8-continued

Ymax = 110, rp = 17.32 Lm = 32.73, Li = 90,
βm = 89.4, βi = −84.4, Δβ = −6.2, βr = 18.51, βid = 75.0

|  | a | b | c | d |
|---|---|---|---|---|
| β1 | 1.2 | 4.5 | 7.85 | 11.12 |
| β2 | 1.636 | 6.359 | 11.086 | 15.849 |
| D1 | 186.809 | 188.552 | 189.693 | 190 |
| D2 | 177.71 | 177.707 | 178.458 | 180 |
| rdy | 541.7 | 539.004 | 536.18 | 533.119 |
| rdx | 182.219 | 184.1 | 187.4 | 192.169 |
| ad | $-2.68732 \times 10^{-10}$ | $-2.51397 \times 10^{-10}$ | $-1.82965 \times 10^{-10}$ | $-5.90318 \times 10^{-11}$ |
| ae | $8.11509 \times 10^{-15}$ | $8.42121 \times 10^{-15}$ | $8.93802 \times 10^{-15}$ | $9.70664 \times 10^{-15}$ |
| af | 0 | 0 | 0 | 0 |
| ag | 0 | 0 | 0 | 0 |
| bc | $-5.55776 \times 10^{-6}$ | $-5.6488 \times 10^{-6}$ | $-5.80335 \times 10^{-6}$ | $-6.03734 \times 10^{-6}$ |
| bd | $2.29322 \times 10^{-12}$ | $2.66454 \times 10^{-12}$ | $3.76466 \times 10^{-12}$ | $5.77324 \times 10^{-12}$ |
| be | 0 | 0 | 0 | 0 |
| bf | 0 | 0 | 0 | 0 |
| bg | 0 | 0 | 0 | 0 |
| ec | $1.81519 \times 10^{-7}$ | $7.02059 \times 10^{-7}$ | $1.21976 \times 10^{-6}$ | $1.74605 \times 10^{-6}$ |
| ed | $7.80955 \times 10^{-13}$ | $3.06105 \times 10^{-12}$ | $5.45264 \times 10^{-12}$ | $8.03852 \times 10^{-12}$ |
| ee | $7.0316 \times 10^{-18}$ | $2.80456 \times 10^{-17}$ | $4.98639 \times 10^{-17}$ | $7.33346 \times 10^{-17}$ |

EXAMPLE 9

TABLE 9

Ymax = 110, rp = 17.32 Lm = 34.83, Li = 75,
βm = −56.6, βi = −63.7, Δβ = 7.1, βr = 10.72, βid = 95.8

|  | a | b | c | d |
|---|---|---|---|---|
| S | −831.75 | −831.75 | −831.75 | −831.75 |
| α | 10.754 | 10.754 | 10.754 | 10.754 |
| β1 | 4.421 | 6.548 | 8.811 | 11.198 |
| β2 | 7.101 | 10.056 | 12.978 | 15.849 |
| D1 | 210 | 217.523 | 225.089 | 233 |
| D2 | 218.649 | 217.165 | 215.942 | 215 |
| rdy | 676.06 | 665.498 | 655.33 | 645.407 |
| rdx | 215.945 | 220.785 | 226.247 | 232.523 |
| ad | $8.79999 \times 10^{-11}$ | $3.07843 \times 10^{-11}$ | $7.44474 \times 10^{-12}$ | $9.33374 \times 10^{-12}$ |
| ae | $1.61038 \times 10^{-15}$ | $2.60168 \times 10^{-15}$ | $3.2645 \times 10^{-15}$ | $3.74481 \times 10^{-15}$ |
| af | 0 | 0 | 0 | 0 |
| ag | 0 | 0 | 0 | 0 |
| bc | $-3.67508 \times 10^{-6}$ | $-3.82068 \times 10^{-6}$ | $-3.97497 \times 10^{-6}$ | $-4.1334 \times 10^{-6}$ |
| bd | $1.46166 \times 10^{-12}$ | $1.70107 \times 10^{-12}$ | $1.99267 \times 10^{-12}$ | $2.27976 \times 10^{-12}$ |
| be | 0 | 0 | 0 | 0 |
| bf | 0 | 0 | 0 | 0 |
| bg | 0 | 0 | 0 | 0 |
| ec | $5.75462 \times 10^{-7}$ | $7.9403 \times 10^{-7}$ | $9.99126 \times 10^{-7}$ | $1.18868 \times 10^{-6}$ |
| ed | $1.60647 \times 10^{-12}$ | $2.27663 \times 10^{-12}$ | $2.99976 \times 10^{-12}$ | $3.77721 \times 10^{-12}$ |
| ee | $7.07994 \times 10^{-18}$ | $1.25718 \times 10^{-17}$ | $1.81569 \times 10^{-17}$ | $2.37414 \times 10^{-17}$ |

EXAMPLE 10

TABLE 10

Ymax = 110, rp = 17.32 Lm = 28.36, Li = 75,
βm = 74.1, βi = −89.9, Δβ = −16.0, βr = 12.996, βid = 69.6

|  | a | b | c | d |
|---|---|---|---|---|
| S | −831.75 | −831.75 | −831.75 | −831.75 |
| α | 10.754 | 10.754 | 10.754 | 10.754 |
| β1 | 4.348 | 6.677 | 8.958 | 11.198 |
| β2 | 5.926 | 9.239 | 12.56 | 15.849 |
| D1 | 237 | 235.341 | 233.939 | 233 |
| D2 | 211.135 | 211.153 | 212.362 | 215 |
| rdy | 645.09 | 647.443 | 647.82 | 645.407 |

TABLE 10-continued

Ymax = 110, rp = 17.32 Lm = 28.36, Li = 75,
βm = 74.1, βi = −89.9, Δβ = −16.0, βr = 12.996, βid = 69.6

| | a | b | c | d |
|---|---|---|---|---|
| rdx | 224.565 | 225.562 | 228.134 | 232.523 |
| ad | $-1.30507 \times 10^{-10}$ | $-9.01571 \times 10^{-11}$ | $-4.21271 \times 10^{-11}$ | $9.33374 \times 10^{-12}$ |
| ae | $3.27837 \times 10^{-15}$ | $3.48749 \times 10^{-15}$ | $3.66036 \times 10^{-15}$ | $3.74481 \times 10^{-15}$ |
| af | 0 | 0 | 0 | 0 |
| ag | 0 | 0 | 0 | 0 |
| bc | $-3.91655 \times 10^{-6}$ | $-3.96791 \times 10^{-6}$ | $-4.03977 \times 10^{-6}$ | $-4.1334 \times 10^{-6}$ |
| bd | $5.49578 \times 10^{-13}$ | $9.26067 \times 10^{-13}$ | $1.49491 \times 10^{-12}$ | $2.27976 \times 10^{-12}$ |
| be | 0 | 0 | 0 | 0 |
| bf | 0 | 0 | 0 | 0 |
| bg | 0 | 0 | 0 | 0 |
| ec | $4.36758 \times 10^{-7}$ | $6.86146 \times 10^{-7}$ | $9.38497 \times 10^{-7}$ | $1.18868 \times 10^{-6}$ |
| ed | $1.36287 \times 10^{-12}$ | $2.14641 \times 10^{-12}$ | $2.95414 \times 10^{-12}$ | $3.77721 \times 10^{-12}$ |
| ee | $8.6353 \times 10^{-18}$ | $1.37242 \times 10^{-17}$ | $1.88497 \times 10^{-17}$ | $2.37414 \times 10^{-17}$ |

Any of Examples 3 to 10 satisfy the above-mentioned Formulae 6, 7, 9 and 12; and Examples 3 to 8 satisfy the above-mentioned Formulae 8, 11 and 13. The numeric values corresponding to each formula of each Example is shown in the following Table 11.

TABLE 11

| | A | B | C | Conditional formula of radius of curvature | Curvature of field in main scanning direction |
|---|---|---|---|---|---|
| Ex. 3 | 0.35 | 1.34 | −0.71 | $4.49 \times 10^{-3}$ | 0.05 |
| Ex. 4 | 0.33 | 1.37 | −0.70 | $5.70 \times 10^{-3}$ | 0.1 |
| Ex. 5 | 0.33 | 1.34 | −0.69 | $3.73 \times 10^{-3}$ | 0.04 |
| Ex. 6 | 0.38 | 1.32 | −0.70 | $5.17 \times 10^{-3}$ | 0.5 |
| Ex. 7 | 0.35 | 1.35 | −0.66 | $4.09 \times 10^{-3}$ | 0.07 |
| Ex. 8 | 0.35 | 1.38 | −0.60 | $3.61 \times 10^{-3}$ | 0.13 |
| Ex. 9 | 0.43 | 1.13 | 0.23 | $1.06 \times 10^{-2}$ | 2 |
| Ex. 10 | 0.35 | 1.38 | −1.23 | $2.60 \times 10^{-3}$ | 1.3 |

Ex. = Example
A: (Lm/Li)/(D1/D2)
B: (D1 + D2) tanβr/Li
C: Δβ/β2 − 0.2 (D1/D2)

In Table 11, conditional formula of radius of curvature is Formula 12 or Formula 13.

Figure 6A:
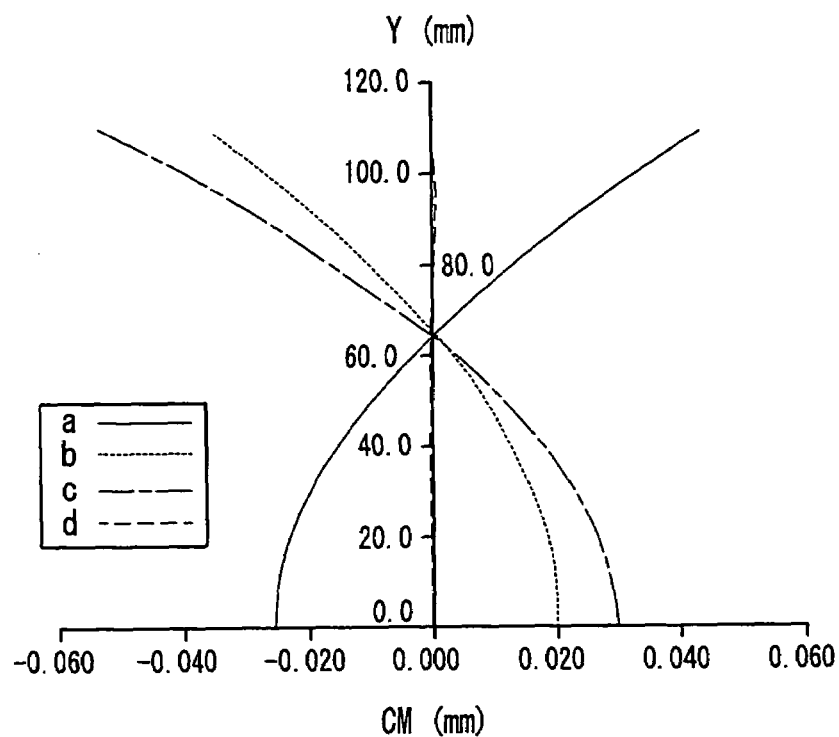
FIG. 6A shows a curvature of field in a main scanning direction in Example 3.
Figure 6B:
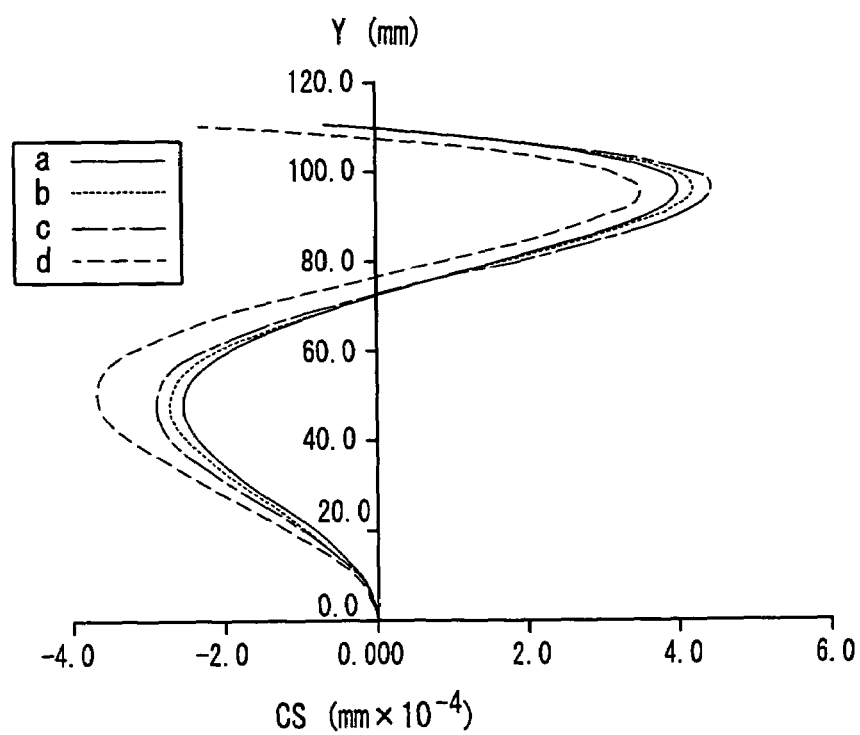
FIG. 6B shows a curvature of field in a subscanning direction in Example 3.
Figure 7A:
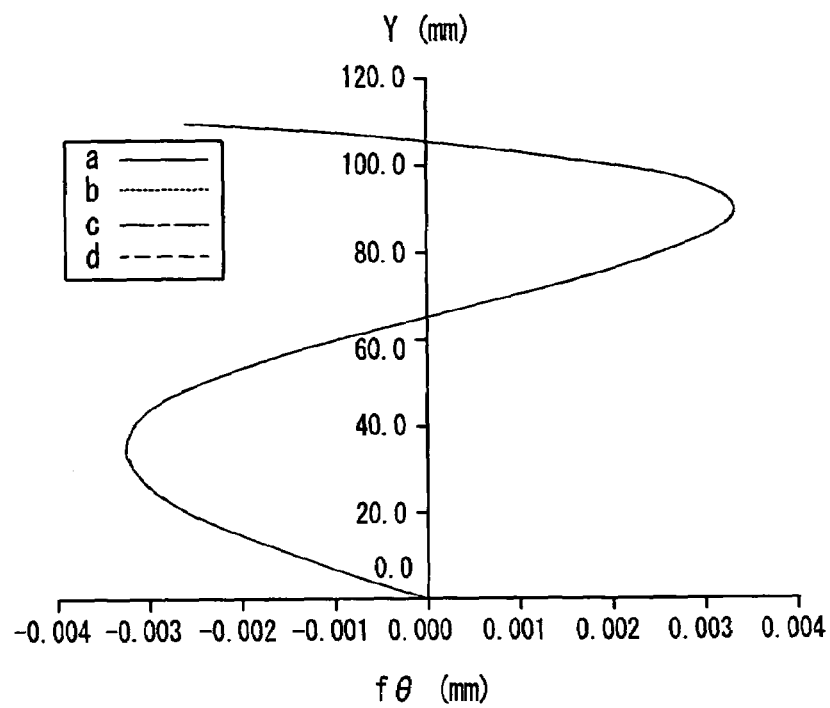
FIG. 7A shows a fθ error in Example 3.
Figure 7B:
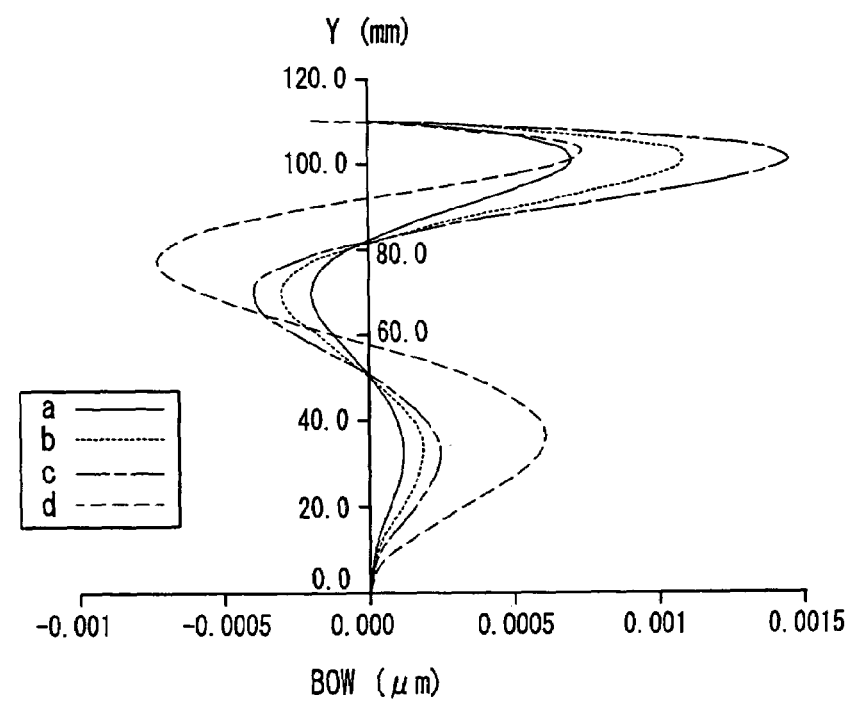
FIG. 7B shows a curvature of a scanning line in Example 3.
Figure 8A:
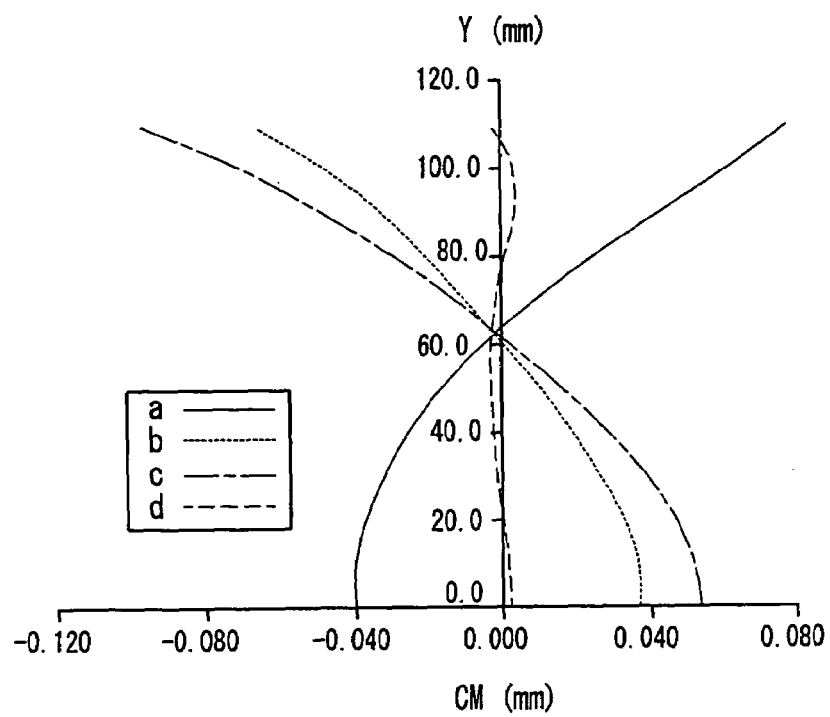
FIG. 8A shows a curvature of field in a main scanning direction in Example 4.
Figure 8B:
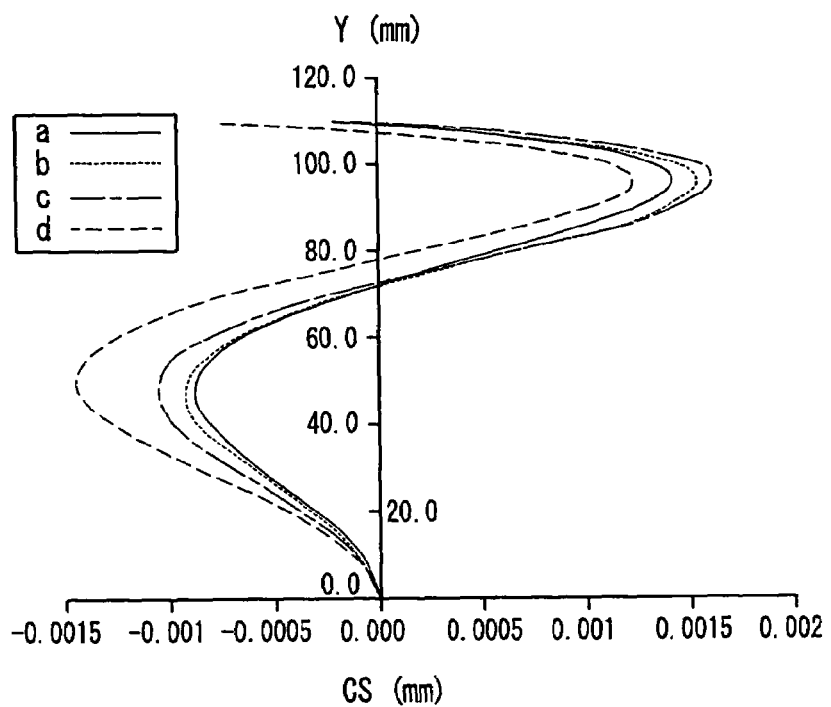
FIG. 8B shows a curvature of field in a subscanning direction in Example 4.
Figure 9A:
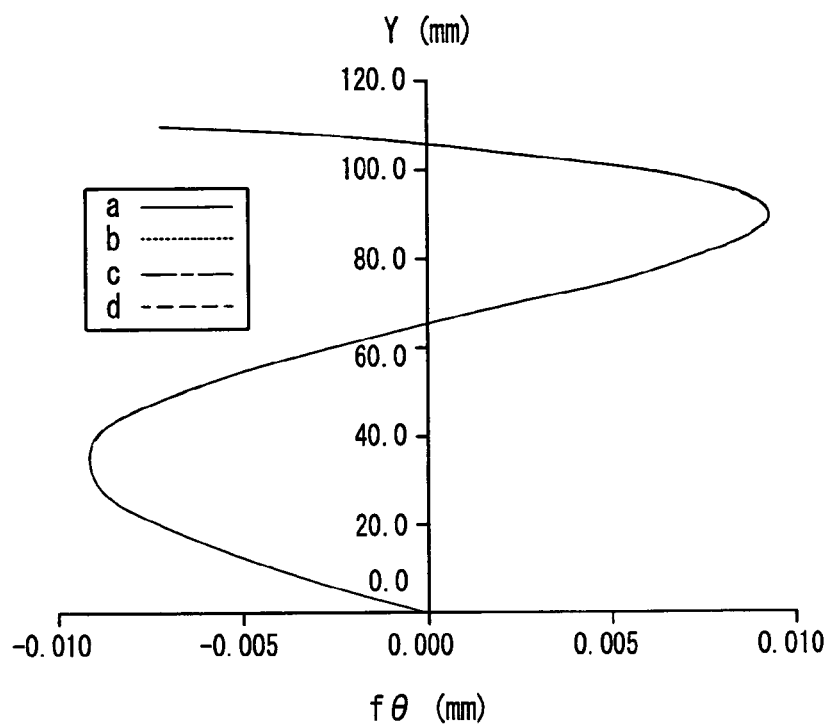
FIG. 9A shows a fθ error in Example 4.
Figure 9B:
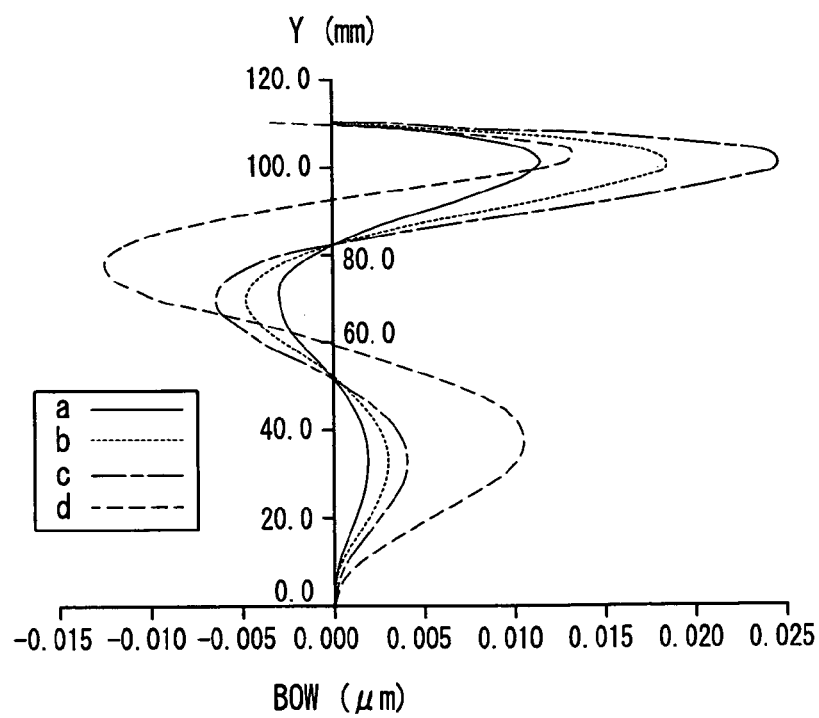
FIG. 9B shows a curvature of a scanning line in Example 4.
Figure 10A:
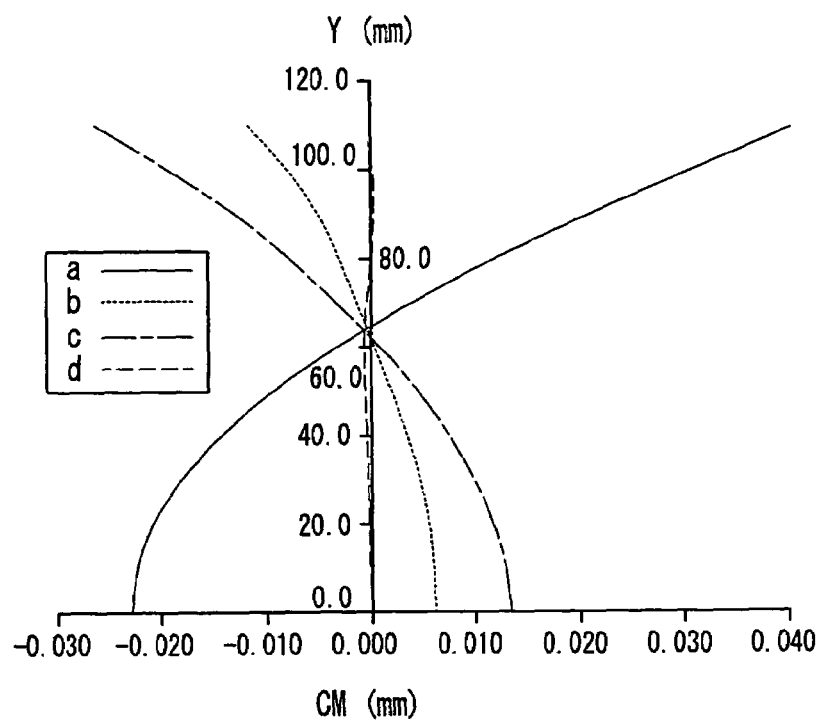
FIG. 10A shows a curvature of field in a main scanning direction in Example 5.
Figure 10B:
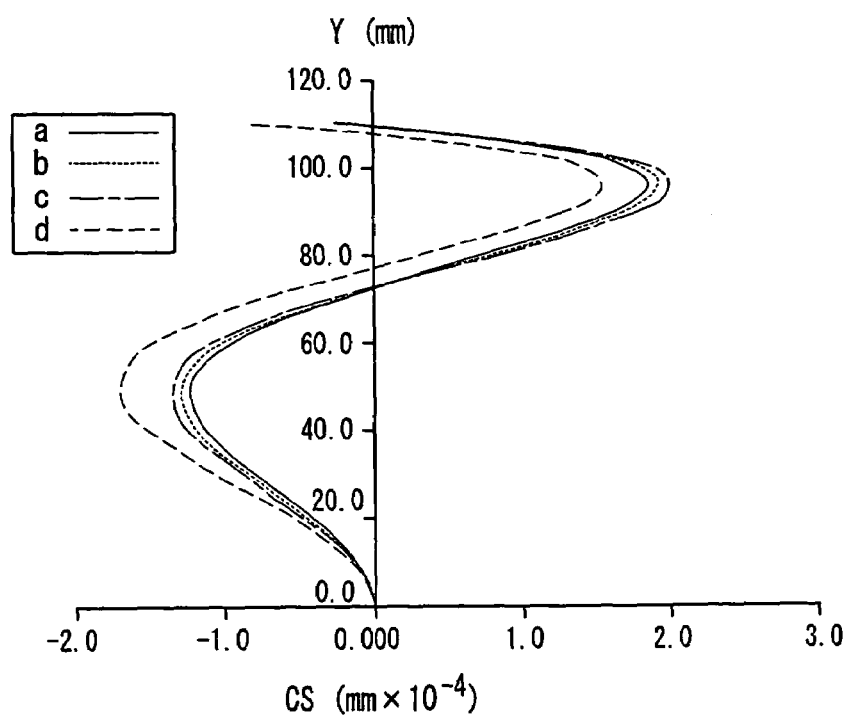
FIG. 10B shows a curvature of field in a subscanning direction in Example 5.
Figure 11A:
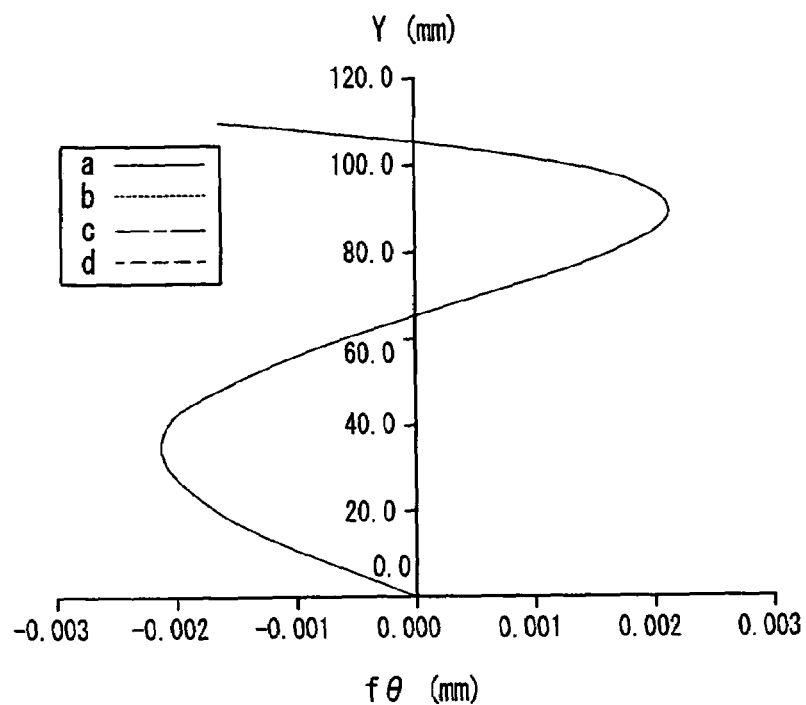
FIG. 11A shows a fθ error in Example 5.
Figure 11B:
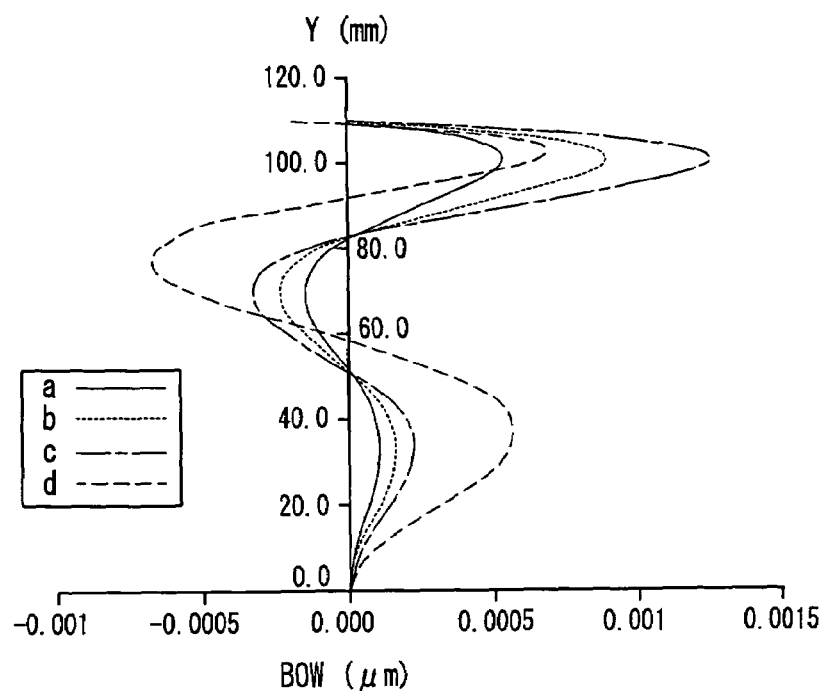
FIG. 11B shows a curvature of a scanning line in Example 5.
Figure 12A:
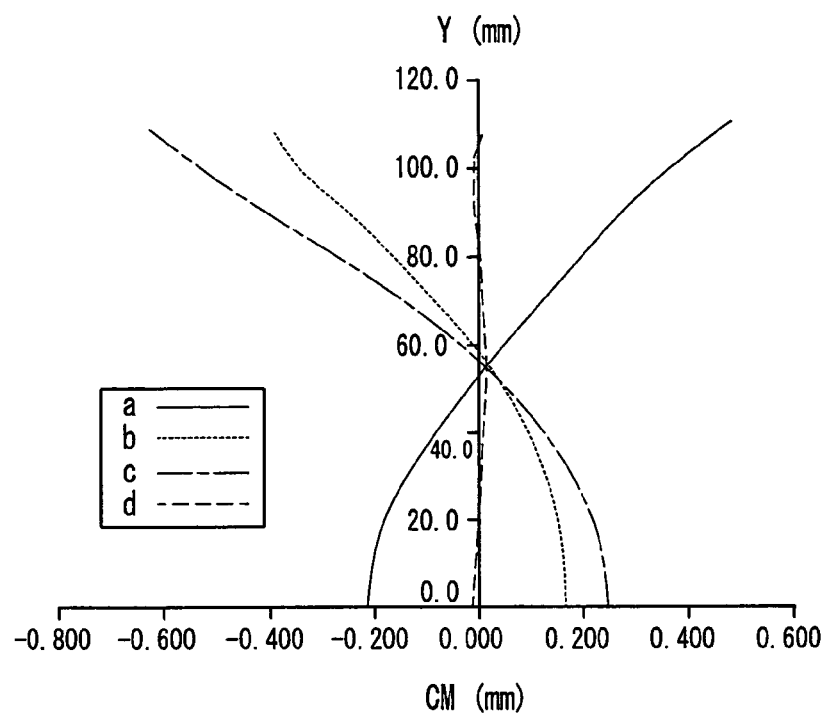
FIG. 12A shows a curvature of field in a main scanning direction in Example 6.
Figure 12B:
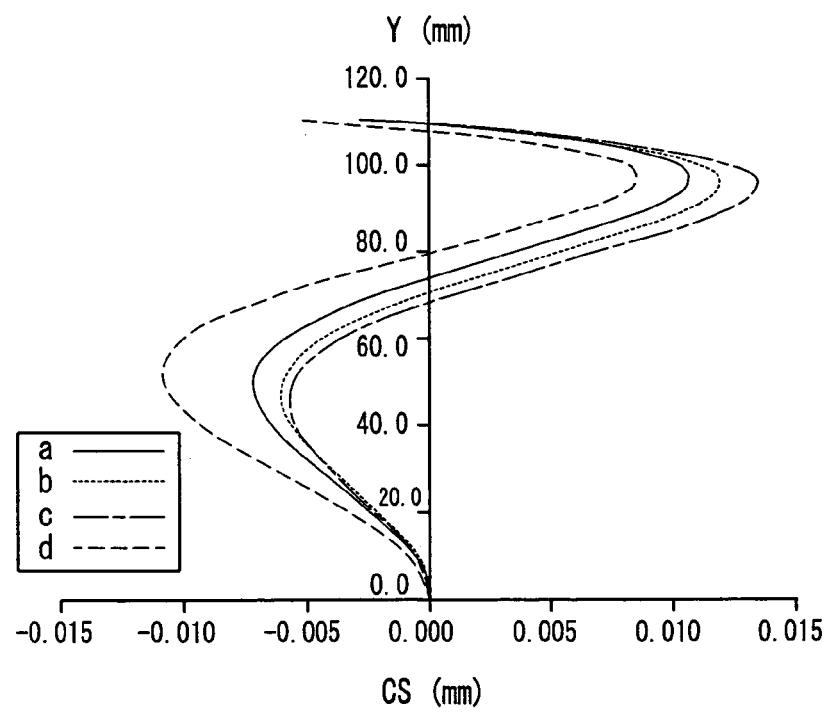
FIG. 12B shows a curvature of field in a subscanning direction in Example 6.
Figure 13A:
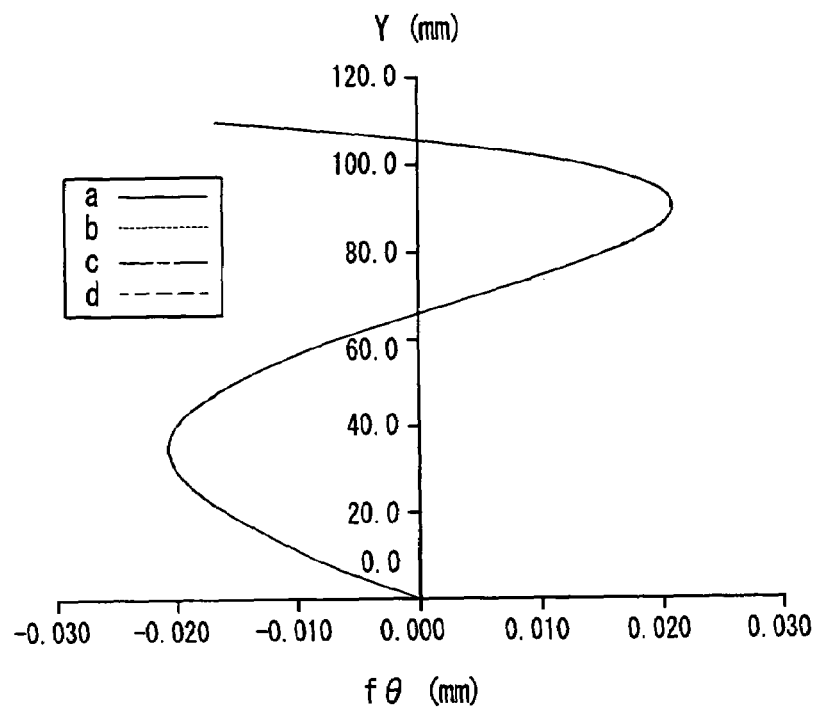
FIG. 13A shows a fθ error in Example 6.
Figure 13B:
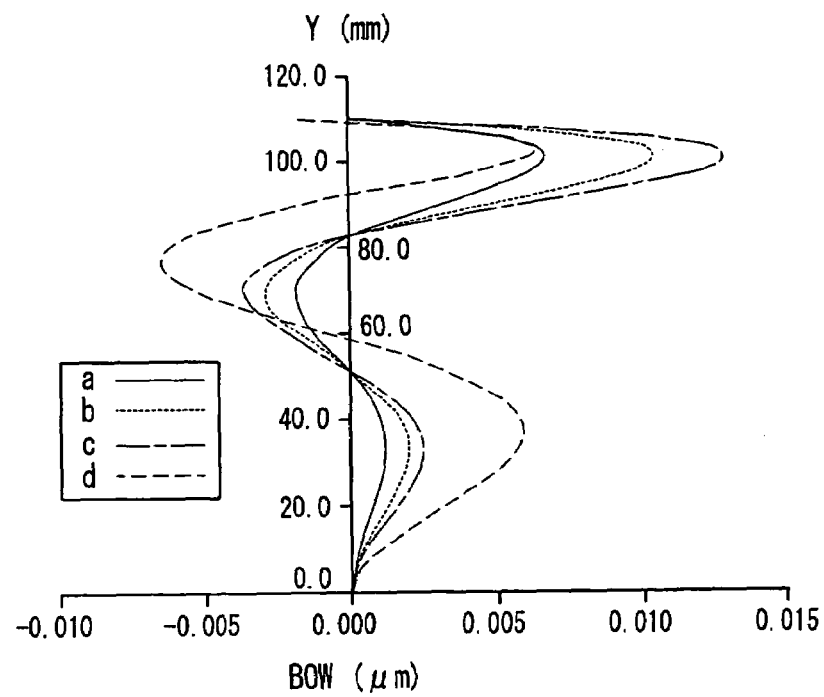
FIG. 13B shows a curvature of a scanning line in Example 6.
Figure 14A:
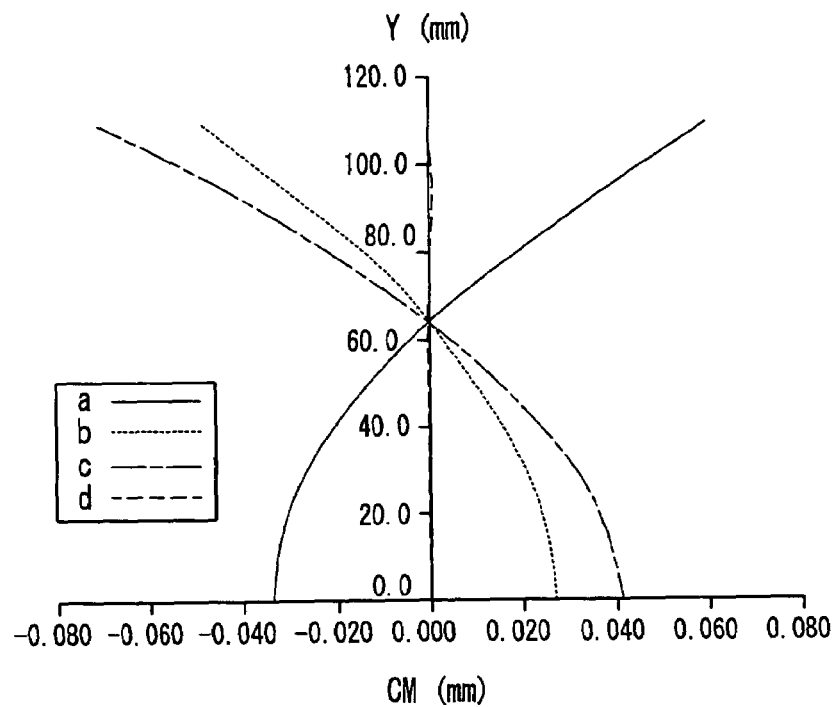
FIG. 14A shows a curvature of field in a main scanning direction in Example 7.
Figure 14B:
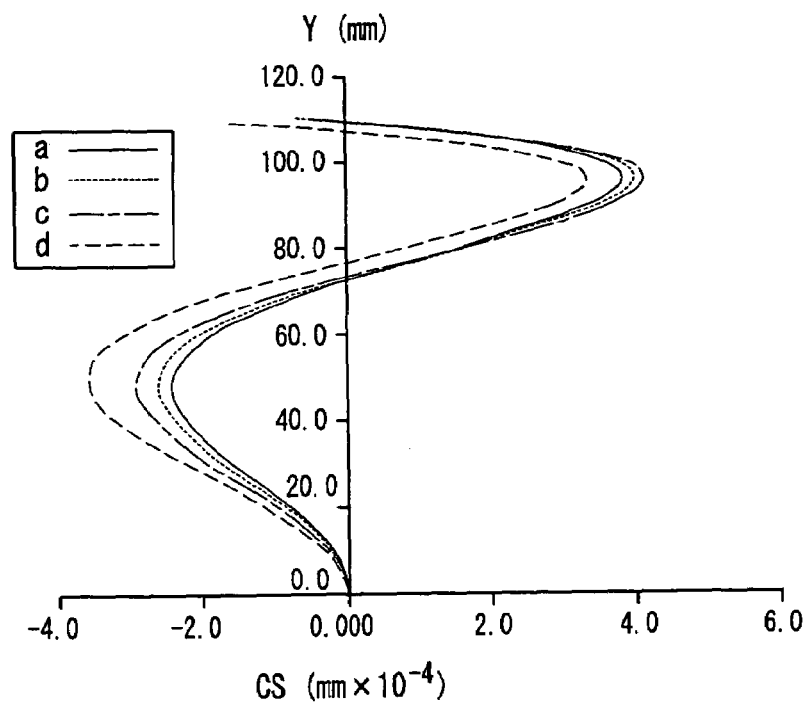
FIG. 14B shows a curvature of field in a subscanning direction in Example 7.
Figure 15A:
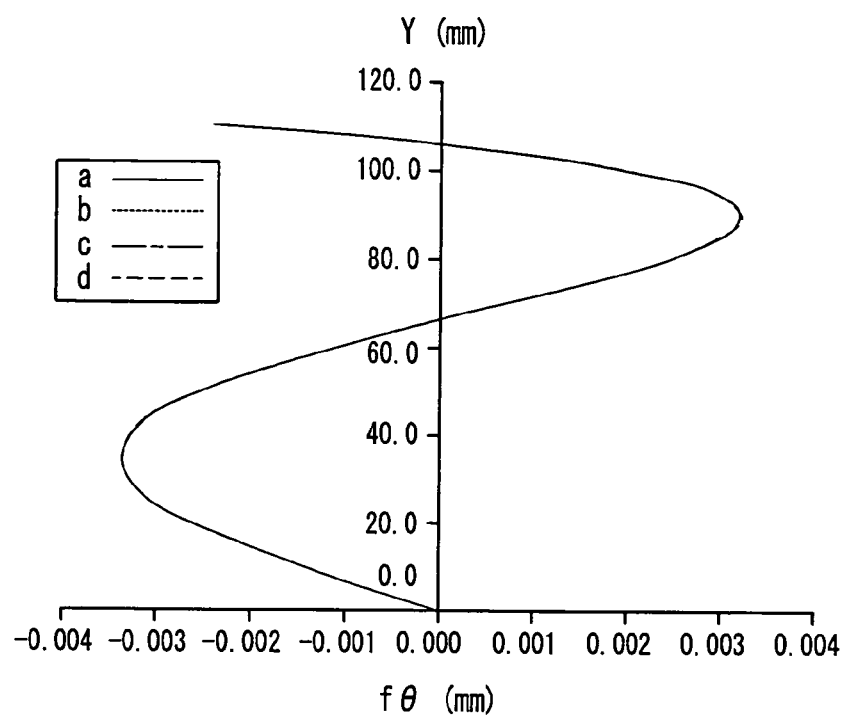
FIG. 15A shows a fθ error in Example 7.
Figure 15B:
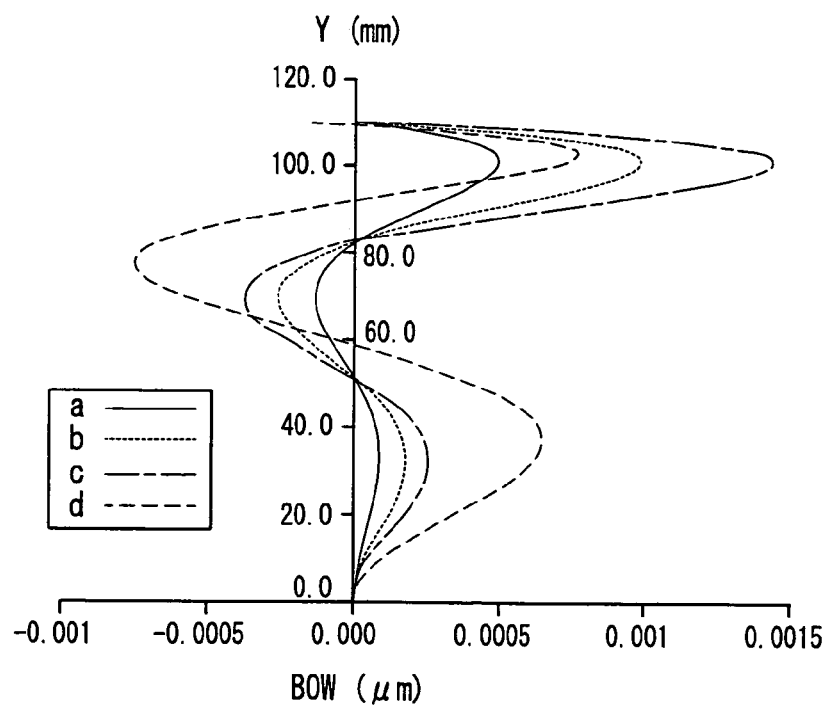
FIG. 15B shows a curvature of a scanning line in Example 7.
Figure 16A:
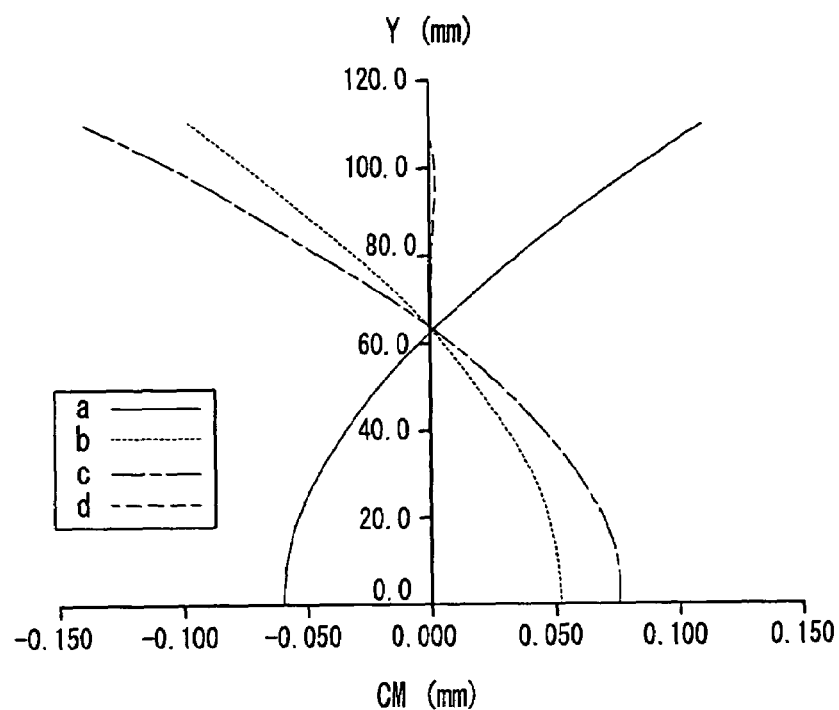
FIG. 16A shows a curvature of field in a main scanning direction in Example 8.
Figure 16B:
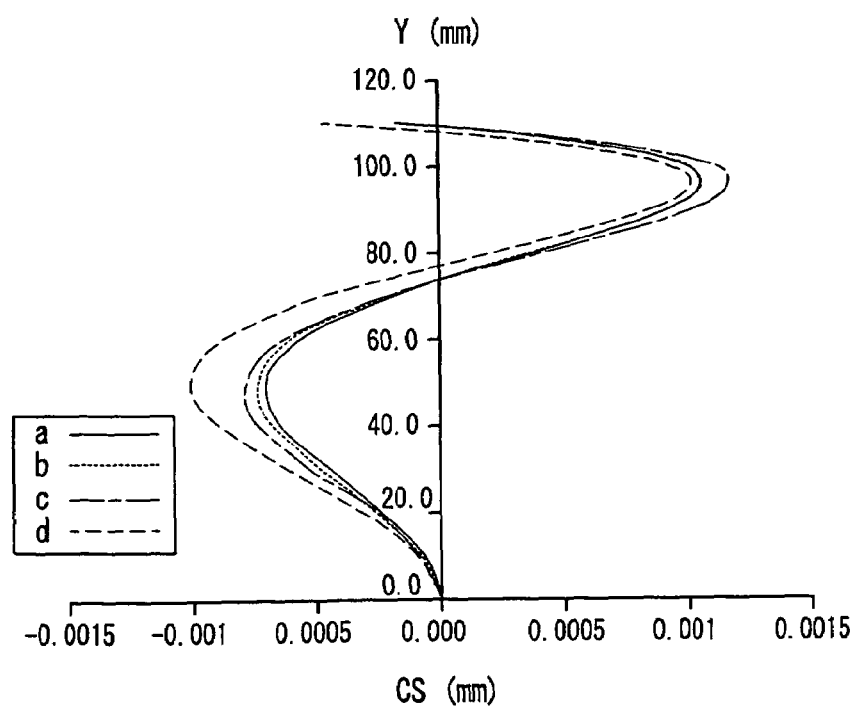
FIG. 16B shows a curvature of field in a subscanning direction in Example 8.
Figure 17A:
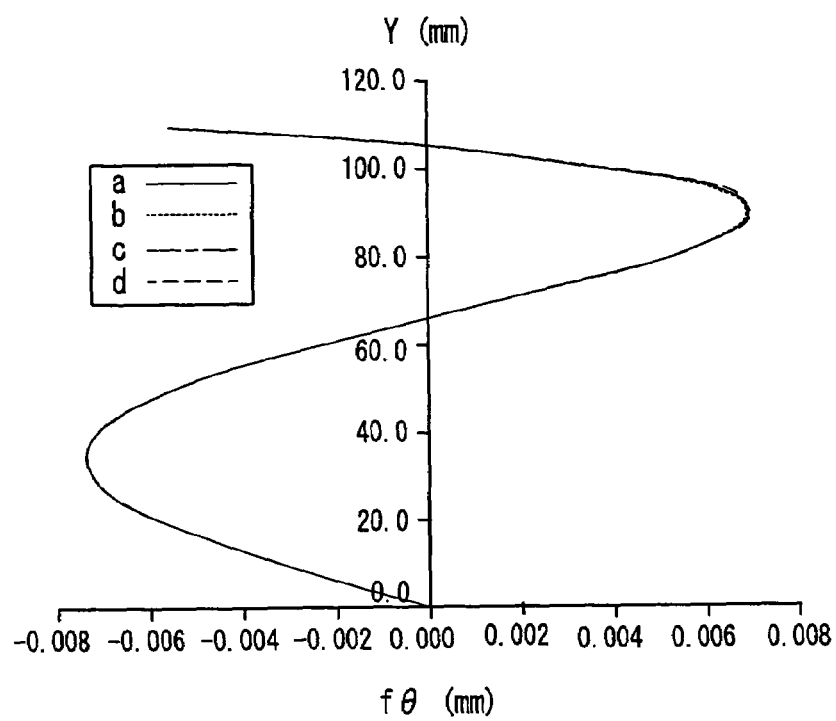
FIG. 17A shows a fθ error in Example 8.
Figure 17B:
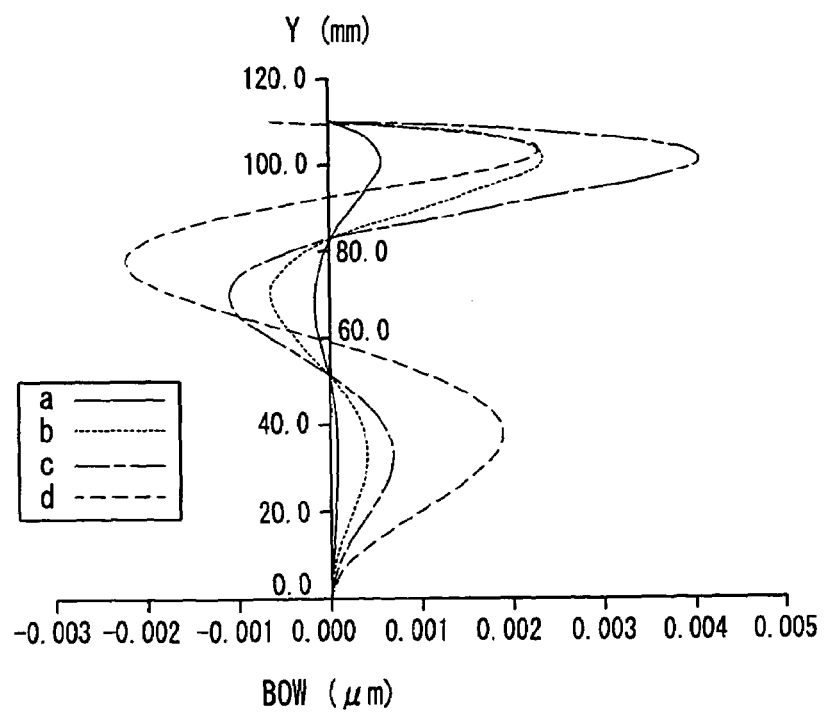
FIG. 17B shows a curvature of a scanning line in Example 8.
Figure 18A:
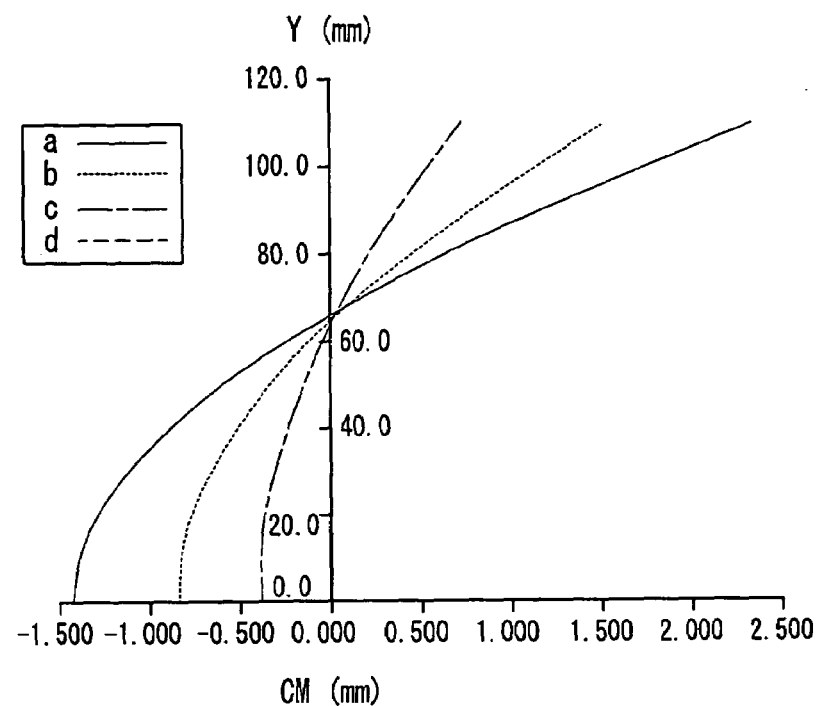
FIG. 18A shows a curvature of field in a main scanning direction in Example 9.
Figure 18B:
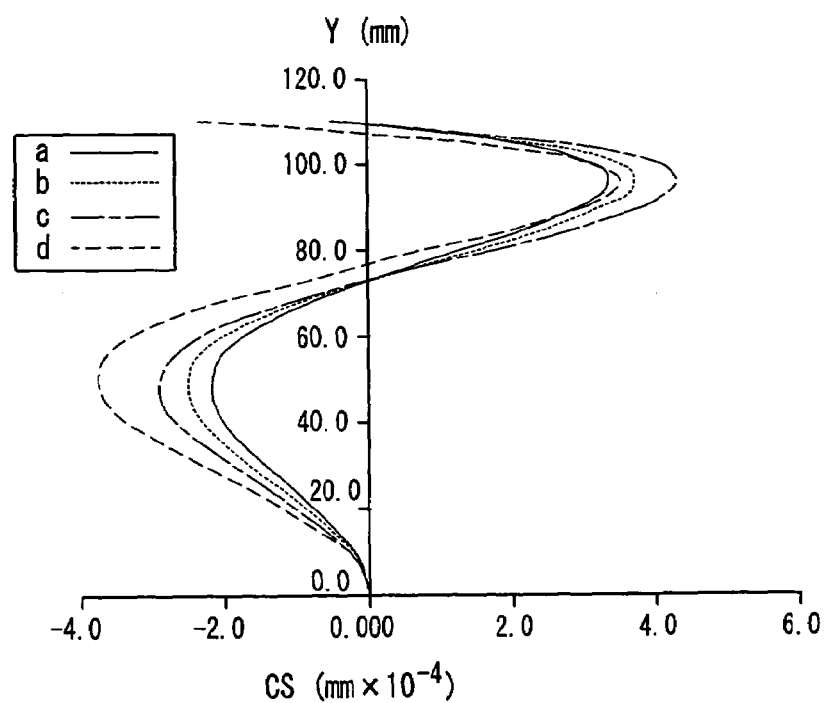
FIG. 18B shows a curvature of field in a subscanning direction in Example 9.
Figure 19A:
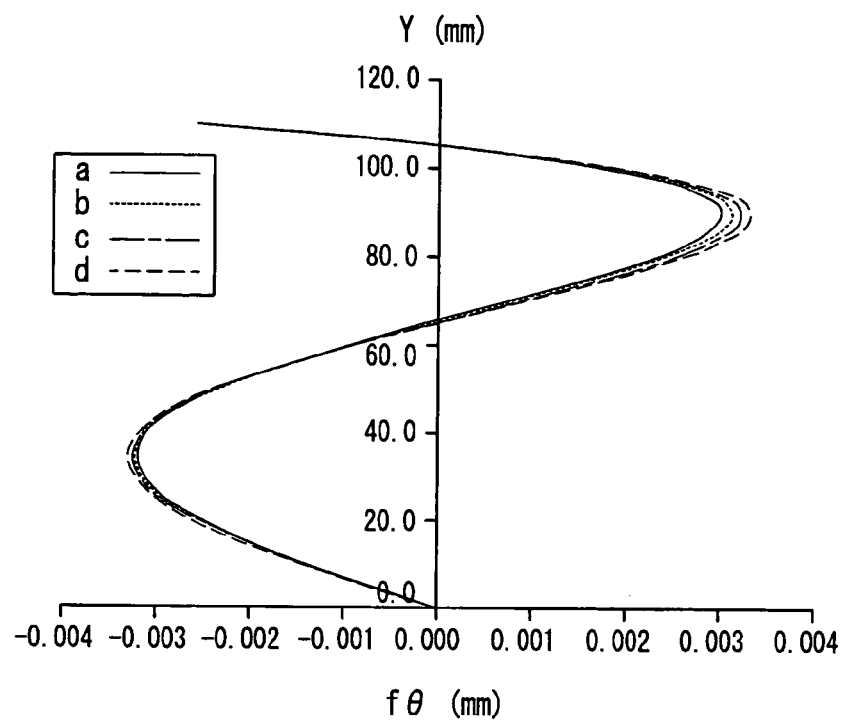
FIG. 19A shows a fθ error in Example 9.
Figure 19B:
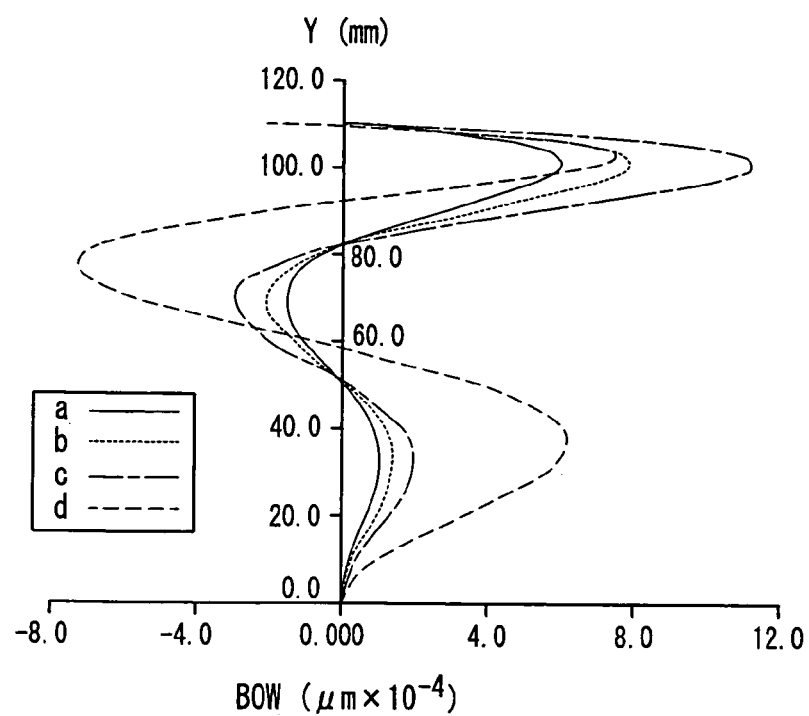
FIG. 19B shows a curvature of a scanning line in Example 9.
Figure 20A:
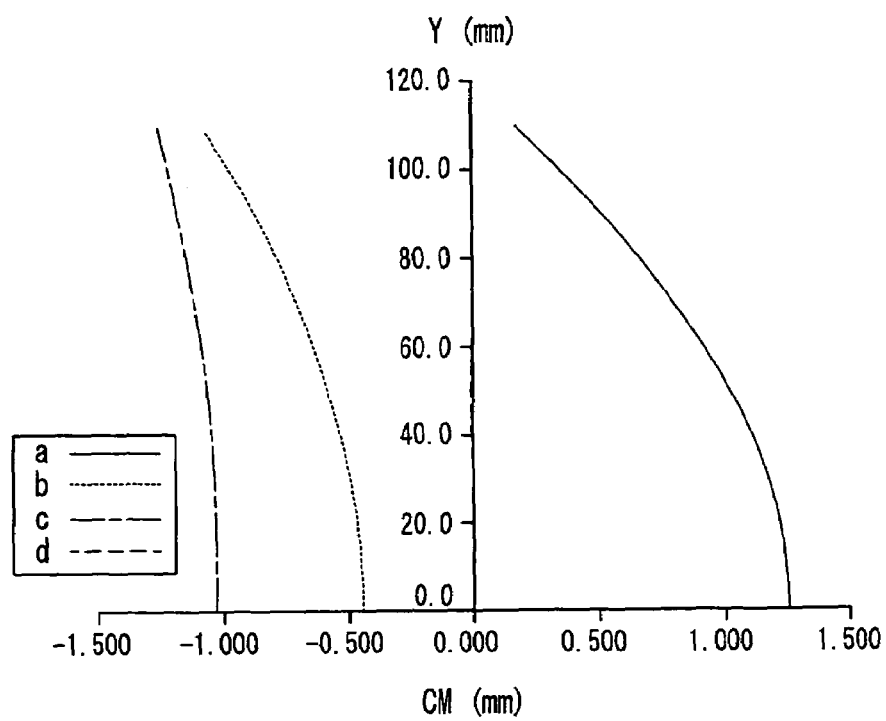
FIG. 20A shows a curvature of field in a main scanning direction in Example 10.
Figure 20B:
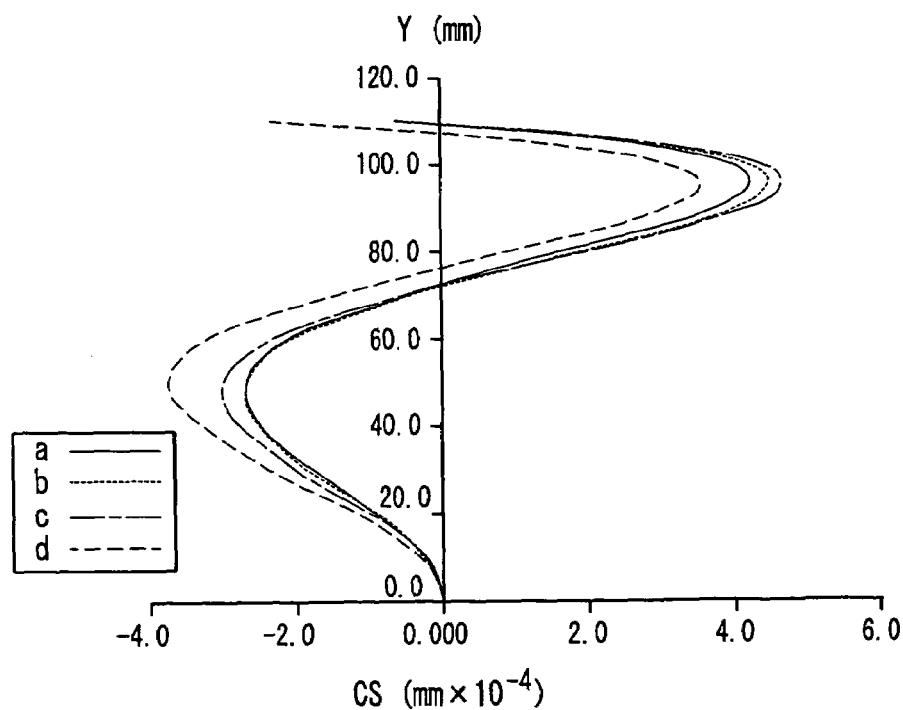
FIG. 20B shows a curvature of field in a subscanning direction in Example 10.
Figure 21A:
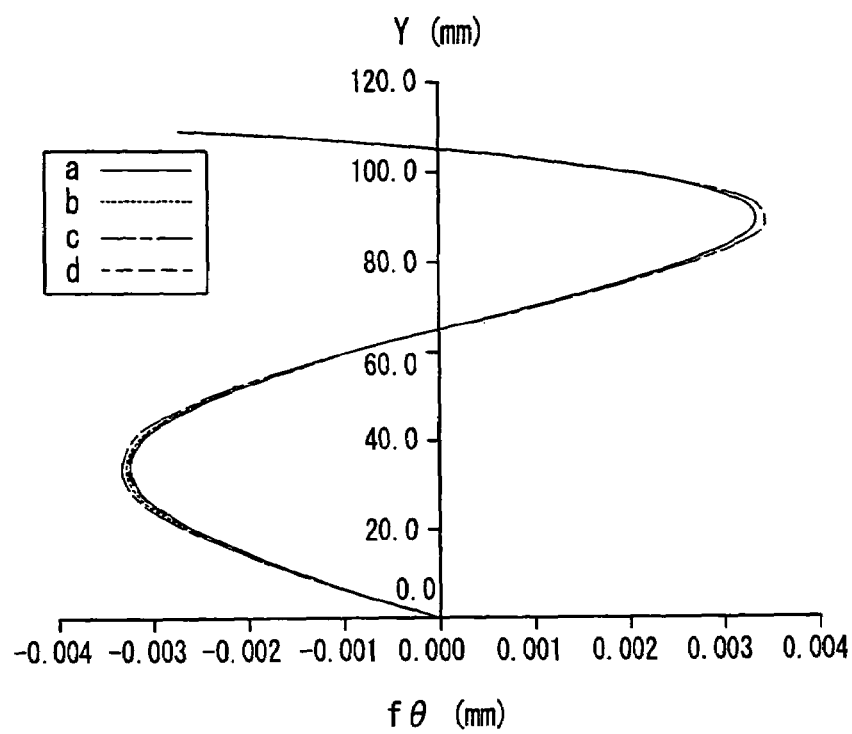
FIG. 21A shows a fθ error in Example 10.
Figure 21B:
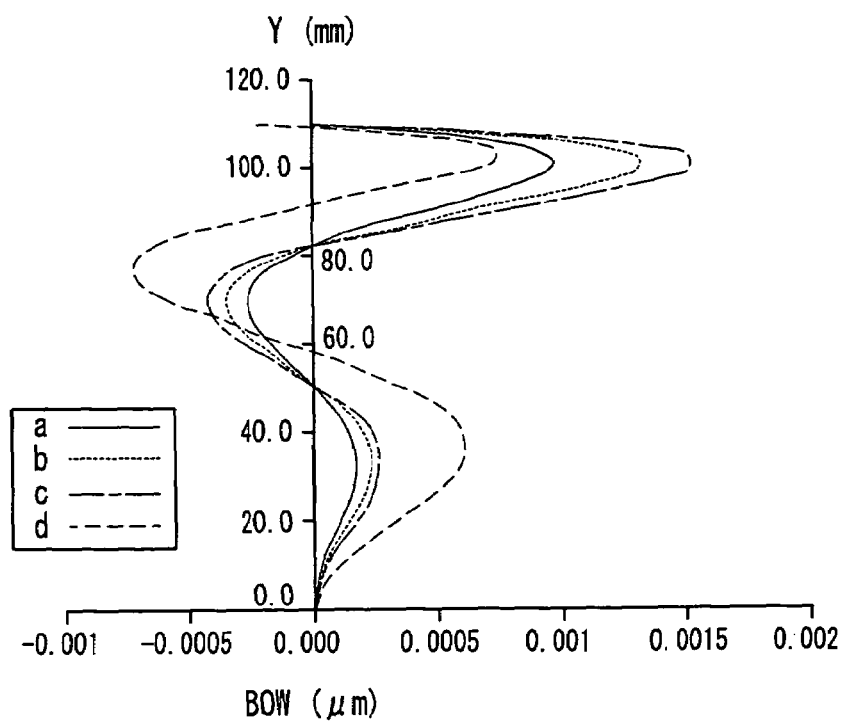
FIG. 21B shows a curvature of a scanning line in Example 10.

FIGS. 6 and 7 show the measurement results of Example 3; FIGS. 8 and 9 show the measurement results of Example 4; FIGS. 10 and 11 show the measurement results of Example 5; FIGS. 12 and 13 show the measurement results of Example 6; FIGS. 14 and 15 show the measurement results of Example 7; FIGS. 16 and 17 show the measurement results of Example 8; FIGS. 18 and 19 show the measurement results of Example 9; and FIGS. 20 and 21 show the measurement results of Example 10.

As is apparent from FIGS. 6 to 21, in all of the Examples 3 to 10, the properties of the curvature of field in the subscanning direction, a fθ error and a curve of the scanning line are excellent.

Furthermore, Examples 3 to 8 satisfy the above-mentioned Formulae 7, 9 and 12, and an excellent property of the curvature of field in the main scanning line direction of ±1 mm or less can be obtained.

Examples 9 and 10 show Examples in which the arrangement of curved surface mirrors is limited and satisfy the above-mentioned Formulae 6, 7, and 9. The numeric values of Examples 9 and 10 approximate the upper limit or lower limit in these formulae, and the curvature of field in the main scanning direction becomes larger as compared with those of the examples of the numeric values 3 to 8.

Furthermore, in this embodiment, as compared with the first and second embodiments, the degree of freedom of arrangement becomes smaller. However, since the scanning speed is equal (polygon rotation angle α is equal), the driving frequency of the light source can be made to be the same, thus enabling a circuit to be simplified. Furthermore, since the converging degree in the main scanning direction of light fluxes traveling to the optical deflection unit are equal (the distances S are equal), the same position adjusting means for the light sources and the first image formation optical system can be employed, thus enabling the adjusting cost to be reduced.

Note here that an Example in which all of the above-mentioned Formulae 6, 7, 9 and 12 are satisfied was explained in this embodiment. However, this embodiment may employ a configuration in which at least one of the above-mentioned formulae is satisfied.

Fourth Embodiment

Figure 22:
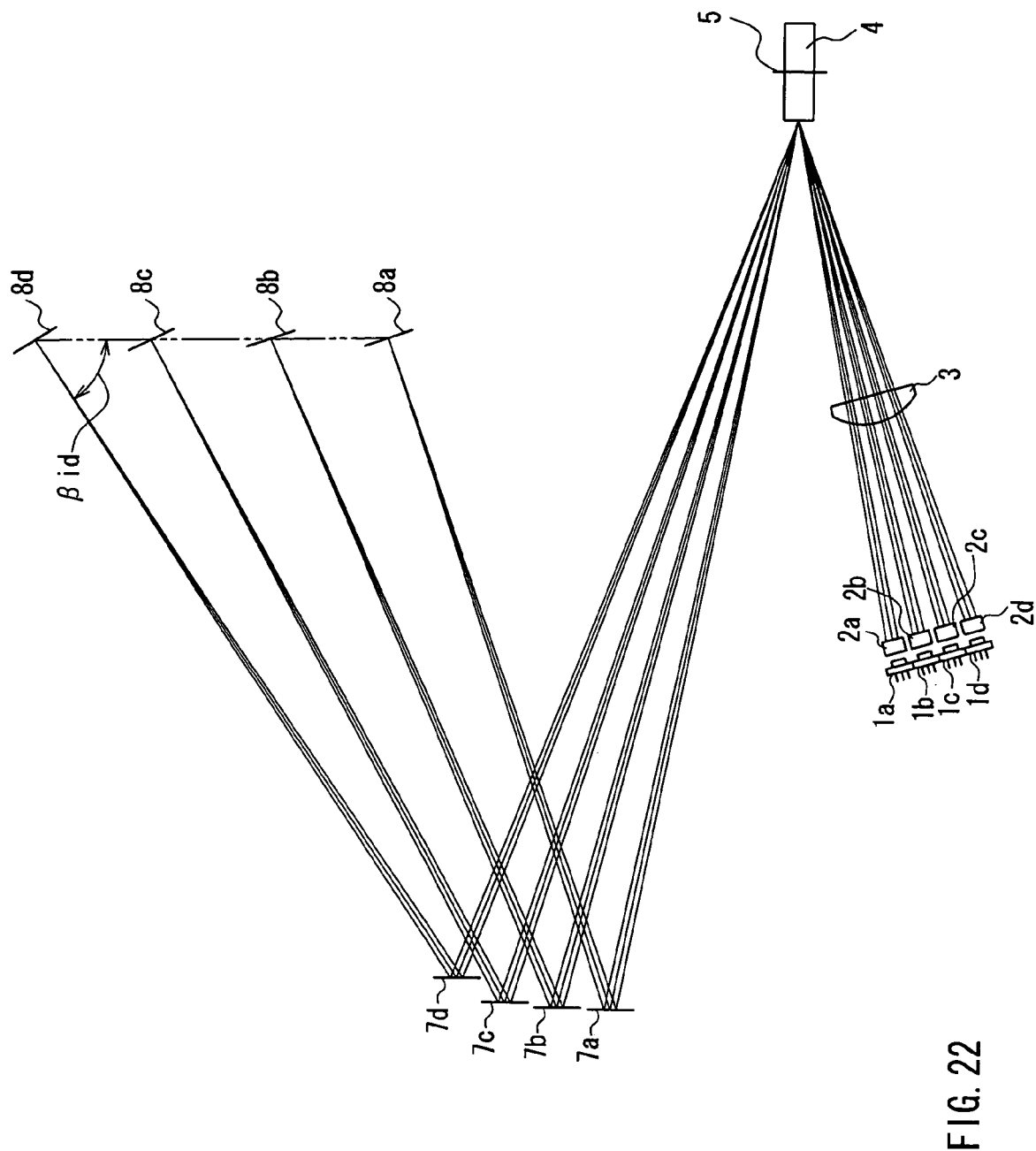
FIG. 22 is a cross-sectional view showing an optical scanning apparatus cut by a plane that is parallel with a subscanning direction according to a fourth embodiment.
Figure 23:
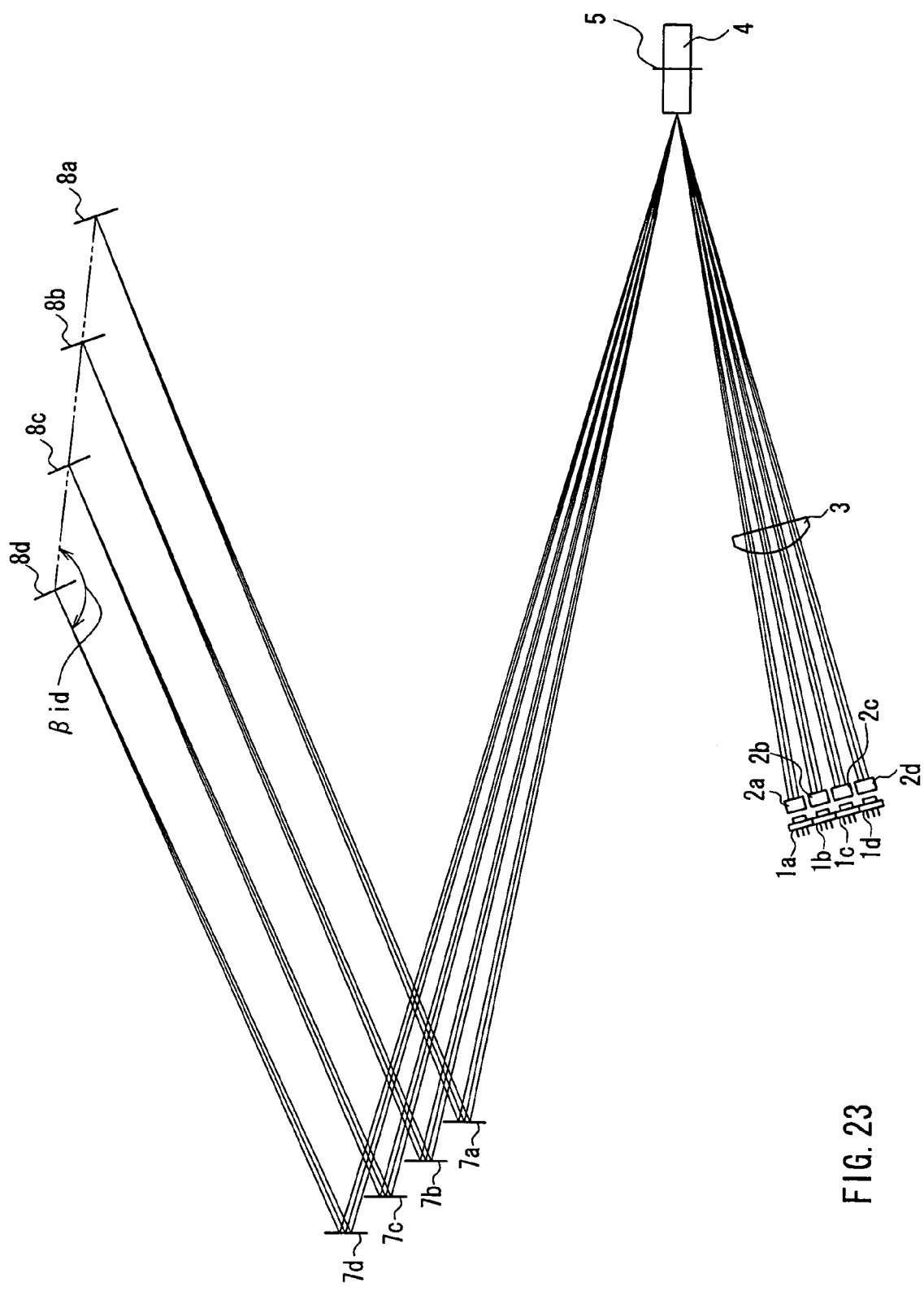
FIG. 23 is a cross-sectional view showing an optical scanning apparatus cut by a plane that is parallel with a subscanning direction in another example according to the fourth embodiment.

The basic configuration of an optical scanning apparatus according to the fourth embodiment is the same as the first embodiment shown in FIG. 1. FIGS. 22 and 23 are cross sectional views showing an optical scanning apparatus cut by a plane that is parallel with the subscanning direction thereof. The constituting components of the optical scanning apparatus are the same as those shown in FIG. 1, but the feature of this embodiment resides in the arrangement position of the constituting components.

Specifically, in a XZ plane, when βid (°) denotes an angle made by central axis of the light flux positioned most distant from the semiconductor lasers 1a to 1d and a line connecting the center of the surface 8d positioned at the most distant from the light sources 1a to 1d and the center of the surface 8a at the nearest place to the semiconductor lasers 1a to 1d, the following Formula 14 is satisfied.

$$55 < \beta id \leq 150 \tag{Formula 14}$$

When this relationship is satisfied, it is possible to prevent the reflection region of the curved surface mirror 7d positioned at the most distant from the semiconductor lasers 1a to 1d from interrupting the light flux traveling from the adjacent curved surface mirror 7c to the surface 8c and to prevent the reflection region of the curved surface mirror 7a positioned at the nearest place to the semiconductor lasers 1a to 1d from interrupting the light flux traveling to the adjacent curved surface mirror 7b. Therefore, it is possible to secure an excellent optical performance and to reduce the relative performance error of the scanning lines, thus enabling a high resolution to be achieved.

Herein, FIG. 22 shows a configuration in which βid in Formula 14 is close to the lower limit. In the configuration shown in this Figure, the interval between the reflection region of the curved surface mirror 7d and the light flux from the curved surface mirror 7c becomes narrow. Therefore, when βid is smaller than the lower limit, the reflection region of the curved surface mirror 7d positioned at the most distant from the semiconductor lasers 1a to 1d interrupts the light flux traveling from the adjacent curved surface mirror 7c toward the surface 8c.

On the other hand, FIG. 23 shows a configuration in which βid is close to the upper limit. In the configuration shown in this Figure, the interval between the reflection region of the curved surface mirror 7a and the light flux traveling toward the curved surface mirror 7b becomes narrow. Therefore, when βid is larger than the upper limit, the reflection region of the curved surface mirror 7a positioned at the nearest place to the semiconductor lasers 1a to 1d interrupts the light flux traveling toward the adjacent mirror 7b.

Furthermore, if the scanning speeds of light fluxes scanning the respective surfaces 8a to 8d to be scanned are made to be equal, the driving frequencies of the light sources can be equalized, thus enabling the circuit to be simplified.

Furthermore, by substantially equalizing the scanning speeds of a plurality of light fluxes scanning the surface 8a to 8d and substantially equalizing the converging or diverging degrees in the main scanning direction of light fluxes traveling to the polygon mirror 4, the following Formula 15 may be satisfied.

$$55 < \beta id < 100 \qquad \text{(Formula 15)}$$

According to this configuration, it is possible to make the curvature of field in the direction of the main scanning to be smaller than 2.5 mm and becomes easy to satisfy a beam diameter of 60–80 μm or less at the strength of $1/e^2$ for achieving a 400 DPI resolution.

If the difference in the converging degree in the main scanning direction of the light fluxes traveling toward the polygon mirror 4 is tolerated, the surfaces 8a to 8d to be scanned can be arranged relatively freely, which is effective in the case where, for example, the interval between the curved surface mirrors 7a to 7d is required to be a certain width or more, or the case where the arrangement direction of the plurality of surfaces to be scanned (photosensitive drums) is tilted from the vertical direction so as to lower the height of the apparatus.

Furthermore, as in the third embodiment, a configuration in which at least one of the above-mentioned Formulae 6, 7, 9 and 12 is satisfied may be employed.

Hereinafter, Examples 11 to 14 according to this embodiment will be shown in the following Tables 12 to 15. The Examples mentioned below have the interval G between the surfaces to be scanned of 30 mm.

EXAMPLE 11

TABLE 12

| | Ymax = 110, rp = 17.32, βid = 57 | | | |
|---|---|---|---|---|
| | a | b | c | d |
| S | −651.382 | −675.033 | −704.789 | −709.497 |
| α | 11.060 | 11.060 | 11.060 | 11.060 |
| β1 | 10.779 | 13.856 | 16.842 | 19.518 |
| β2 | 14.728 | 18.742 | 22.649 | 27.000 |
| D1 | 237.709 | 240.275 | 242.750 | 240.000 |
| D2 | 184.196 | 189.361 | 195.370 | 200.000 |
| rdy | 642.002 | 632.550 | 623.107 | 620.893 |
| rdx | 214.609 | 223.659 | 234.588 | 244.870 |
| ad | $1.27171 \times 10^{-10}$ | $1.62424 \times 10^{-10}$ | $2.21751 \times 10^{-10}$ | $3.82578 \times 10^{-10}$ |
| ae | $4.53593 \times 10^{-15}$ | $5.1232 \times 10^{-15}$ | $5.62517 \times 10^{-15}$ | $6.34401 \times 10^{-15}$ |
| af | 0 | 0 | 0 | 0 |
| ag | 0 | 0 | 0 | 0 |
| bc | $-4.76135 \times 10^{-6}$ | $-4.86824 \times 10^{-6}$ | $-5.0047 \times 10^{-6}$ | $-5.29465 \times 10^{-6}$ |
| bd | $1.26892 \times 10^{-12}$ | $2.35447 \times 10^{-12}$ | $3.68682 \times 10^{-12}$ | $6.27513 \times 10^{-12}$ |
| be | 0 | 0 | 0 | 0 |
| bf | 0 | 0 | 0 | 0 |
| bg | 0 | 0 | 0 | 0 |
| ec | $1.15914 \times 10^{-6}$ | $1.45604 \times 10^{-6}$ | $1.73704 \times 10^{-6}$ | $2.09079 \times 10^{-6}$ |
| ed | $4.66123 \times 10^{-12}$ | $5.91358 \times 10^{-12}$ | $7.15153 \times 10^{-12}$ | $8.84839 \times 10^{-12}$ |
| ee | $3.19733 \times 10^{-17}$ | $4.07149 \times 10^{-17}$ | $4.87895 \times 10^{-17}$ | $5.93904 \times 10^{-17}$ |

EXAMPLE 12

TABLE 13

| | Ymax = 110, rp = 17.32, βid = 106 | | | |
|---|---|---|---|---|
| | a | b | c | d |
| S | −1124.632 | −971.177 | −863.278 | −783.6 |
| α | 10.593 | 10.593 | 10.593 | 10.593 |

TABLE 13-continued

Ymax = 110, rp = 17.32, βid = 106

| | a | b | c | d |
|---|---|---|---|---|
| β1 | 3.415 | 5.685 | 8.112 | 10.697 |
| β2 | 4.979 | 8.182 | 11.524 | 15 |
| D1 | 223.29 | 228.672 | 234.195 | 240 |
| D2 | 238.826 | 228.544 | 218.952 | 210 |
| rdy | 647.36 | 653.603 | 658.131 | 661.068 |
| rdx | 231.67 | 230.957 | 230.972 | 231.901 |
| ad | $-2.28687 \times 10^{-10}$ | $-1.47981 \times 10^{-10}$ | $-6.05108 \times 10^{-11}$ | $3.72937 \times 10^{-11}$ |
| ae | $3.32793 \times 10^{-15}$ | $3.27546 \times 10^{-15}$ | $3.33005 \times 10^{-15}$ | $3.50892 \times 10^{-15}$ |
| af | 0 | 0 | 0 | 0 |
| ag | 0 | 0 | 0 | 0 |
| bc | $-3.43006 \times 10^{-6}$ | $-3.61207 \times 10^{-6}$ | $-3.82876 \times 10^{-6}$ | $-4.08368 \times 10^{-6}$ |
| bd | $1.26641 \times 10^{-12}$ | $1.23184 \times 10^{-12}$ | $1.36212 \times 10^{-12}$ | $1.64755 \times 10^{-12}$ |
| be | 0 | 0 | 0 | 0 |
| bf | 0 | 0 | 0 | 0 |
| bg | 0 | 0 | 0 | 0 |
| ec | $3.72731 \times 10^{-7}$ | $6.0445 \times 10^{-7}$ | $8.42551 \times 10^{-7}$ | $1.08741 \times 10^{-6}$ |
| ed | $8.87291 \times 10^{-13}$ | $1.59763 \times 10^{-12}$ | $2.46648 \times 10^{-12}$ | $3.52139 \times 10^{-12}$ |
| ee | $5.97432 \times 10^{-18}$ | $1.02509 \times 10^{-17}$ | $1.53575 \times 10^{-17}$ | $2.17112 \times 10^{-17}$ |

EXAMPLE 13

TABLE 14

Ymax = 110, rp = 17.32, βid = 120

| | a | b | c | d |
|---|---|---|---|---|
| S | −1370.395 | −1080.395 | −902.98 | −783.6 |
| α | 10.593 | 10.593 | 10.593 | 10.593 |
| β1 | 4.488 | 6.38 | 8.443 | 10.697 |
| β2 | 6.625 | 9.259 | 12.051 | 15 |
| D1 | 218.043 | 225.175 | 232.431 | 240 |
| D2 | 250.903 | 236.933 | 223.311 | 210 |
| rdy | 637.162 | 646.886 | 654.854 | 661.068 |
| rdx | 234.889 | 233.951 | 232.912 | 231.901 |
| ad | $-2.90739 \times 10^{-10}$ | $-1.84893 \times 10^{-10}$ | $-7.69641 \times 10^{-11}$ | $3.72937 \times 10^{-11}$ |
| ae | $3.56023 \times 10^{-15}$ | $3.40538 \times 10^{-15}$ | $3.38269 \times 10^{-15}$ | $3.50892 \times 10^{-15}$ |
| af | 0 | 0 | 0 | 0 |
| ag | 0 | 0 | 0 | 0 |
| bc | $-3.32948 \times 10^{-6}$ | $-3.54008 \times 10^{-6}$ | $-3.78919 \times 10^{-6}$ | $-4.08368 \times 10^{-6}$ |
| bd | $1.74234 \times 10^{-12}$ | $1.60253 \times 10^{-12}$ | $1.57191 \times 10^{-12}$ | $1.64755 \times 10^{-12}$ |
| be | 0 | 0 | 0 | 0 |
| bf | 0 | 0 | 0 | 0 |
| bg | 0 | 0 | 0 | 0 |
| ec | $5.04504 \times 10^{-7}$ | $6.90084 \times 10^{-7}$ | $8.83725 \times 10^{-7}$ | $1.08741 \times 10^{-6}$ |
| ed | $1.08908 \times 10^{-12}$ | $1.71685 \times 10^{-12}$ | $2.5136 \times 10^{-12}$ | $3.52139 \times 10^{-12}$ |
| ee | $7.83553 \times 10^{-18}$ | $1.13286 \times 10^{-17}$ | $1.5761 \times 10^{-17}$ | $2.17112 \times 10^{-17}$ |

EXAMPLE 14

TABLE 15

Ymax = 110, rp = 17.32, βid = 150

| | a | b | c | d |
|---|---|---|---|---|
| S | −920.571 | −767.124 | −663.241 | −588.176 |
| α | 10.066 | 10.066 | 10.066 | 10.066 |
| β1 | 11.765 | 12.815 | 13.974 | 15.262 |
| β2 | 16.682 | 17.736 | 18.846 | 20 |
| D1 | 248.399 | 258.749 | 269.252 | 280 |
| D2 | 233.469 | 212.743 | 191.616 | 170 |
| rdy | 685.253 | 696.835 | 706.06 | 712.568 |
| rdx | 251.277 | 245.152 | 236.577 | 225.132 |
| ad | $-3.70348 \times 10^{-12}$ | $1.02055 \times 10^{-10}$ | $2.1193 \times 10^{-10}$ | $3.32715 \times 10^{-10}$ |
| ae | $3.65199 \times 10^{-15}$ | $3.6581 \times 10^{-15}$ | $3.85323 \times 10^{-15}$ | $4.30407 \times 10^{-15}$ |

TABLE 15-continued $Y_{max} = 110$, $r_p = 17.32$, $\beta id = 150$

|    | a | b | c | d |
|----|---|---|---|---|
| af | 0 | 0 | 0 | 0 |
| ag | 0 | 0 | 0 | 0 |
| bc | $-3.60688 \times 10^{-6}$ | $-3.90679 \times 10^{-6}$ | $-4.2874 \times 10^{-6}$ | $-4.78554 \times 10^{-6}$ |
| bd | $1.90382 \times 10^{-12}$ | $1.57711 \times 10^{-12}$ | $1.24871 \times 10^{-12}$ | $8.52946 \times 10^{-13}$ |
| be | 0 | 0 | 0 | 0 |
| bf | 0 | 0 | 0 | 0 |
| bg | 0 | 0 | 0 | 0 |
| ec | $1.09777 \times 10^{-6}$ | $1.15419 \times 10^{-6}$ | $1.22961 \times 10^{-6}$ | $1.33068 \times 10^{-6}$ |
| ed | $2.97889 \times 10^{-12}$ | $3.66358 \times 10^{-12}$ | $4.57133 \times 10^{-12}$ | $5.83704 \times 10^{-12}$ |
| ee | $1.84751 \times 10^{-17}$ | $2.19948 \times 10^{-17}$ | $2.78864 \times 10^{-17}$ | $3.82058 \times 10^{-17}$ |

Figure 24A:
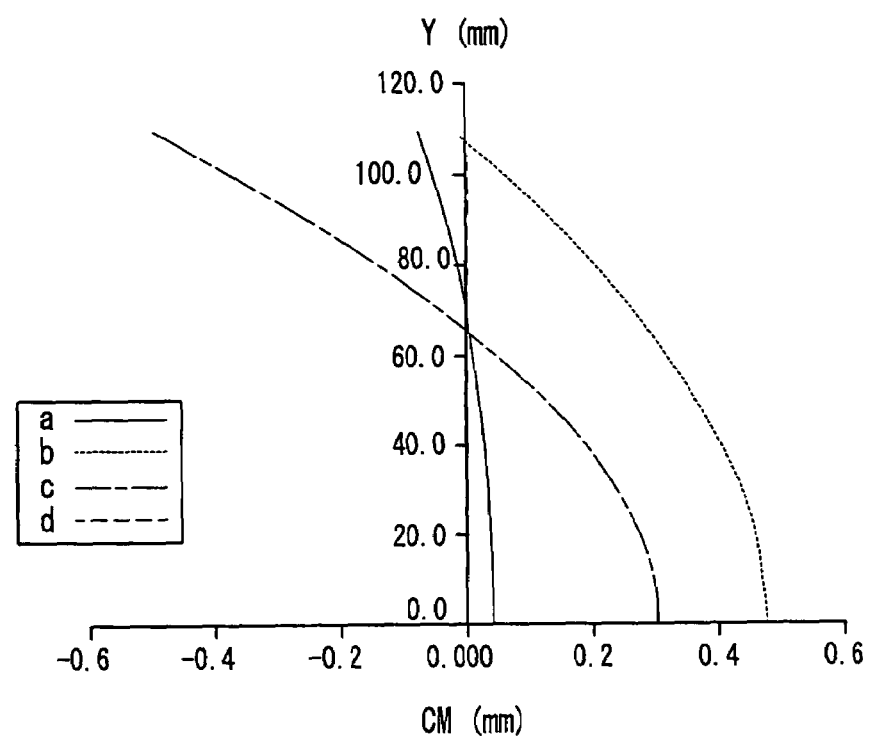
FIG. 24A shows a curvature of field in a main scanning direction in Example 11.
Figure 24B:
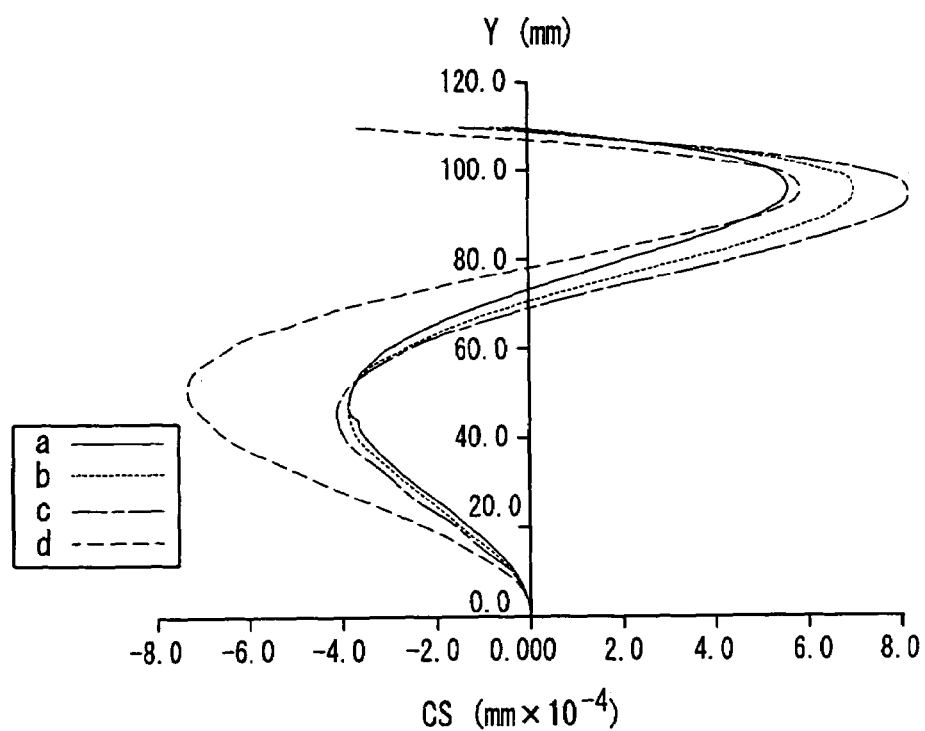
FIG. 24B shows a curvature of field in a subscanning direction in Example 11.
Figure 25A:
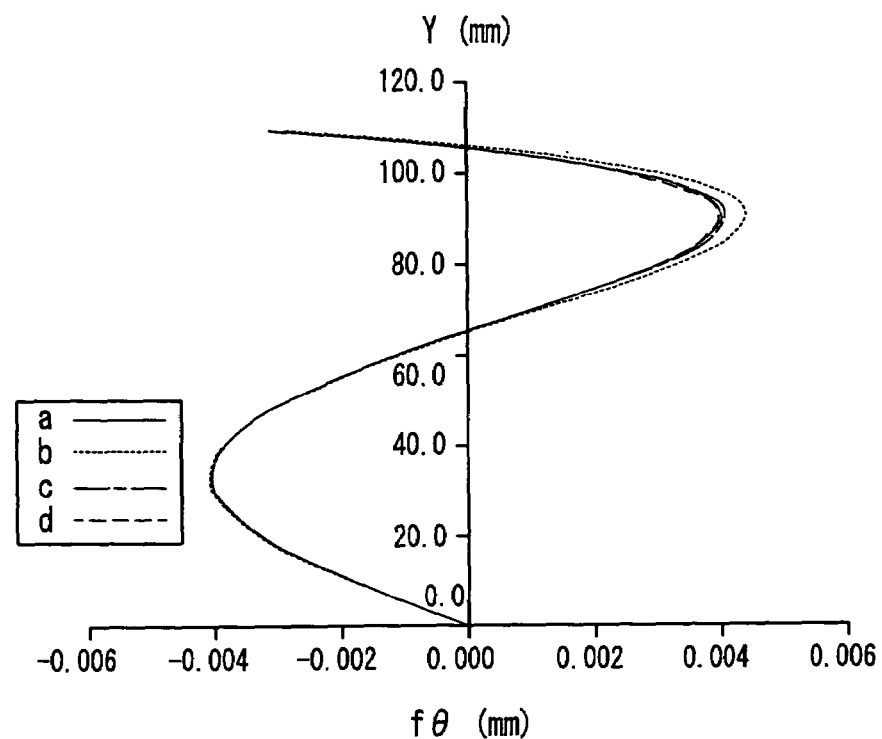
FIG. 25A shows a fθ error in Example 11.
Figure 25B:
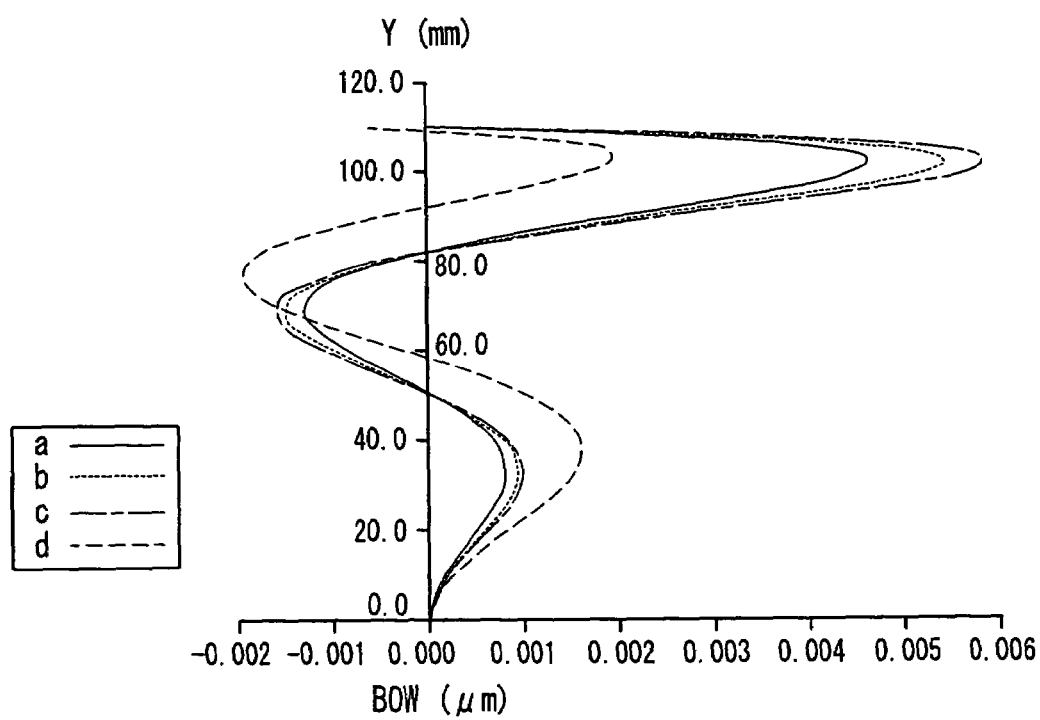
FIG. 25B shows a curvature of a scanning line in Example 11.
Figure 26A:
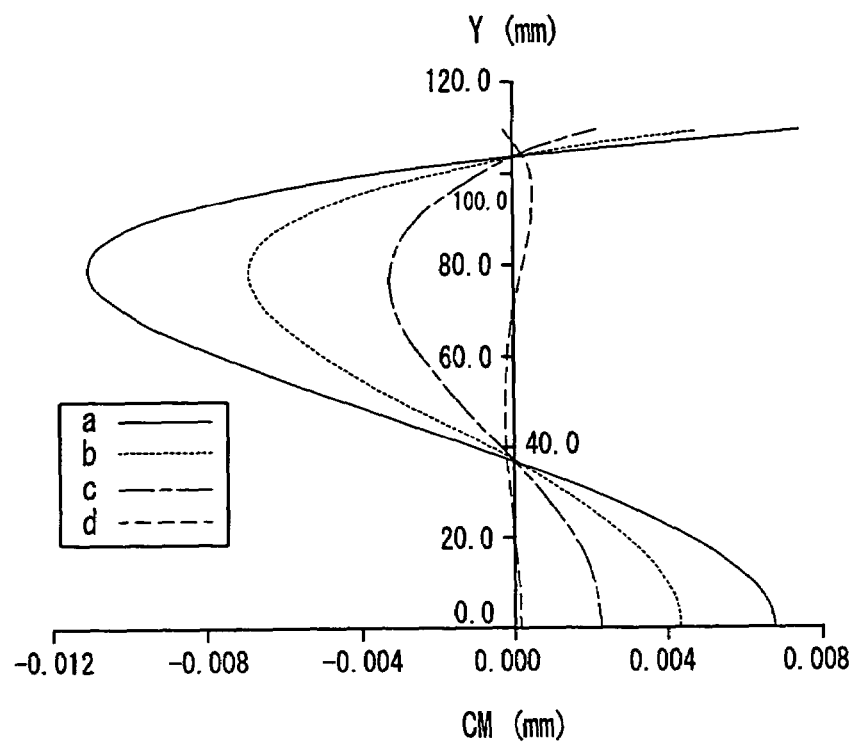
FIG. 26A shows a curvature of field in a main scanning direction in Example 12.
Figure 26B:
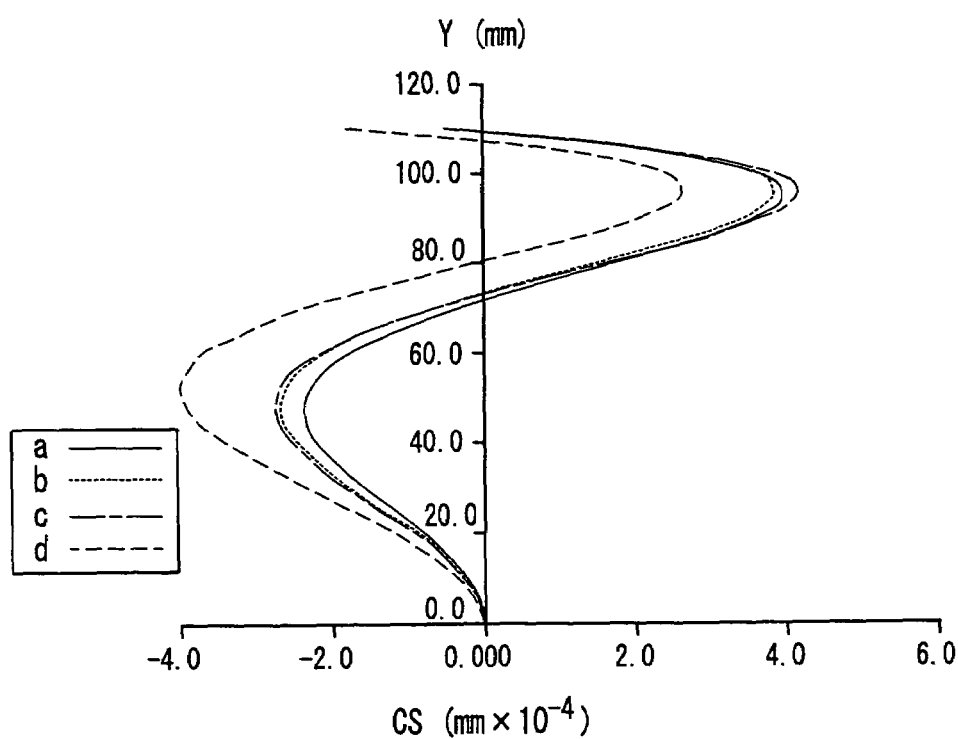
FIG. 26B shows a curvature of field in a subscanning direction in Example 12.
Figure 27A:
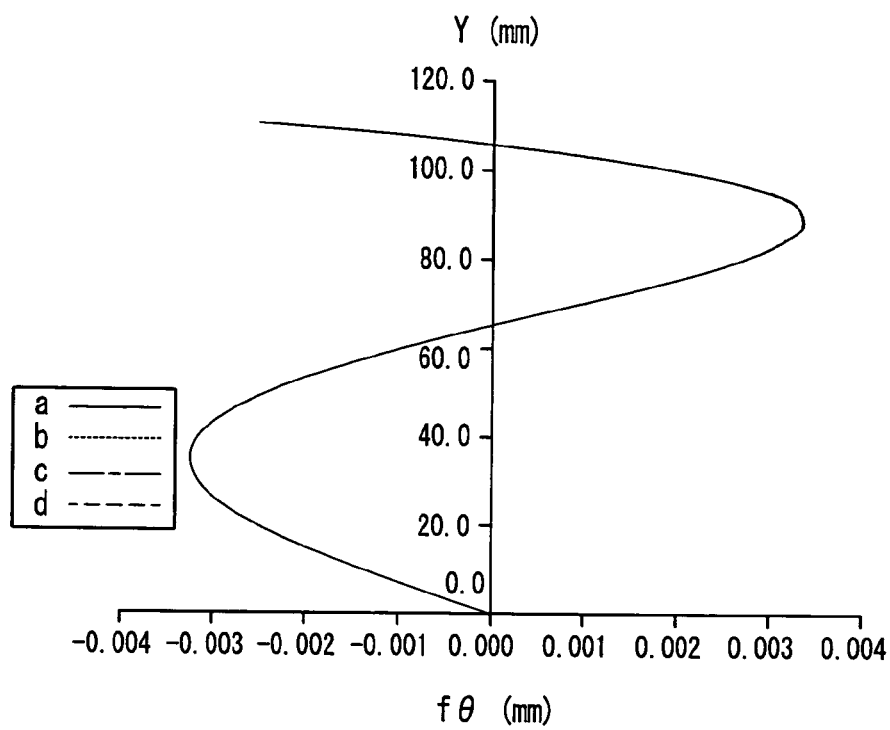
FIG. 27A shows a fθ error in Example 12.
Figure 27B:
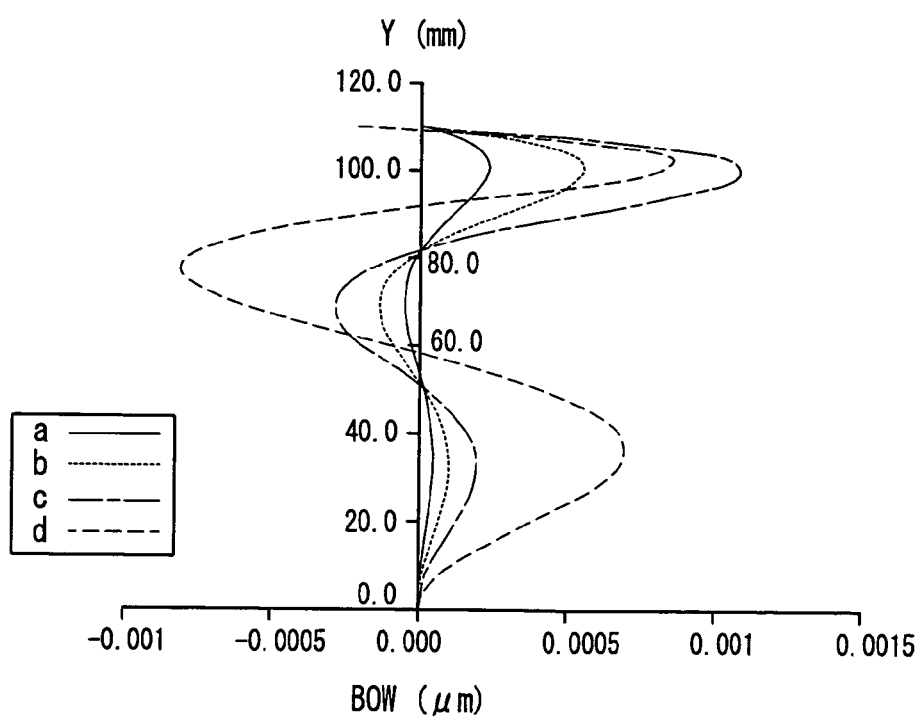
FIG. 27B shows a curvature of a scanning line in Example 12.
Figure 28A:
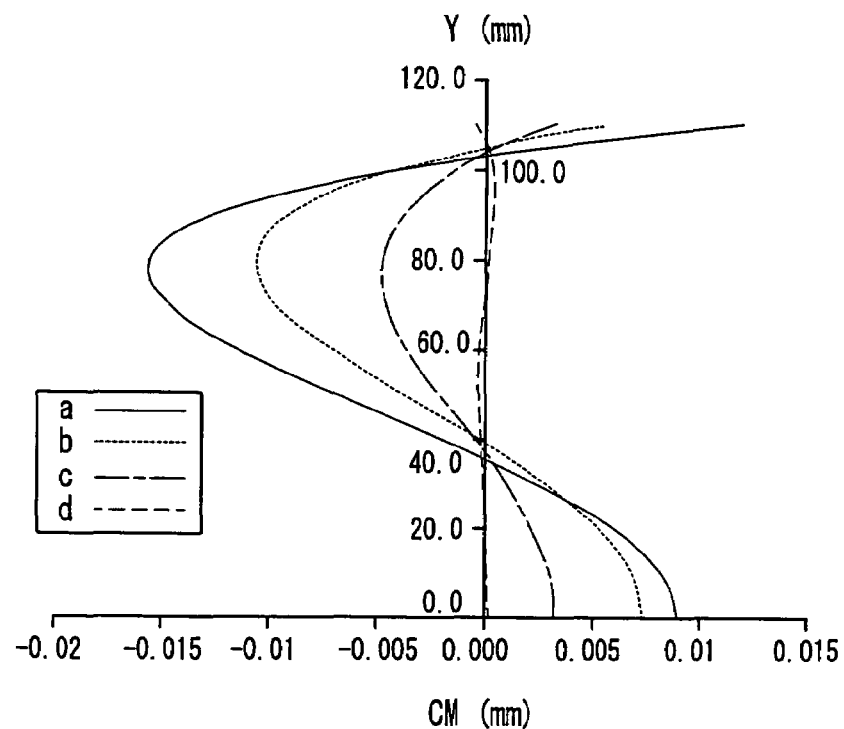
FIG. 28A shows a curvature of field in a main scanning direction in Example 13.
Figure 28B:
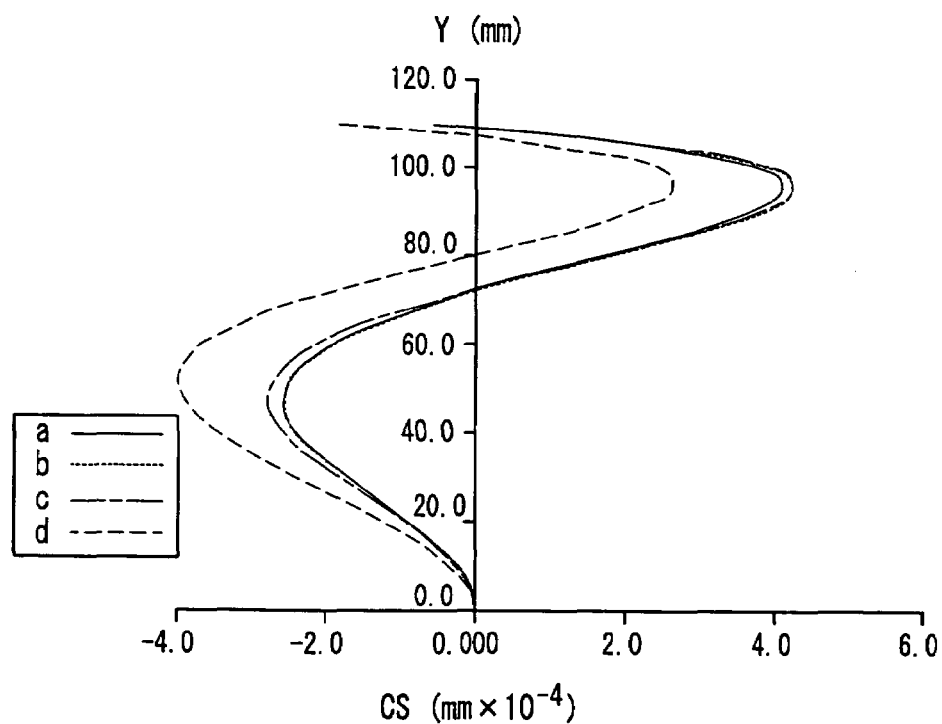
FIG. 28B shows a curvature of field in a subscanning direction in Example 13.
Figure 29A:
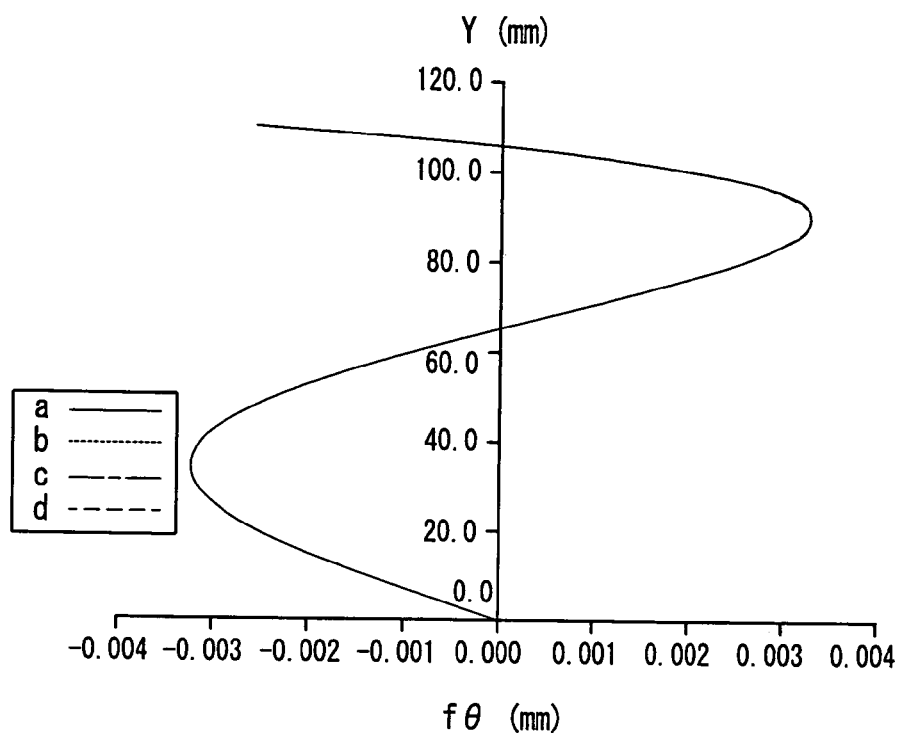
FIG. 29A shows a fθ error in Example 13.
Figure 29B:
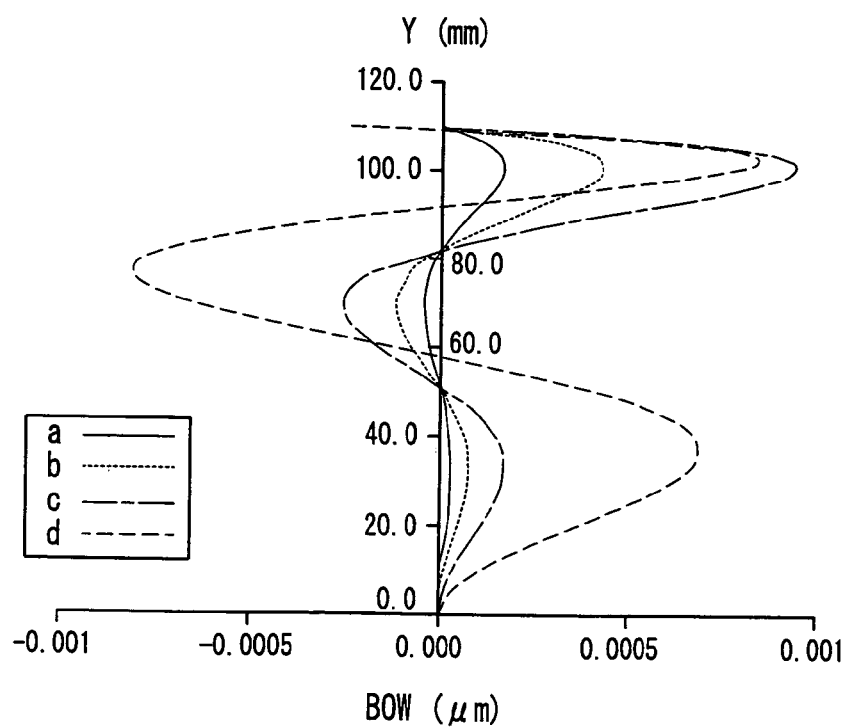
FIG. 29B shows a curvature of a scanning line in Example 13.
Figure 30A:
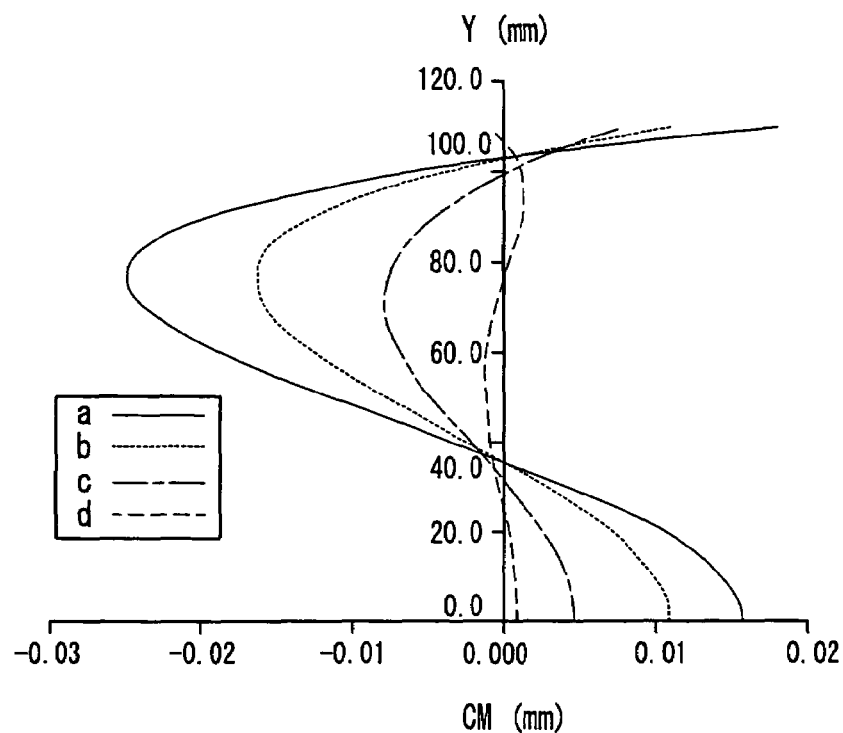
FIG. 30A shows a curvature of field in a main scanning direction in Example 14.
Figure 30B:
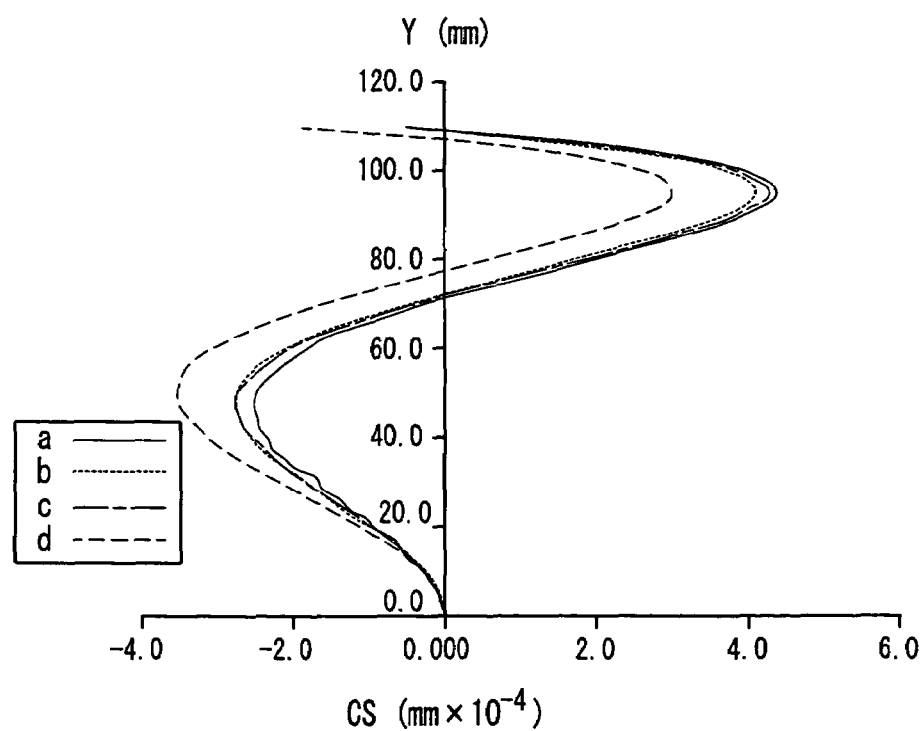
FIG. 30B shows a curvature of field in a subscanning direction in Example 14.
Figure 31A:
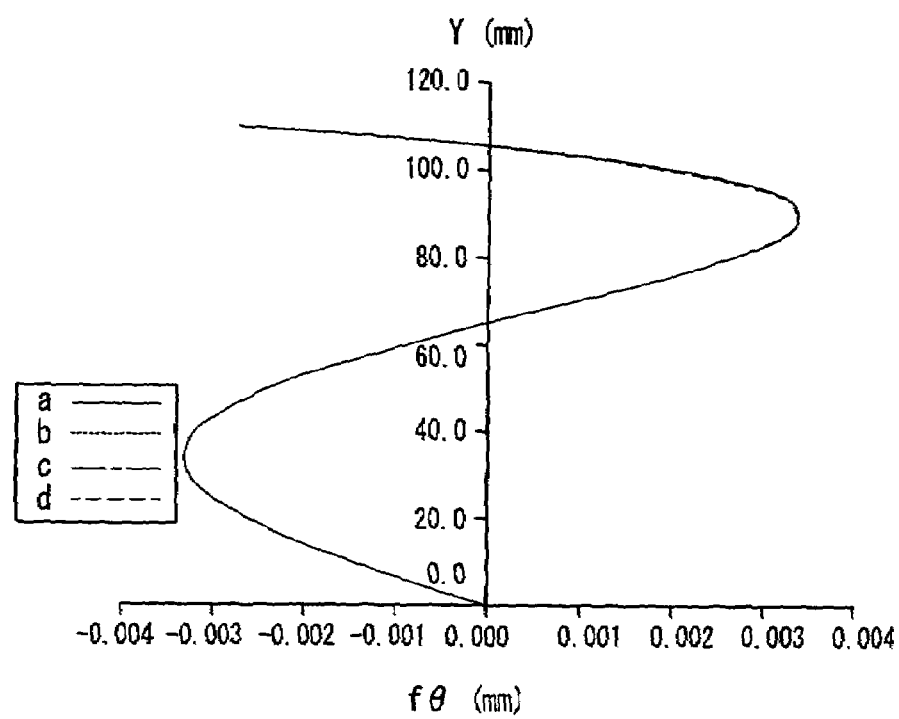
FIG. 31A shows a fθ error in Example 14.
Figure 31B:
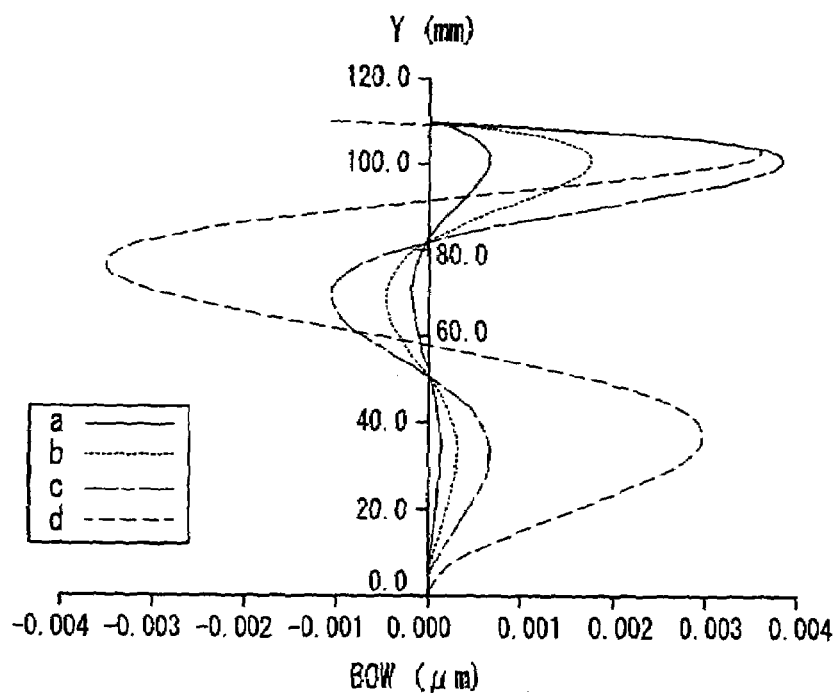
FIG. 31B shows a curvature of a scanning line in Example 14.

The $\beta id$ in Examples 11 to 14 satisfies the relationship expressed by Formula 14. FIGS. 24 and 25 show the measurement results of Example 11; FIGS. 26 and 27 show the measurement results of Example 12; FIGS. 28 and 29 show the measurement results of Example 13; and FIGS. 30 and 31 show the measurement results of Example 14, respectively.

Note here that as to Tables 1 to 10 according to Examples 1 to 10, the value $\beta id$ is shown and Examples 1 to 10 satisfies the relationship expressed by Formula 14.

Furthermore, in Examples 3 to 10, the values s and a corresponding to the surface to be scanned are equal, and $\beta id$ satisfies the relationship expressed by Formula 15.

Fifth Embodiment

Figure 32:
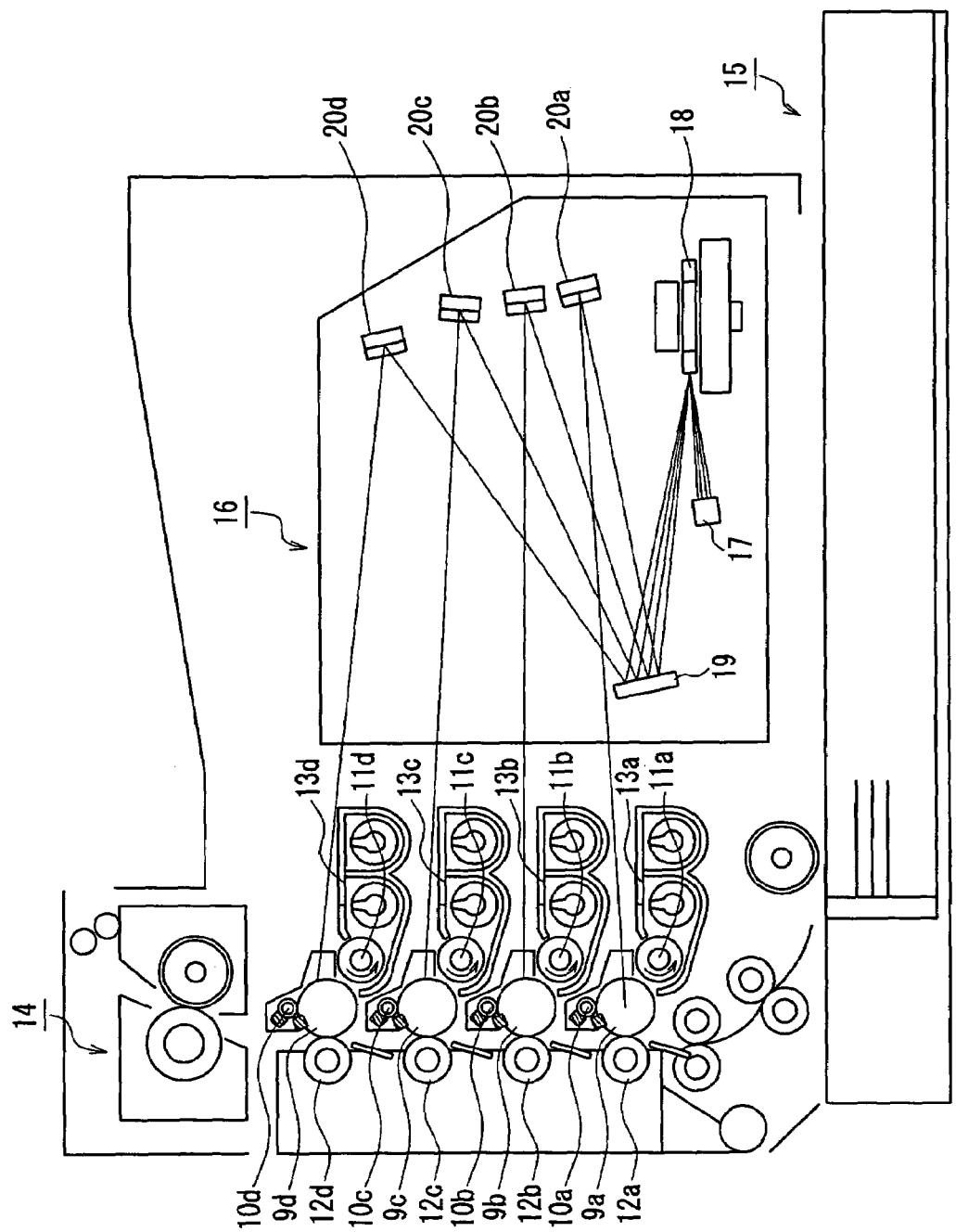
FIG. 32 is a schematic cross-sectional view showing a color image formation apparatus according to a fifth embodiment of the present invention.

FIG. 32 is a tandem type color image formation apparatus according to one embodiment of the present invention in which the optical scanning apparatus described in any one of the first to fourth embodiments is applied for an optical scanning apparatus 16. The surfaces of the photosensitive drums 9a to 9d are respectively covered with a photosensitive member whose charges are changed by the irradiation of light. On the surface of this photosensitive member, electrostatic ions are attached by charging rolls 10a to 10d, and thus the photosensitive member is charged. Charging toners are attached onto the printed portions of the developing units 11a to 11d. Toner images formed on photosensitive drums 9a to 9d are transferred on transfer rolls 12a to 12d.

Four image formation units 13a to 13d include the photosensitive drums 9a to 9d, charging rolls 10a to 10d, developing units 11a to 11d, and transfer rolls 12a to 12d. Furthermore, the transferred toner is fixed on the paper by a fixing device 14. Reference numeral 15 denotes a paper feeding cassette.

The optical scanning apparatus 16 includes a light source block 17 composed of a semiconductor laser, an axial symmetric lens and a cylindrical lens, a polygon mirror 18, a flat bending mirror 19 and curved surface mirrors 20a to 20d.

The image formation units 13a to 13d of four colors (yellow, magenta, cyan and black) are placed in the longitudinal direction and images of respective colors are formed on the photosensitive drums 9a to 9d by the optical scanning apparatus 16. These images are developed by the developing units 11a to 11d; sequentially transferred for each color to a paper fed from the paper feeding cassette 15 by the transfer rolls 12a to 12d and fixed on the paper by the fixing unit 14.

Since the color image formation apparatus according to this embodiment uses an optical scanning apparatus described in any one of the first to third embodiments, it is possible to achieve a color image formation apparatus with a small-size, low cost, high speed, and high resolution.

Sixth Embodiment

FIG. 33 is a view showing a basic configuration of a color image formation apparatus according to the sixth embodiment. In FIG. 33, reference numerals 30a to 30d respectively denote photosensitive drums, each having a surface covered with a photosensitive member whose electric charge is changed by the irradiation of light; 31a to 31d respectively denote charging rolls for attaching static electric ions onto the surface of the photosensitive member so as to charge it; 32a to 32d respectively denote developing units for attaching charging toner onto the printing portion; 33 denotes an intermediate transfer belt for temporarily transferring each toner image formed on the photosensitive drums 30a to 30d corresponding to respective colors; 34 denotes a transfer roll for transferring the toner image formed on the intermediate transfer belt 33 to a paper; 35a to 35d respectively denote image formation units respectively including the photosensitive drums 30a to 30d, the charging rolls 31a to 31d and the developing units 32a to 32d; 36 denotes a fixing unit for fixing the transferred toner onto a paper; and 37 denotes a paper feeding cassette. Furthermore, reference numeral 38 denotes an optical scanning apparatus shown in any one of the first to fourth embodiments; 39 denotes a light source block including a semiconductor laser that is a light source, an axial symmetric lens and a cylindrical lens; 40 denotes a polygon mirror, 41 denotes a flat bending mirror, and 42a to 42d denote curved surface mirrors.

The image formation units 35a to 35d of four colors (yellow, magenta, cyan and black) are placed in the longitudinal direction and images of the respective colors are formed on the photosensitive drums 30a to 30d by the optical scanning apparatus 38. These images are developed by the developing units 32a to 32d; sequentially transferred to the intermediate transfer belt 33 for each color; then transferred to a paper fed from the paper feeding cassette 37 by the transfer roll 34 and fixed on the paper by the fixing unit 36.

In the color image formation apparatus shown in this Figure, when the side at which the light block 39 is placed is defined as an upper side, the photosensitive drums 30a to 30d are placed sequentially toward a lower side. Therefore, the photosensitive drums 30a to 30d are farther away from the light source block 39 as approaching to the lower side, and the photosensitive drum 30d positioned at bottom is located at the most distant point from the light source block 39.

According to this configuration, since the light source block 39 and the polygon mirror 40 can be placed in a space at the upper side of the curved surface mirrors 42a to 42d, it is possible to realize the miniaturization of the entire apparatus. That is to say, it is possible to make effective use of empty space at the top portion of the curved surface mirrors 42a to 42d. Since the paper feeding cassette 37 is placed at the lower side of the curved surface mirrors 42a to 42d, special space is required to be provided in order to arrange the light source block 39 and the polygon mirror 40.

Furthermore, when βid denotes an angle made by a central axis positioned at the most distant point from the light source block 39 in the central axes of light fluxes traveling toward the photosensitive drums 30a to 30d, and a line connecting the center of the surface to be scanned of the photosensitive drum 30d positioned at the most distant from the light source block 39 in the photosensitive drums 30a to 30d and the center of the surface to be scanned of the photosensitive drum 30a positioned at the nearest place to the light source block 39, βid satisfies the relationship expressed by Formula 16.

$$90 < \beta id \leq 150 \quad \text{(Formula 16)}$$

According to this configuration, since the angle βid is an obtuse angle, it is possible to tilt the direction of the arrangement of the photosensitive drums 30a to 30d with respect to the vertical direction and to lower the height of the apparatus, which is advantageous for miniaturizing the apparatus. Furthermore, as shown in FIG. 33, the position from the intermediate transfer belt 33 to a paper can be set at the top portion, thus facilitating the transfer.

INDUSTRIAL APPLICABILITY

As mentioned above, according to the optical scanning apparatus of the present invention, the bending mirror is not required between the second image formation optical system and the photosensitive drum, thus reducing the number of components and enabling the apparatus to be miniaturized at low cost. Furthermore, since the excellent optical performance is achieved and relative performance error in each scanning line is small, high resolution is realized.

Furthermore, since the scanning speeds are equal, the driving frequencies of the light sources can be equalized, thus enabling the circuit to be simplified. At the same time, since the converging degrees in the main scanning direction of the light fluxes traveling toward the optical deflection unit are substantially equalized, the same position adjusting means for the light sources and the first image formation optical system can be employed. Thus, the reduction in the adjusting cost can be realized. Therefore, the present invention is effective for a color image formation apparatus such as a laser beam printer, a laser facsimile machine or a digital copier, etc., and the like.

The invention claimed is:

1. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary;

scanning speeds of the plurality of light fluxes scanning the plurality of surfaces to be scanned are substantially the same as each other;

linear images of the light fluxes formed on the optical deflection unit are formed on substantially the same position; and in a XZ plane including a rotation axis of the optical deflection unit and the vertexes of the plurality of curved surface mirrors, any two of the central axes of the light fluxes traveling from the plurality of curved surface mirrors to the plurality of surfaces to be scanned are not parallel with each other but expand substantially in a fan shape.

2. The optical scanning apparatus according to claim 1, wherein the light fluxes reflected by the plurality of curved surface mirrors travel straight to the respectively corresponding surfaces to be scanned.

3. The optical scanning apparatus according to claim 1, wherein in a XZ plane including a rotation axis of the optical deflection unit and the vertexes of the plurality of curved surface mirrors, centers of the plurality of surfaces to be scanned are aligned substantially linearly.

4. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other;

wherein in the XZ plane including a rotation axis of the optical deflection unit and the vertexes of the plurality of curved surface mirrors, with respect to a line connecting the vertex of the curved surface mirror positioned at the top and the vertex of the curved surface mirror positioned at the bottom in the plurality of curved surface mirrors, vertexes of the other curved surface mirrors are disposed at the opposite side to the plurality of surfaces to be scanned.

5. The optical scanning apparatus according to claim 1, wherein the plurality of curved surface mirrors have an arc-shaped cross section in a subscanning direction.

6. The optical scanning apparatus according to claim 1, wherein the plurality of curved surface mirrors have a shape so as to correct a curve of the scanning line, which occurs because light fluxes are incident obliquely.

7. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of curved surface mirrors are asymmetric with respect to the YZ plane that includes normal lines at the vertexes and is parallel with the main scanning direction.

8. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliciuely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of curved surface mirrors are skew in which normal lines at points other than a vertex on a bus line that is a curved line at which the YZ plane intersects the curved surface are not included in the YZ plane.

9. The optical scanning apparatus according to claim 8, wherein an angle made by respective normal lines at the points on the bus line and the YZ plane becomes larger toward the peripheral portion.

10. The optical scanning apparatus according to claim 8, wherein the direction of the angle made by respective normal lines at the points on the bus line and the YZ plane is a forwarding direction when the direction of the angle of a light flux reflected by the curved surface mirror with respect to the incident light flux from the deflection surface is defined as a forwarding direction.

11. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of curved surface mirrors are anamorphotic mirrors in which the radius of curvature in the main scanning direction and the radius of curvature in the subscanning direction at the vertex are different from each other.

12. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of the curved surface mirrors have concave mirror surfaces both in the main scanning direction and the subscanning direction.

13. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of curved surface mirrors have a refractive force in the subscanning direction that is different between the central portion and the peripheral portion in the main scanning direction.

14. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein the plurality of curved surface mirrors have a radius of curvature of the subscanning cross section that does not differ depending upon the cross sectional shape in the main scanning direction.

15. The optical scanning apparatus according to claim 1, wherein the image formation optical system allows light fluxes from the plurality of light sources to be the converging light fluxes in the main scanning direction.

16. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources and the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary; and scanning speeds of the plurality of light fluxes scanning the plurality of surfaces to be scanned are substantially the same as each other, wherein at least one of the plurality of the light sources comprises a wavelength variable light source and a wavelength controlling portion.

17. A color image formation apparatus, comprising: an optical scanning apparatus according to claim 1, wherein a plurality of developing units for developing toners of different colors; transferring units for transferring toner images developed by a plurality of developing units onto a transfer material, and fixing unit for fixing the toner image transferred onto the transfer material are disposed in a way in which they correspond respectively to a plurality of photosensitive members disposed on the plurality of surfaces to be scanned.

18. An optical scanning apparatus, comprising: a plurality of light sources; a single optical deflection unit for carrying out scanning with light fluxes emitted from the plurality of light sources; an image formation optical system that is disposed between the plurality of light sources and the optical deflection unit and forms linear images of the light fluxes on the same deflection surface of the optical deflection unit; and a plurality of curved surface mirrors that are disposed between a plurality of surfaces to be scanned corresponding to the plurality of light sources an the optical deflection unit and correspond respectively to the plurality of surfaces to be scanned, wherein the light fluxes from the image formation optical system are incident obliquely on a plane that includes a normal line at the center of the deflection surface of the optical deflection unit and is parallel with a main scanning direction;

the plurality of curved surface mirrors are disposed in the different positions with respect to a subscanning direction so that the light fluxes from the optical deflection unit are incident obliquely on a plane that includes normal lines at vertexes of the plurality of curved surface mirrors and is parallel with the main scanning direction;

when the plane that includes a normal line at the center of the deflection surface and is parallel with the main scanning direction is defined as a boundary, the plurality of curved surface mirrors are disposed in the same space in spaces divided by the boundary;

scanning speeds of the plurality of light fluxes scanning the plurality of surfaces to be scanned are substantially the same as each other; and each of the plurality of curved surface mirrors has a refractive force in the main scanning direction.

* * * * *